US011641067B1

(12) United States Patent
Merola

(10) Patent No.: US 11,641,067 B1
(45) Date of Patent: May 2, 2023

(54) PASSIVE ANTENNA ELEMENTS USED TO FILL GAPS IN A PANELTZED PHASED ARRAY ANTENNA

(71) Applicant: Amazon Technologies, Inc., Seattle, WA (US)

(72) Inventor: Christopher Steven Merola, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 110 days.

(21) Appl. No.: 16/989,751

(22) Filed: Aug. 10, 2020

Related U.S. Application Data

(63) Continuation-in-part of application No. 16/876,904, filed on May 18, 2020.

(51) Int. Cl.
*H01Q 21/22* (2006.01)
*H01Q 1/24* (2006.01)
*H01Q 1/48* (2006.01)
*H01Q 21/06* (2006.01)
*H04B 1/40* (2015.01)
*H01Q 1/22* (2006.01)

(52) U.S. Cl.
CPC ............. *H01Q 21/22* (2013.01); *H01Q 1/243* (2013.01); *H01Q 1/48* (2013.01); *H01Q 21/065* (2013.01); *H04B 1/40* (2013.01); *H01Q 1/2291* (2013.01)

(58) Field of Classification Search
CPC .......... H01Q 21/22; H01Q 1/243; H01Q 1/48; H01Q 1/40; H01Q 1/2291; H04B 1/40
See application file for complete search history.

(56) References Cited

U.S. PATENT DOCUMENTS

| | | | | |
|---|---|---|---|---|
| 11,211,702 B1* | 12/2021 | Mahanfar | ................ | H01Q 5/42 |
| 2007/0052592 A1* | 3/2007 | Purden | ..................... | H01Q 3/44 |
| | | | | 343/700 MS |
| 2014/0184457 A1* | 7/2014 | Lea | ........................ | H04W 76/27 |
| | | | | 343/747 |
| 2017/0054221 A1 | 2/2017 | West | | |
| 2018/0351262 A1 | 12/2018 | Yoon | | |
| 2020/0176863 A1* | 6/2020 | Luna | .................... | H01Q 1/2283 |
| 2021/0058800 A1* | 2/2021 | Cheon | .................. | H04W 16/30 |
| 2021/0305717 A1* | 9/2021 | Hou | ..................... | H01Q 19/108 |

FOREIGN PATENT DOCUMENTS

CN 106848552 A 6/2017

OTHER PUBLICATIONS

Manica et al., "Wideband Multilayer WAIM design and Optimization"; the 8th European Conference on Antennas and Propagation (EuCAP 2014) p. 2997-3000, Apr. 2014.

* cited by examiner

*Primary Examiner* — Junpeng Chen
(74) *Attorney, Agent, or Firm* — Lowenstein Sandler LLP

(57) ABSTRACT

Technologies directed to terminated bridge elements between panel gaps are of an antenna structure are described. The antenna structure includes a first circuit board, a second circuit board, and a structure. The first circuit board includes a first set of antenna elements. The second circuit board includes a second set of antenna elements. The structure is located over a gap between the first circuit board and the second circuit board. The structure includes an antenna element. The antenna element, an antenna element of the first set of antenna elements, and an antenna element of the second set of antenna elements form a lattice pattern.

20 Claims, 33 Drawing Sheets

12 element antenna module

PASSIVE ANTENNA ELEMENTS USED TO FILL GAPS IN A PANELTZED PHASED ARRAY ANTENNA

RELATED APPLICATIONS

This application is a continuation-in-part of U.S. application Ser. No. 16/876,904, filed May 18, 2020, the entire contents of which are incorporated herein by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
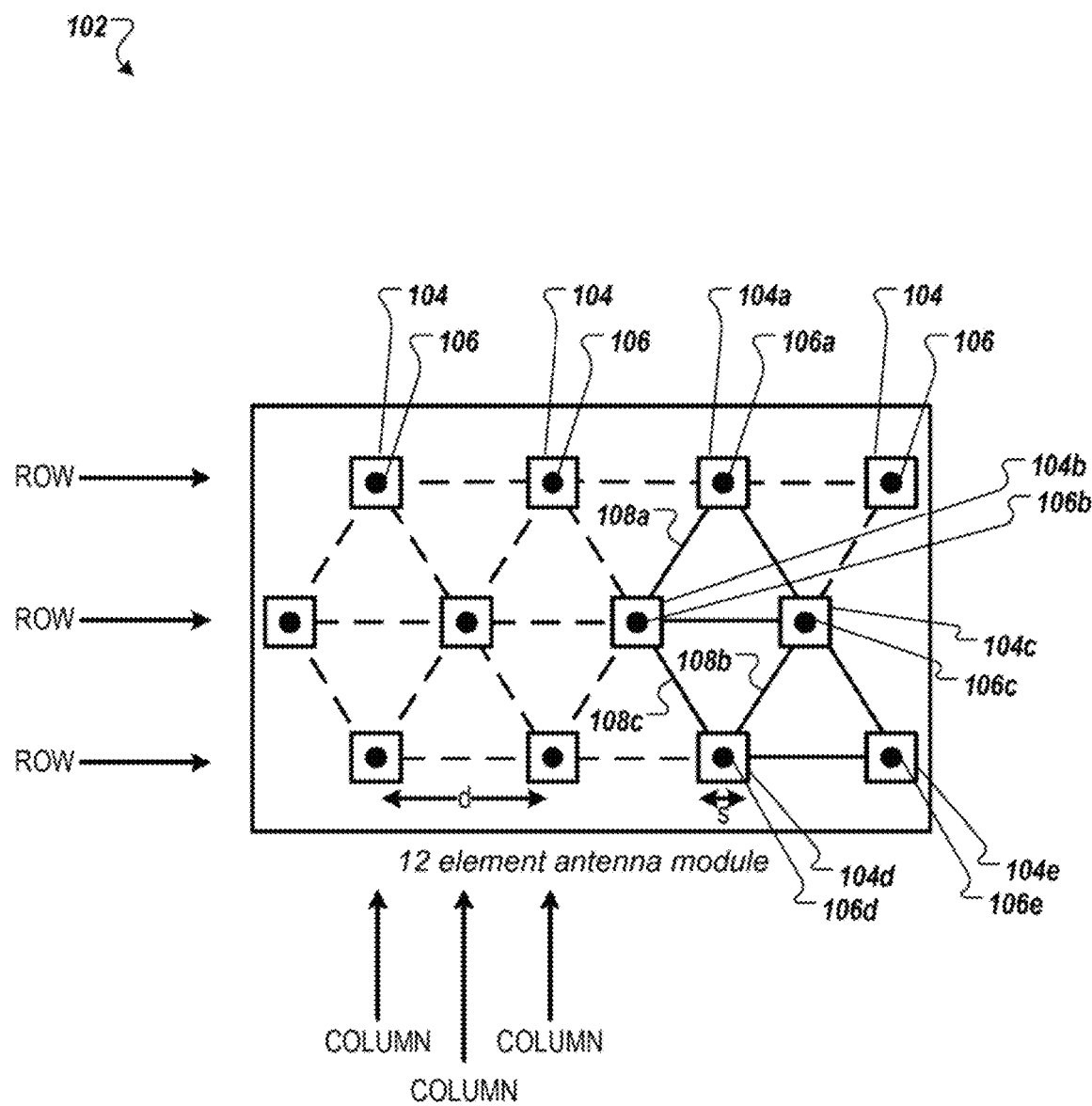
FIG. 1A is a schematic diagram of an antenna module of a phased array antenna structure according to one embodiment.

Technologies directed to antenna element arrangements within a module for an array antenna are described. An array antenna, such as a phased array antenna, can include hundreds or thousands of antenna elements. Described herein are arrangements for antenna elements of antenna modules for applications in large array antennas, such as a phased array antenna. The array antenna can be made up of antenna modules, or simply modules, that include a subset of antenna elements with the subset containing one to tens of antenna elements. The modules can be individually manufactured and assembled as an array antenna. For several reasons including manufacturability and ease of assembly, array antennas in microwave and lower millimeter wave (mm-Wave) are built upon or are supported by Printed Wiring Boards (PWBs) or Printed Circuit Boards (PCBs), where the RF interconnects and possibly also the antenna elements are realized. In general, a PWB is similar to a PCB, but without any components installed on it. Tight manufacturing tolerances are needed for microwave antennas, and the larger the board, the more difficult the board is to manufacture while maintaining those tolerances. The antenna modules can be manufactured using one of several techniques, including Organic substrate PWB and Low Temperature Cofired Ceramic (LTCC) circuit. The subset of antenna elements is referred to as an antenna module or a module. The large array antenna can be made up of an array of antenna modules that are attached to another substrate, such as a PWB, for interconnection with a microwave source. Each antenna module thus incorporates an integer number of antenna elements that are active antenna elements. The antenna modules are often very closely spaced between each other, preventing the insertion of any other component between them. In addition, for some larger arrays, panels, such as circuit boards or PCBs can be assembled with multiple antenna modules, and subsequently, multiple panels can be assembled to make the antenna array. However, due to manufacturing and tolerances as well as fastening limitations, there can be open areas or gaps between panels, which can lead to an irregularity in a pattern or layout of the antenna elements and antenna modules that are on the panels. Gaps between panels can cause variations in the antenna radiation pattern and/or can cause antenna element impedance effects. These issues may be exacerbated when the antenna elements are not placed on a rectangular lattice. For example, if antenna elements are placed on a triangular lattice, there may be larger gaps between adjacent antenna elements at the edges of the panels.

A conventional array antenna includes antenna elements arranged on a regular square lattice. The conventional array antenna operates to form beams (e.g., of electromagnetic radiation) and steer the beams by relying on constructive and destructive interference of electromagnetic waves transmitted by each individual antenna element. When the beam is formed by the conventional array antenna with antenna elements arranged on the square lattice, the beam can have grating lobes, which are undesirable for performance. To form a beam the conventional array antenna requires a large number of antenna elements, while the complexity of an array antenna increased with the number of antenna elements.

Aspects of the present disclosure overcome the deficiencies of conventional array antennas by providing an array antenna elements arranged on a triangular lattice. A feed point (such as an antenna feed element) is associated with each antenna element. In order to arrange the antenna elements on a triangular lattice, the feed points can be used as a reference. In other words, the feed points can be placed at each location of a triangular lattice. Arranging antenna elements on a triangular lattice improves performance by removing or reducing the grating lobes and simplifies the array antenna architecture by reducing the number of antenna elements that are required. Reducing the number of antenna elements reduces complexity, cost, mass, and power consumption (or power requirements) of the array antenna. Aspects of the present disclosure can use rectangular antenna modules that are identical to facilitate manufacturing, assembly, and part management. The array antenna is constructed using the antenna rectangular antenna modules. The antenna modules can be manufactured from a ceramic-based material, a Teflon-based material, organic materials, or the like. The antenna elements can be printed on the modules (e.g., using copper). The antenna elements should be printed on the antenna modules in such a way to minimize the space between an edge of the antenna module and one of the antenna elements near the edge. In this way, the antenna elements can be spaced closer together when the antenna modules are assembled together, and the grading lobes can be minimized.

Splitting a phased array antenna across multiple panels is a convenient way to fabricate the phased array antenna. When the antenna array is constructed with panels of antenna modules, in order to mitigate effects of gaps between panels, especially when the antenna elements are placed on a non-rectangular lattice pattern, a bridge structure can be included to form an overlap across an open area (e.g., a gap) between any two panels. Bridging these gaps with internally terminated dummy elements can help mitigate radiation and impedance effects. Bridging the gaps with dummy elements presents a uniform antenna array aperture, which improves performance uniformity of the active antenna elements. The bridge structure can be fixed, glued, or adhered to each of the panels and can include antenna modules, also referred to as bridge modules. The bridges can be bonded to the panels using solder, or through other conductive means or non-conductive means, such as epoxy. These bridge elements are not connect to any transmit or receive networks, but are internally terminated in a passive matched load (e.g., a resistor). The bridge modules can include one or more passive antenna elements that are similar to the antenna elements of the antenna modules (e.g., the active antenna elements), except that the passive antenna elements can be terminated by a resistor instead of being coupled to an amplifier. The bridge structures can be adhered over the gap between a first panel and a second panel such that the antenna elements along with the bridge elements form a uniform lattice pattern (such as a triangular lattice pattern, a rectangular lattice pattern, or the like). In other embodiments, the bridge structure can include terminals that are coupled to other circuit boards and the antenna elements of the bridge structures can be driven by an adjacent circuit board.

FIG. 1A is a schematic diagram of an antenna module 102 of a phased array antenna structure according to one embodiment. A phased array antenna structure, such as the phased array antenna structure 100 described with respect to FIG. 1D, can be constructed of a set of antenna modules 102 such as antenna module 102. In one embodiment, the antenna module 102 is coupled to a support structure (not shown in FIG. 1A) of the phased array antenna structure. The phased array antenna structure includes a radio frequency (RF) circuit (e.g., an RF module). Radio frequency front-end (RFFE) is coupled to the RF circuit. The phased array antenna structure further includes a circuit board. In one embodiment, the antenna module 102 is electrically and physically coupled to the circuit board. The antenna module 102 has a rectangular shape and includes a set (e.g., of twelve) antenna elements 104 that are disposed in a triangular arrangement within the rectangular shape. Two adjacent antenna elements 104 of the set of antenna elements are separated by a first distance (d). The first distance can be measured between the centers of any two adjacent antenna elements 104. Each antenna element 104 is associated with a feed point 106. An antenna feed (not shown in FIG. 1A) can be coupled to the feed point 106 to feed a signal to the antenna element. As depicted in FIG. 1A, the feed point 106 is located at the center of the antenna element 104. Alternatively, the feed point 106 can be located at other positions of the antenna element 104.

Within the rectangular shape, the first set of antenna elements are organized in a grid of rows and columns. At least one of the multiple rows is offset from at least two of the other rows by a percentage of the first distance. The percentage can be less than twenty-five percent (25%). In one embodiment, the set of antenna elements 104 are organized as a first row, a second row, and a third row of antenna elements. A direction of the offset is along the at least one of the multiple rows. In other words, the offset is in a direction which is parallel to a row and perpendicular to a column in FIG. 1A. The offset affects the distance between the vertical edge of the support structure and each antenna element of the row that is offset.

In one embodiment, the triangular arrangement of the antenna elements 104 is part of a rhombic lattice (e.g., an isosceles triangular lattice), a hexagonal lattice, an equilateral triangular lattice, or a parallelogrammic lattice (e.g., a scalene triangular lattice). Alternatively, the antenna elements 104 are part of other non-square or non-rectangular lattices. The second row of antenna elements 104 is offset from the first row and the third row of antenna elements 104. In other words, the second row can be shifted with respect to the first row and the third row while maintaining a same distance between the first row and the second row and the second row and the third row. The second row is offset from the first row and the third row such that a first feed point 106a of a first antenna element 104a of the first row, a second feed point 106b of a second antenna element 104b of the second row, and a third feed point 106c of a third antenna element 104c of the second row form a first equilateral triangle 108a. In other words, the first feed point 106a, the second feed point 106b, and the third feed point 106c are located at the vertices of the first equilateral triangle 108a. Additionally, the third feed point 106c, a fourth feed point 106d of a fourth antenna element 104d of the third row, and a fifth feed point 106e of a fifth antenna element 104e of the third row form a second equilateral triangle 108b with the same dimensions as the first equilateral triangle 108a. In other words, the third feed point 106c, the fourth feed point 106d, and the fifth feed point 106e are located at the vertices of the second equilateral triangle 108b. Further, the second feed point 106b, the third feed point 106c, and the fourth feed point 106d form a third equilateral triangle 108c with the same dimensions as the first equilateral triangle 108a, but inverted with respect to the first equilateral triangle 108a. In other words, the second feed point 106b, the third feed point 106c, and the fourth feed point 106d are located at the vertices of the third equilateral triangle 108c. It should be noted that any three mutually adjacent feed points 106 within the antenna module 102 are located to form an equilateral triangle with the same dimensions as the first equilateral triangle 108a. An equilateral triangle can also be referred to as an equidistant triangle. Each feed point 106 of the antenna elements 104 are part of a triangular lattice pattern of feed points of the phased array antenna structure. In one embodiment, the triangular lattice pattern is formed by each feed point 106 of each antenna element 104 of the phased array antenna structure and the triangular lattice pattern includes a set of identical equilateral triangles arranged in a uniformly repeating pattern. It should be noted three mutually adjacent feed points 106 refers to a set of three feed points 106 in which each feed point of the set is an adjacent neighbor to each other feed point of the set.

In one embodiment, the triangular lattice pattern is a two-dimensional Bravais lattice that is formed by two vectors (e.g., primitive vectors of a triangular lattice) of identical length with a mutual angle of separation of 120 degrees. In another embodiment, the triangular lattice pattern is a two-dimensional Bravais lattice that is formed by two vectors of identical length with a mutual angle of separation of 60 degrees. In either case, each end of each vector represents a lattice point (e.g., a vertex). In one embodiment, feed points 106 of the antenna elements 104 are located at a lattice point in a triangular lattice. The triangular lattice includes a set of lattice points (e.g., vertices). Three mutually adjacent lattice points form an equilateral triangle. In other embodiments, the feed points can be offset from the lattice points.

The antenna element 104 can be a patch antenna, a micro-strip antenna, a monopole antenna, a dipole antenna, a Vivaldi antenna, an annular ring antenna, a tapered slot antenna, or the like. In some embodiments, the antenna element 104 can be a dual-linear polarized antenna, or a dual-feed antenna that can be fed in quadrature in order to generate circular polarization. In other embodiments, the antenna element 104 can support circularly polarized radiation, including spiral. In some embodiments, the antenna element can be a cut-corner patch antenna or a turnstile dipole. The antenna element 104 can be a planar element or an antenna element with a ground plane. The feed point 106 can be located at different positions of the antenna element 104 and can be oriented in specific directions.

Although depicted in FIG. 1A as having twelve antenna elements 104 and twelve feed points 106, in other embodiments, the antenna module 102 can have a different number of elements, such as eight, nine, fifteen, eighteen, or another integer number. Further, although the antenna module 102 is depicted as having three rows within the rectangular shape, in other embodiments, the antenna module 102 can have one, two, four, five, or other integer number of rows. Further, although the antenna module 102 is depicted as having four columns within the rectangular shape, in other embodiments, the antenna module 102 can have one, two, four, five, or other integer number of columns.

Figure 1B:
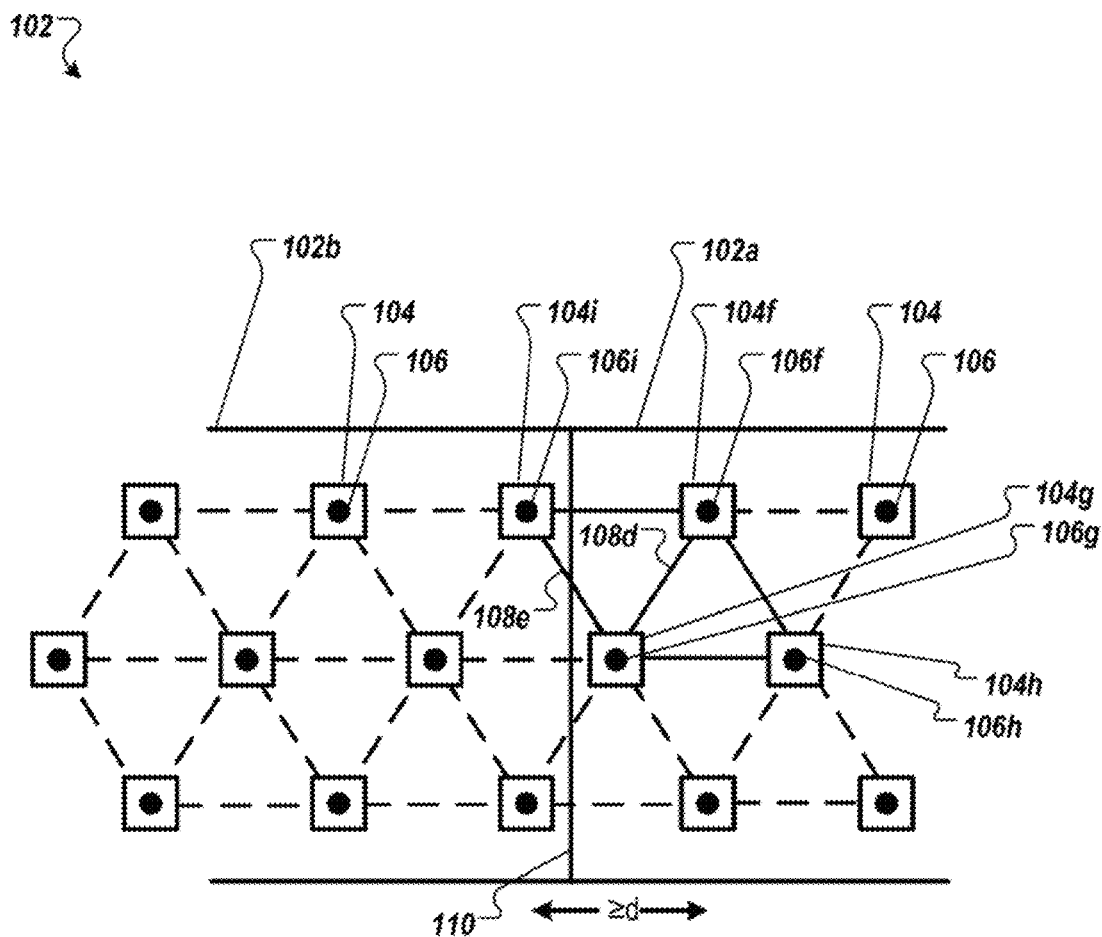
FIG. 1B is a schematic diagram of a first antenna module and a second antenna module of a phased array antenna structure according to one embodiment.

FIG. 1B is a schematic diagram of a first antenna module 102a and a second antenna module 102b of a phased array antenna structure according to one embodiment. The first antenna module 102a and the second antenna module 102b are the same as the antenna module 102 of FIG. 1A. The first antenna module 102a and the second antenna module 102b are identical, except for their position on the phased array antenna structure. As depicted, the first antenna module 102a is adjacent to (e.g., to the right of) the second antenna module 102b (which is to the left of the first antenna module 102a). Alternatively, the first antenna module 102a can be adjacent to (e.g., to the left of) the second antenna module 102b (which can be to the right of the first antenna module 102a). The first antenna module 102a and the second antenna module 102b share an edge 110.

In one embodiment, the first antenna module 102a and the second antenna module 102b are coupled to a support structure (not shown in FIG. 1B) of a phased array antenna structure. A first feed point 106f of a first antenna element 104f of the first antenna module 102a is separated from a first feed point 106i of a first antenna element 104i of the second antenna module 102b by at least the first distance (d). This can result from manufacturing limitations for printing or manufacturing an antenna element such that an edge of the antenna element is exactly coincident with an edge of the antenna module.

In a further embodiment, a first row of antenna elements 104 of the second antenna module 102b is aligned with a first row of antenna elements 104 of the first antenna module 102a, a second row of antenna elements 104 of the second antenna module 102b is aligned with a second row of antenna elements 104 of the first antenna module 102a, and a third row of antenna elements 104 of the second antenna module 102b is aligned with a third row of antenna elements 104 of the first antenna module 102a. The first feed point 106f of the first row of the first antenna module 102a, a second feed point 106g of the second row of the first antenna module 102a, and a third feed point 106h of the third row of the first antenna module 102a are located to form a first equilateral triangle 108d. Further, the first feed point 106f, the second feed point 106g, and the first feed point 106i of the first row of the second antenna module 102b are located to form a second equilateral triangle 108e with the same dimensions as the first equilateral triangle 108d, but inverted with respect to the first equilateral triangle 108d. It should be noted that any three mutually adjacent feed points 106 within the first antenna module 102a and the second antenna module 102b are located to form an equilateral triangle with the same dimensions as the first equilateral triangle 108d. Each feed point 106 of the antenna elements 104 are part of a triangular lattice pattern of feed points of the phased array antenna structure. As described herein, the triangular lattice pattern can be formed with a set of identical equilateral triangles arranged in a uniformly repeating pattern, as a two-dimensional Bravais lattice with different angles of separation.

Figure 1C:
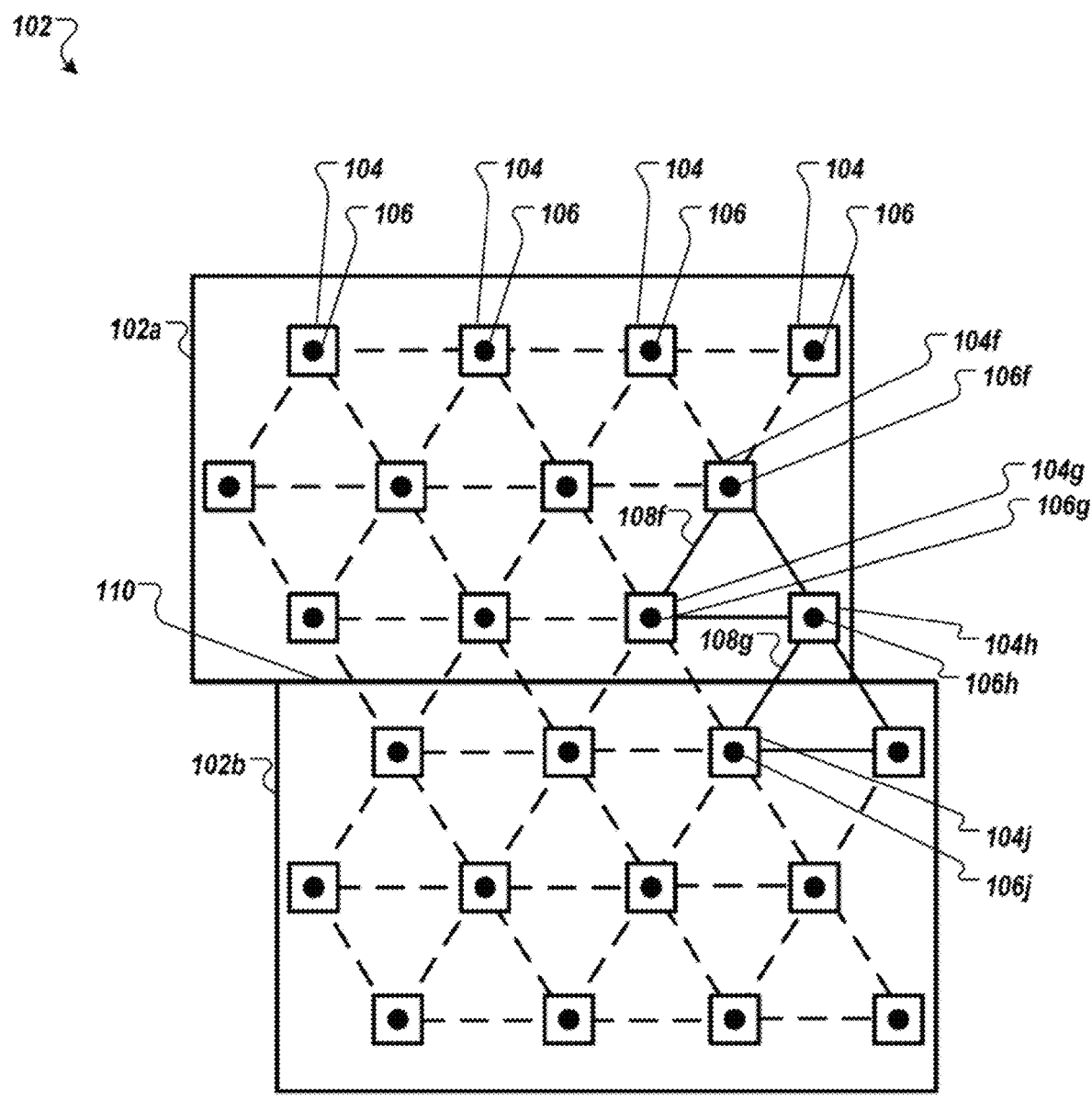
FIG. 1C is a schematic diagram of a first antenna module and a second antenna module of a phased array antenna structure according to one embodiment.

FIG. 1C is a schematic diagram of a first antenna module 102a and a second antenna module 102b of a phased array antenna structure according to one embodiment. The first antenna module 102a and the second antenna module 102b are the same as the antenna module 102 of FIG. 1A. The first antenna module 102a and the second antenna module 102b are identical, except for their position on the phased array antenna structure. As depicted, the first antenna module 102a is adjacent to (e.g., to the above) the second antenna module 102b (which is below the first antenna module 102a). Alternatively, the first antenna module 102a can be adjacent to (e.g., to the below) the second antenna module 102b (which can be above the first antenna module 102a). The first antenna module 102a and the second antenna module 102b share an edge 110.

In one embodiment, a first feed point 106f of the second row of the first antenna module 102a, a second feed point 106g of the third row of the first antenna module 102a, and a third feed point 106h of the third row of the first antenna module 102a are located to form a first equilateral triangle 108f. Further, the second feed point 106g, the third feed point 106h, and a fourth feed point 106j of the first row of the second antenna module 102b are located to form a second equilateral triangle 108g with the same dimensions as the first equilateral triangle 108f, but inverted with respect to the first equilateral triangle 108f. It should be noted that any three mutually adjacent feed points 106 within the first antenna module 102a and the second antenna module 102b are located to form an equilateral triangle with the same dimensions as the first equilateral triangle 108f. Each feed point 106 of the antenna elements 104 are part of a triangular lattice pattern of feed points of the phased array antenna structure. As described herein, the triangular lattice pattern can be formed with a set of identical equilateral triangles arranged in a uniformly repeating pattern, as a two-dimensional Bravais lattice with different angles of separation.

Figure 1D:
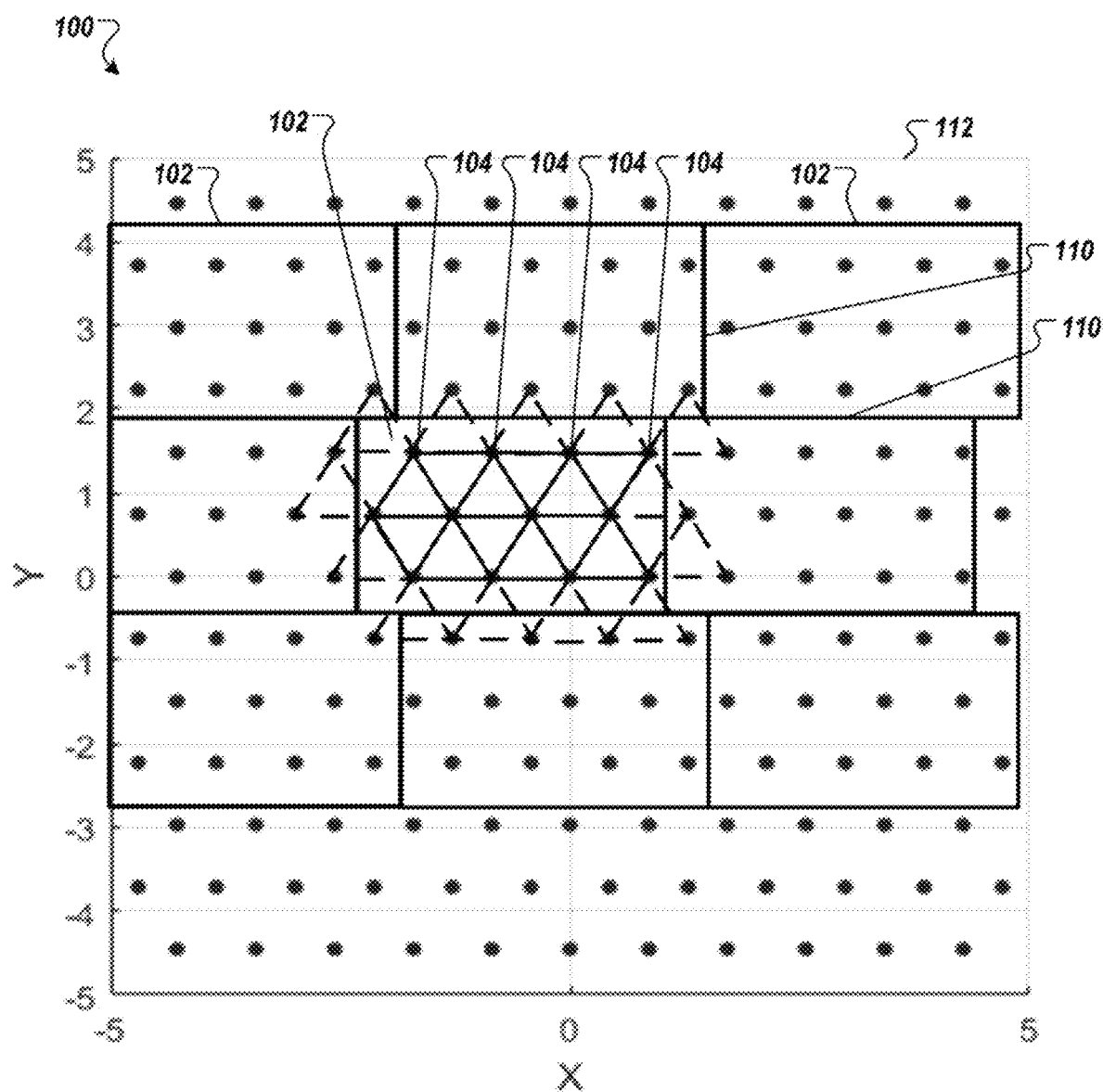
FIG. 1D is a schematic diagram of a phased array antenna structure constructed from antenna modules according to one embodiment.

FIG. 1D is a schematic diagram of a phased array antenna structure 100 constructed from antenna modules 102 according to one embodiment. Although not all components of the antenna modules 102 are shown, the antenna modules 102 are the same or similar to the antenna modules 102 of FIGS. 1A-1C. In particular and for simplicity, the points represent the antenna elements 104, and the feed points 106 are not shown in FIG. 1D. The phased array antenna structure 100 includes a support structure 112. A first antenna module 104 is coupled to the support structure 112. As described with respect to FIGS. 1A-1C, the first antenna module 102 has a rectangle shape and a set of antenna elements 104 disposed in a triangular arrangement within the rectangle shape. For example, a first antenna element and a second antenna element of the first antenna module 102 are located on a longitudinal axis of the rectangle shape. In one embodiment, the set of antenna elements 104 are disposed on the first antenna module 102. Any two adjacent antenna elements 104 within the first antenna module 102 are spaced by the first distance (d). Each antenna element 102 has a first size (s) that is less than or approximately equal to half of the first distance. Additionally, a second antenna module 102 that is identical to the first antenna module 102 is coupled to the support structure 112 and is adjacent to the first antenna module 102. An antenna element 104 of the first antenna module 102 is adjacent to and separated by at least the first distance from an antenna element 104 of the second antenna module 102. The phased array antenna structure 100 includes a set of antenna modules 102. The set of antenna modules 102 includes the first antenna module and the second antenna module. In one embodiment, each antenna module of the set of antenna modules 102 includes at least twelve antenna elements 104. Each antenna module 102 is separated from adjacent antenna modules 102 by an edge 110.

As depicted in FIG. 1D, each antenna module 102 of the phased array antenna structure 100 includes three rows and eight columns of antenna elements 104, and twelve total antenna elements 104. However, in other embodiments, antenna modules can have a different number of rows and columns of antenna elements as well as a different number of total antenna elements.

In one embodiment, the phased array antenna structure 100 includes 4992 antenna elements 104 and each antenna module 102 includes twelve antenna elements 104, therefore the phased array antenna structure 100 includes 416 antenna modules 102. It should be noted that FIG. 1D does not show every antenna element of the phased array antenna structure 100. In another embodiment, the phased array antenna structure 100 includes a first number of antenna modules 102 and each antenna module includes a second number of antenna elements 104. In such a case, the phased array antenna includes a third number of antenna elements 104 equal to the first number multiplied by the second number. In one embodiment, a digital beam former (DBF) of the phased array antenna controls thirty-six antenna elements and the number of antenna elements 104 that an antenna module 102 can include is factor of thirty-six. In another embodiment, a DBF controls a first number of antenna elements and the number of antenna elements that an antenna module can include is a factor of the first number.

As depicted in FIG. 1D, each row of antenna modules 102 is shifted with respect to an adjacent row of antenna modules 102 by one column of antenna elements 104. In other embodiments, each row of antenna modules 102 can be shifted with respect to an adjacent row of antenna modules 102 by two, three, four, or more columns of antenna elements 104.

In one embodiment, a radio frequency (RF) module circuit is coupled to the phased array antenna, including the antenna modules 102, via RFFE circuitry. Alternatively, a microwave radio or other signal source can be coupled to the antenna modules 102. Each of the antenna modules 102 can be coupled physically to the support structure and electrically coupled to a communication system, such as RF radio or a microwave radio. The antenna modules 102 can be coupled to a circuit board or other types of support structures.

Although the antenna modules 102 with antenna elements 104 arranged in a triangular pattern are described as being used for a phased array antenna, in other embodiments any antenna elements can be arranged in a triangular pattern on a rectangular antenna module.

Figure 1E:
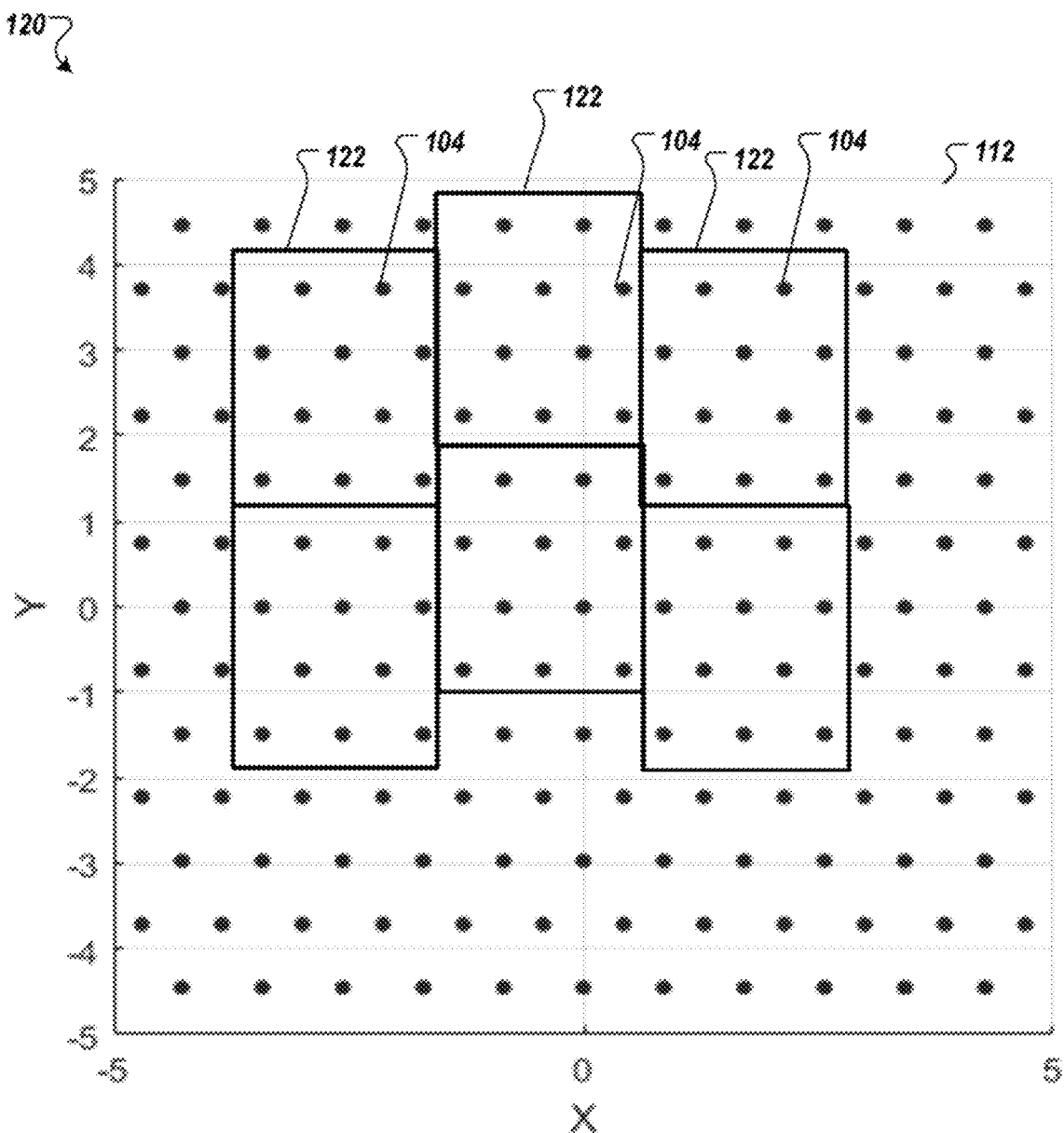
FIG. 1E is a schematic diagram of a phased array antenna structure constructed from antenna modules according to one embodiment.

FIG. 1E is a schematic diagram of a phased array antenna structure 120 constructed from antenna modules 122 according to one embodiment. The phased array antenna structure 120 is similar to the phased array antenna structure 100 of FIG. 1D except that it is constructed of antenna modules 122. Each of the antenna modules 122 includes four rows and five columns of antenna elements 104 (and feed points, not shown in FIG. 1E). Each of the antenna modules 122 includes ten antenna elements 104. As depicted in FIG. 1E, each column of antenna modules 122 is shifted with respect to an adjacent column of antenna modules 122 by one row of antenna elements 104. In other embodiments, each column of antenna modules 122 can be shifted with respect to an adjacent column of antenna modules 122 by two, three, four, or more rows of antenna elements 104.

Figure 1F:
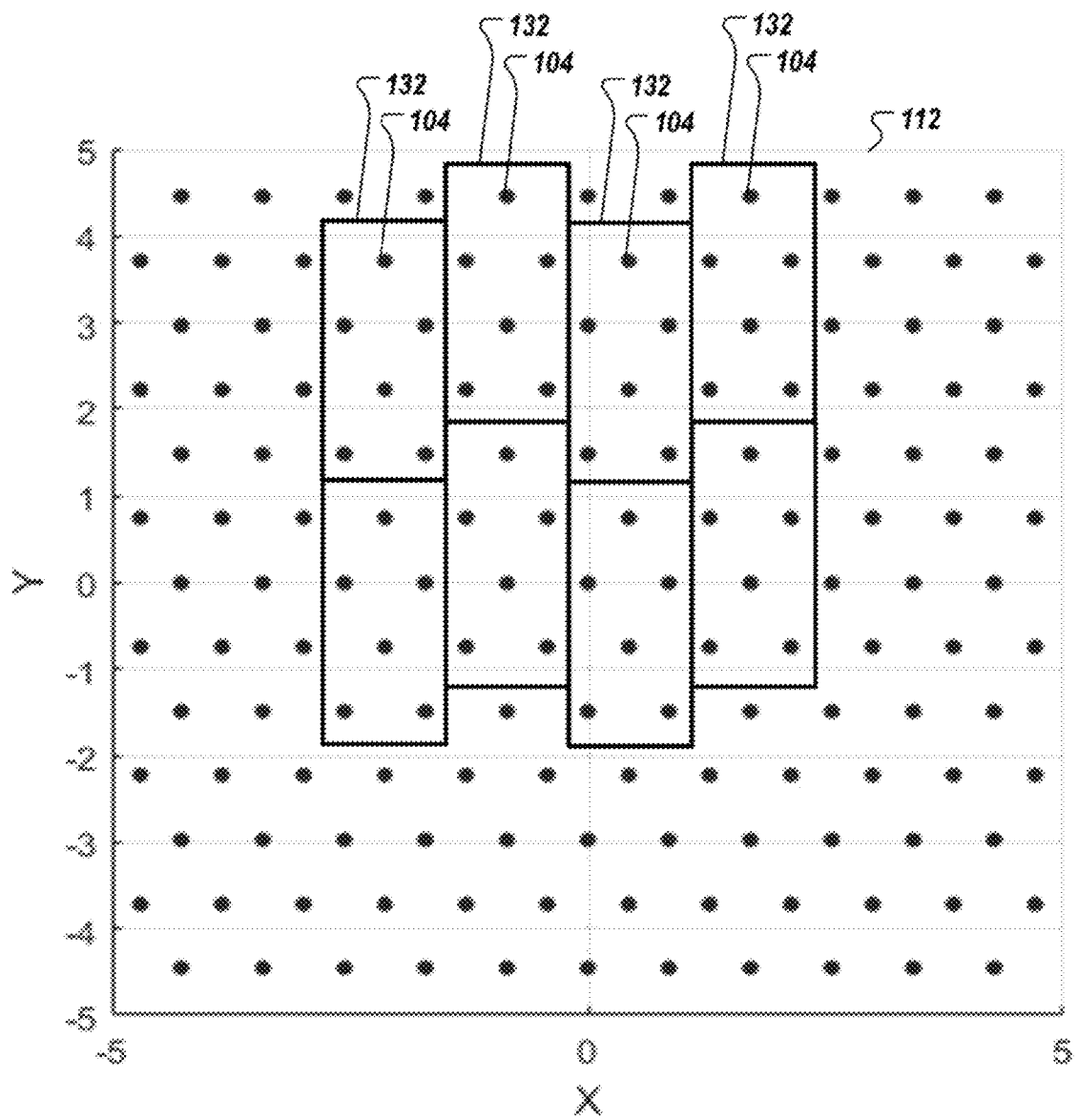
FIG. 1F is a schematic diagram of a phased array antenna structure constructed from antenna modules according to one embodiment.

FIG. 1F is a schematic diagram of a phased array antenna structure 130 constructed from antenna modules 132 according to one embodiment. The phased array antenna structure 130 is similar to the phased array antenna structure 100 of FIG. 1D except that it is constructed of antenna modules 132. Each of the antenna modules 132 includes four rows and three columns of antenna elements 104 (and feed points, not shown in FIG. 1F). Each of the antenna modules 132 includes six antenna elements 104. As depicted in FIG. 1F, each column of antenna modules 132 is shifted with respect to an adjacent column of antenna modules 132 by one row of antenna elements 104. In other embodiments, each column of antenna modules 132 can be shifted with respect to an adjacent column of antenna modules 132 by two, three, four, or more rows of antenna elements 104.

Figure 1G:
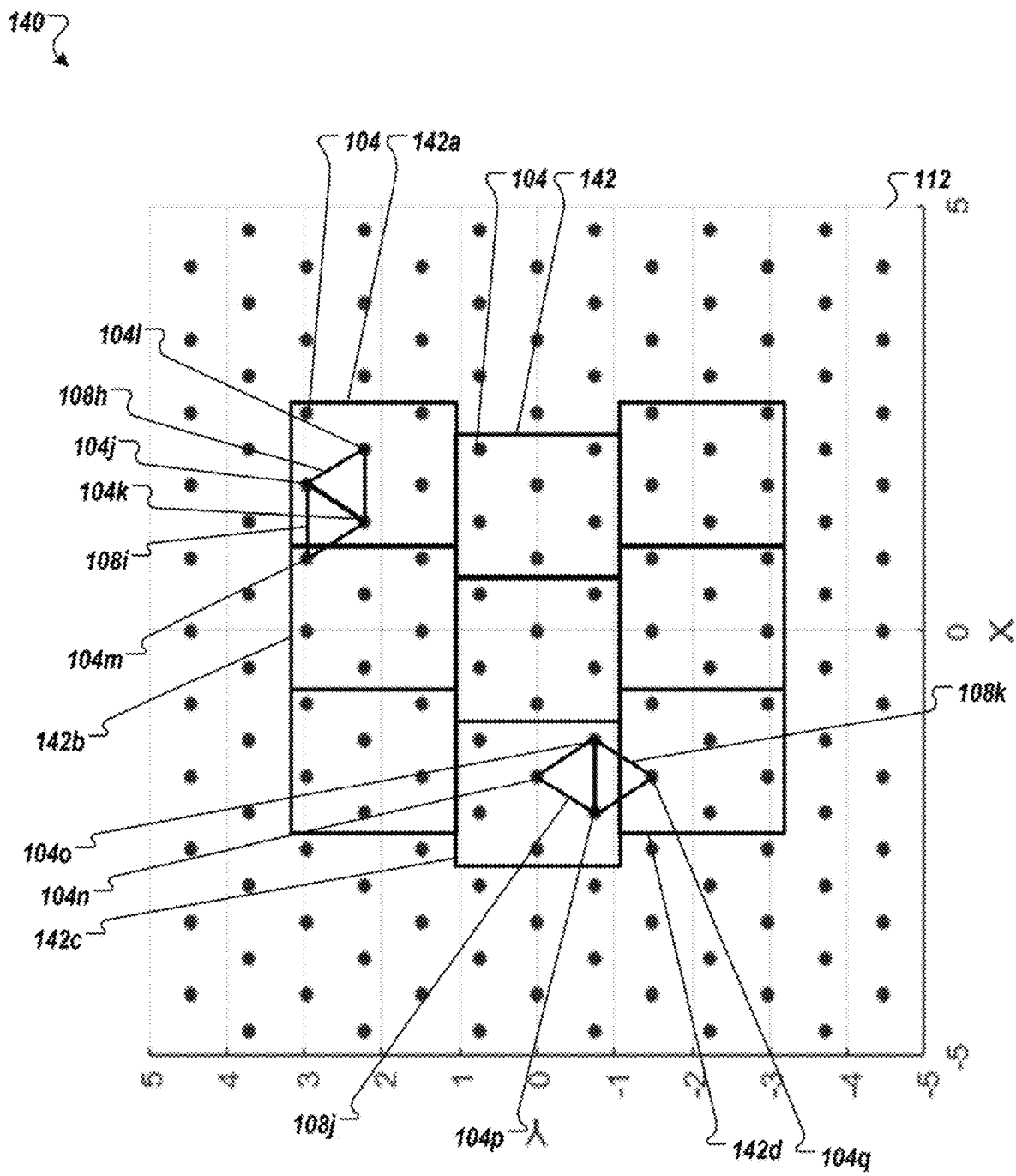
FIG. 1G is a schematic diagram of a phased array antenna structure constructed from antenna modules according to one embodiment.

FIG. 1G is a schematic diagram of a phased array antenna structure 140 constructed from antenna modules 142 according to one embodiment. The phased array antenna structure 140 is similar to the phased array antenna structure 100 of FIG. 1D except that it is constructed of antenna modules 142. In FIG. 1G, the phased array antenna structure 100 is rotated by 90 degrees with respect to the phased array antenna structure 100 of FIG. 1D. Each of the antenna modules 142 includes four rows and three columns of antenna elements 104 (and feed points, not shown in FIG. 1G). Each of the antenna modules 142 includes six antenna elements 104. As depicted in FIG. 1G, each column of antenna modules 142 is shifted with respect to an adjacent column of antenna modules 132 by one row of antenna elements 104. In other embodiments, each column of antenna modules 132 can be shifted with respect to an adjacent column of antenna modules 132 by two, three, or more rows of antenna elements 104.

The phased array antenna structure 140 includes a support structure 112. A first antenna module 142a is coupled to the support structure 212. The first antenna module 142a has a rectangle shape and a first set of antenna elements 104 disposed in a triangular arrangement within the rectangle shape. In one embodiment, the first set of antenna elements 104 is disposed on the first antenna module 202. Any two adjacent antenna elements 104 within the first antenna module 142a are spaced by a first distance. Each antenna element 104 has a first size that is less than or approximately equal to half of the first distance. Additionally, a second antenna module 142b that is identical to the first antenna module 142a is coupled to the support structure 112 and is adjacent to (in this case, below) the first antenna module 142a. The second antenna module includes a second set of antenna elements 104. An antenna element 104 of the first antenna module 142a is adjacent to and separated by at least the first distance from an antenna element 104 of the second antenna module 142b. In one embodiment the first set of antenna elements 104 of the first antenna module 142a includes a first column, a second column, and a third column of antenna elements 104. The second set of antenna elements 104 of the second antenna module 242b includes a first column, a second column, and a third column of antenna elements 104. The first column of the second antenna module 142b is aligned with the first column of the of the first antenna module 142a. The second column of the second antenna module 142b is aligned with the second column of the of the first antenna module 142a. The third column of the second antenna module 142b is aligned with the third column of the of the first antenna module 142a. The second column of the first antenna module 142a is offset from the first column and the third column of the first antenna module 142a such that a first feed point of a first antenna element 104*j* of the first column of the first antenna module 142*a*, a second feed point of a second antenna element 104*k* of the second column of the first antenna module 142*a*, and a third feed point of a third antenna element 104*l* of the second column of the first antenna module 142*a* are located to form a first equilateral triangle 108*h*. Further, the second column of the second antenna module 142*b* is offset from the first column and the third column of the second antenna module 142*b* such that the first feed point of the first antenna module 142*a*, the second feed point of the first antenna module 142*a*, and a fourth feed point of a first antenna element 104*m* of the first column of the second antenna module 142*b* are located to form a second equilateral triangle 108*i* that is identical to but inverted with respect to the first equilateral triangle 108*h*.

In another embodiment, a third antenna module 142*c* is coupled to the support structure 112 and includes a third set of antenna elements 104. The third set of antenna elements 104 includes a first column, a second column, and a third column of antenna elements 104. The second column of the third set of antenna elements 104 is offset from the first column and the third column of antenna elements of the third antenna module 142*c* such that a first feed point of a first antenna element 104*n* of the second column, a second feed point of a second antenna element 104*o* of the third column, and a third feed point of a third antenna element 104*p* of the third column are located to form a third equilateral triangle 108*j* that has the same dimensions as the first equilateral triangle 108*h*. Further, a fourth antenna module 142*d* is coupled to the support structure 112 and includes a fourth set of antenna elements 104. The fourth set of antenna elements 104 includes a first column, a second column, and a third column of antenna elements 104. The second column of the fourth set of antenna elements 104 is offset from the first column and the third column of antenna elements of the fourth antenna module 142*d* such that the second feed point of the antenna element 104*o*, the third feed point of the antenna element 104*p*, and a first feed point of a first antenna element 104*q* of the first column of the fourth antenna module 142*d* form a forth equilateral triangle 108*k* that has the same dimensions as the first equilateral triangle 108*h*.

Figure 2:
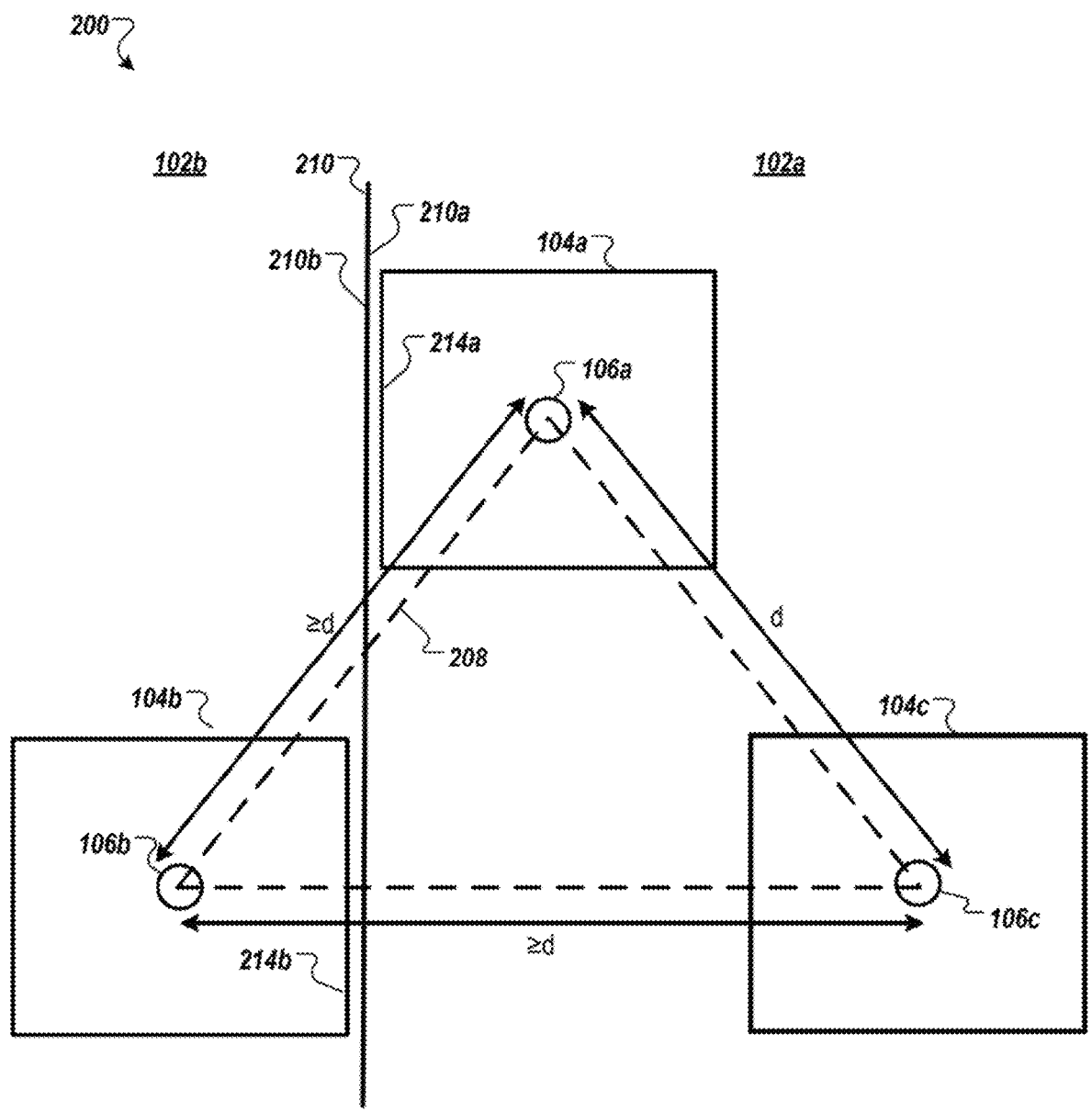
FIG. 2 is a schematic diagram of a phased array antenna structure with an edge between a first antenna module and a second antenna module according to one embodiment.

FIG. 2 is a schematic diagram of a phased array antenna structure 200 with an edge 110 between a first antenna module 202*a* and a second antenna module 102*b* according to one embodiment. Although not all components of the phased array antenna structure 200 are shown, the phased array antenna structure 200 is the same or similar to the phased array antenna structure 100 of FIG. 1D, the phased array antenna structure 120 of FIG. 1E, the phased array antenna structure 130 of FIG. 1F, or the phased array antenna structure 140 of FIG. 1G. The antenna modules 102, the antenna elements 104, the feed points 106 of FIG. 2, are the same as the antenna modules 102, the antenna elements 104, the feed points 106 of FIGS. 1A-1G. An edge 210 separates the first antenna module 102*a* from the second antenna module 102*b*. The edge 210 represents a boundary between the first antenna module 102*a* and the second antenna module 102*b*. Each antenna module 102 has its own edge. The antenna module 102*a* has an edge 210*a* and the antenna module 102*b* has an edge 210*b*. Further each antenna module 102 has at least one antenna element 104 that is the closest to the edge 210. As depicted in FIG. 2, the antenna element 104*a* is closest to the edge 210*a* of the antenna module 102*a* and the antenna element 104*b* is closest to the edge 210*b* of the antenna module 102*b*.

In the depicted embodiment, the antenna elements 104 are rectangular in shape and two sides of the rectangular shape are parallel with the edge 210. Each antenna element 104 has a size (s) that is less than half of the first distance in order to prevent any antenna element 104 from physically contacting any other adjacent antenna element 104. The antenna element 104 that is the closest to the edge 210 of the antenna module 102 has one side 214 that is the closest to the edge 210. A side 214*a* of the antenna element 104*a* is closest to the edge 210*a* and a side 214*b* of the antenna element 104*b* is closest to the edge 210*b*. The edge 210*a* and the side 214*a* are separated by a first margin (e.g., that is measured as a distance). The edge 210*b* and the side 214*b* are separated by a second margin. The first margin and the second margin can be the same or different. The first margin and the second margin are less than half of a first distance (e.g., the first distance (d) as described with respect to FIGS. 1A-1G) that separates two adjacent antenna elements 104*a* and 104*c* within the antenna module 102*a*. Two adjacent antenna elements 104 within two adjacent antenna modules 102 are separated by at least the first distance (≥d) due to the first margin and the second margin. In particular, the antenna element 104*a* is separated from the antenna element 104*b* by at least the first distance and the antenna element 104*b* is separated from the antenna element 104*c* by at least the first distance. The first margin and the second margin can be taken into account in the design and manufacturing of antenna modules 102 such that the triangle 208 is an equilateral triangle. In some other embodiments, the first margin and the second margin are not taken into account in the design and manufacturing of antenna modules 102 such that the triangle 208 is an isosceles triangle. In such a case, the isosceles triangle shape of the triangle 208 can be accounted for by a processing logic that controls the DBF for beam forming and beam steering. In some embodiments, the first margin and the second margin are sufficiently small that the triangle 208 is approximately or effectively an equilateral triangle.

In some embodiments, the antenna elements can have another shape other than rectangular, such as triangular, circular, elliptical, and the like. In these cases, the first margin and the second margin are measured as the distance between the edge 210 and the point (or side) of the antenna element that is the closest to the edge 210.

Figure 3A:
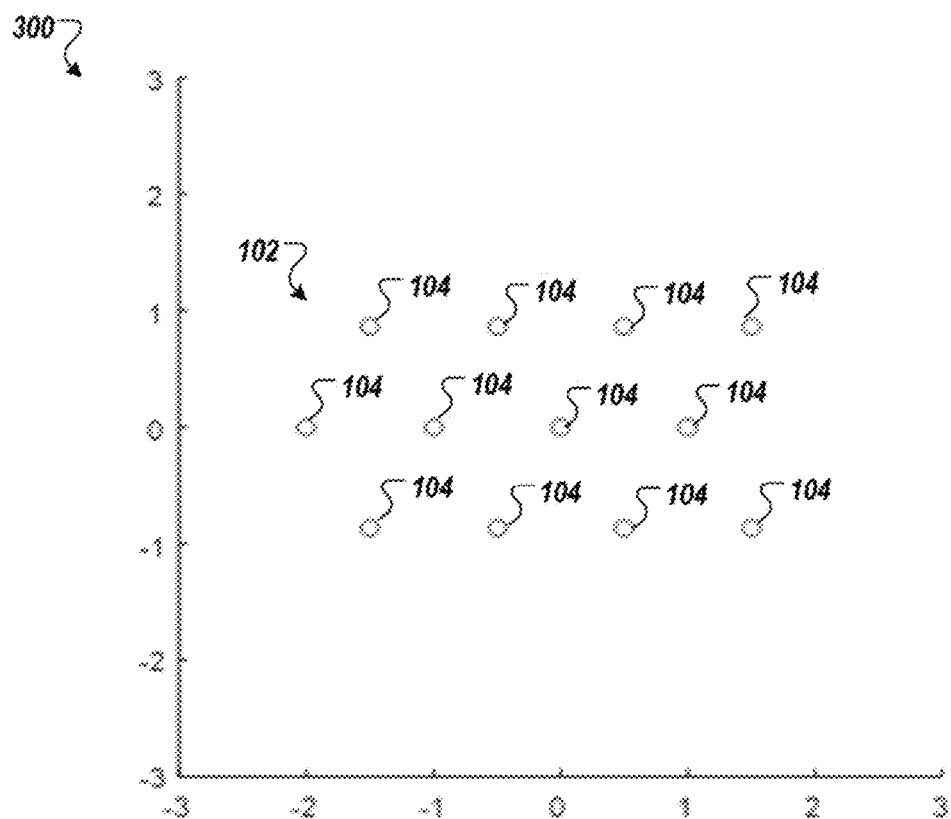
FIG. 3A is a schematic diagram of a triangular arrangement of antenna elements on an antenna module of a phased array antenna according to one embodiment.

FIG. 3A is a schematic diagram of a triangular arrangement of antenna elements 104 on an antenna module 102 of a phased array antenna structure 300 according to one embodiment. Although not all components of the phased array antenna structure 300 are shown, the phased array antenna structure 300 is the same or similar to the phased array antenna structure 100 of FIG. 1D. The antenna module 102 and the antenna elements 104 are the same as the antenna modules 102 and the antenna elements 104 of FIGS. 1A-1D.

Figure 3B:
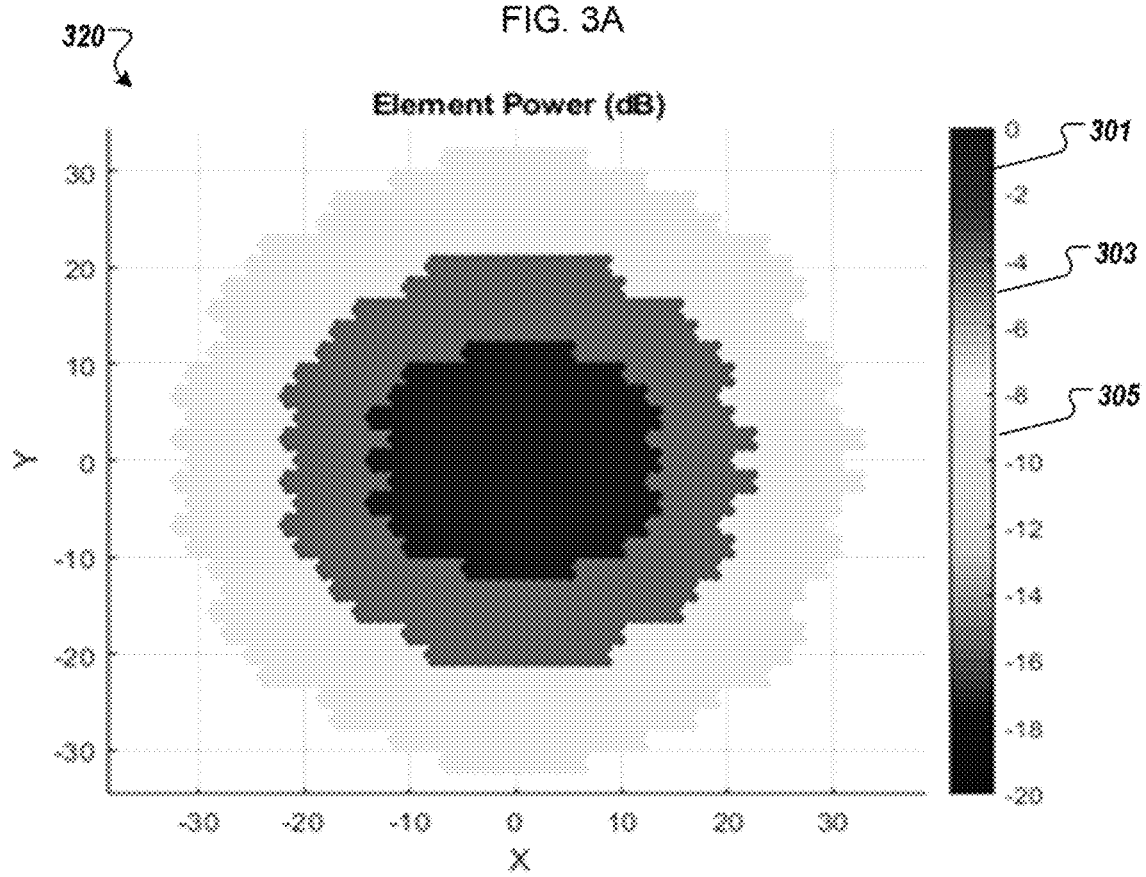
FIG. 3B is a graph of a power distribution of antenna elements of a phased array antenna structure according to one embodiment.

FIG. 3B is a graph of a power distribution 320 of antenna elements of a phased array antenna structure 300 according to one embodiment. Although not all components of the phased array antenna structure 300 are shown, the phased array antenna structure 300 is the same or similar to the phased array antenna structure 100 of FIG. 1D. The shape of the power distribution 320 represents the shape of the phased array antenna structure 300. In other words, antenna modules are arranged such that the antenna elements are organized on a triangular lattice in the same shape as the power distribution 320. In the depicted embodiments, a first set of antenna elements that are in the center of the phased array antenna structure 300 are set to a first power level 301 of between approximately 0 decibels (dB) and −2 dB, a second set antenna elements that are further out from the center of the phased array antenna structure 300 are set to a second power level 303 of between approximately −2 dB and −6 dB, and a third set antenna elements that are furthest from the center of the phased array antenna structure 300 are set to a third power level 305 of approximately −6 dB to −10 dB. Each antenna element in the first set is set to the first power level 301. Each antenna element in the second set is set to the second power level 303. Each antenna element in the third set is set to the third power level 305. In the depicted embodiment, there are 4992 antenna elements, and their respective power is tapered from the center to the edge in three steps.

Figure 3C:
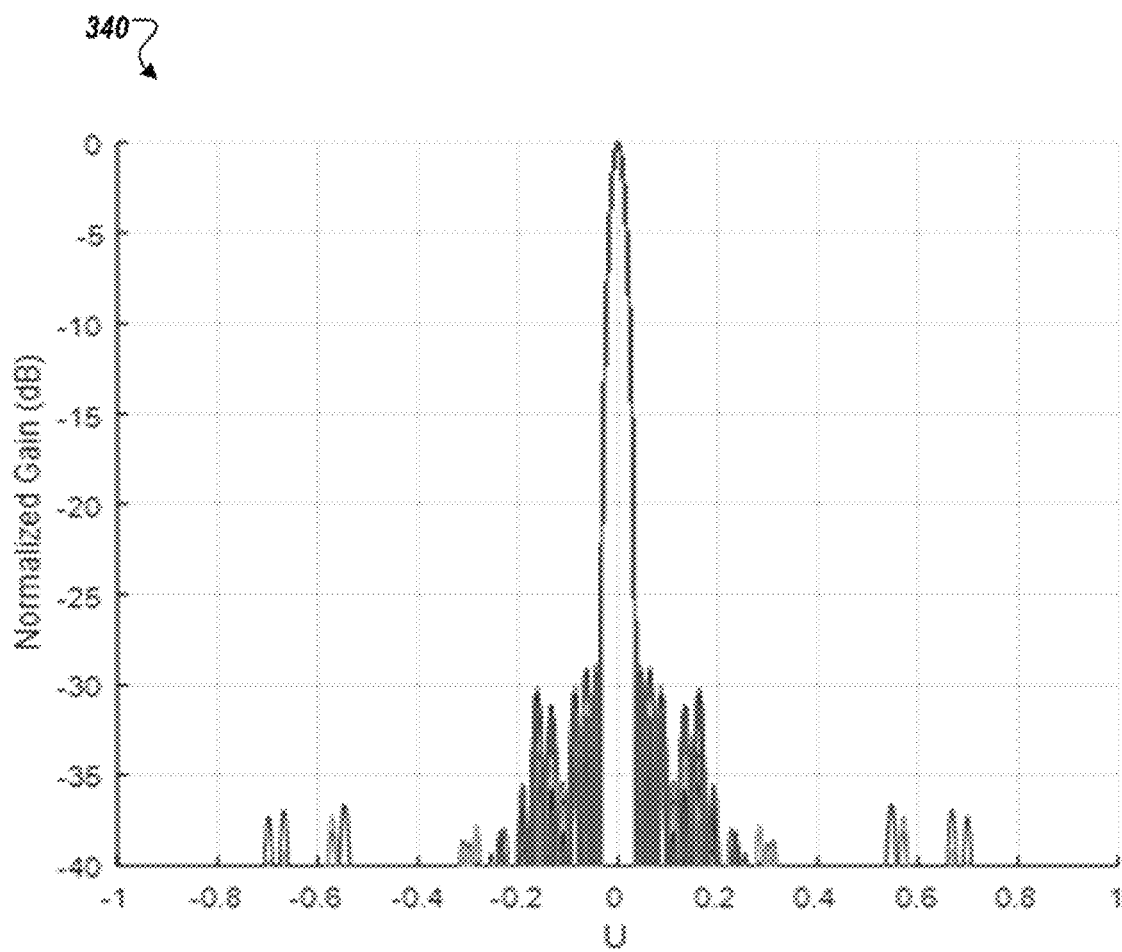
FIG. 3C is a graph of a normalized gain as a function of angle ($U=\sin(\theta)$) of a phased array antenna structure according to one embodiment.

FIG. 3C is a graph of a normalized gain 340 as a function of angle (U=sin(θ)) of a phased array antenna structure 300 according to one embodiment. Although not all components of the phased array antenna structure 300 are shown, the phased array antenna structure 300 is the same or similar to the phased array antenna structure 100 of FIG. 1D. In one embodiment, a normalized gain can be obtained by taking a Fourier transform of the power distribution 320 of FIG. 3B. The normalized gain 340 can be obtained by taking slices of the Fourier transform of the power distribution 320 and overlaying each slice. In the depicted embodiment, an array factor peak and side lobes are optimized for −29 dBc. Further, a beam profile is maximal at approximately an angle of U =0 and there are grating lobes (e.g., side lobes) at U≈±0.2 and U≈±0.5 to±0.7. This graph shows that there is a reduction in the grating lobes.

Figure 4A:
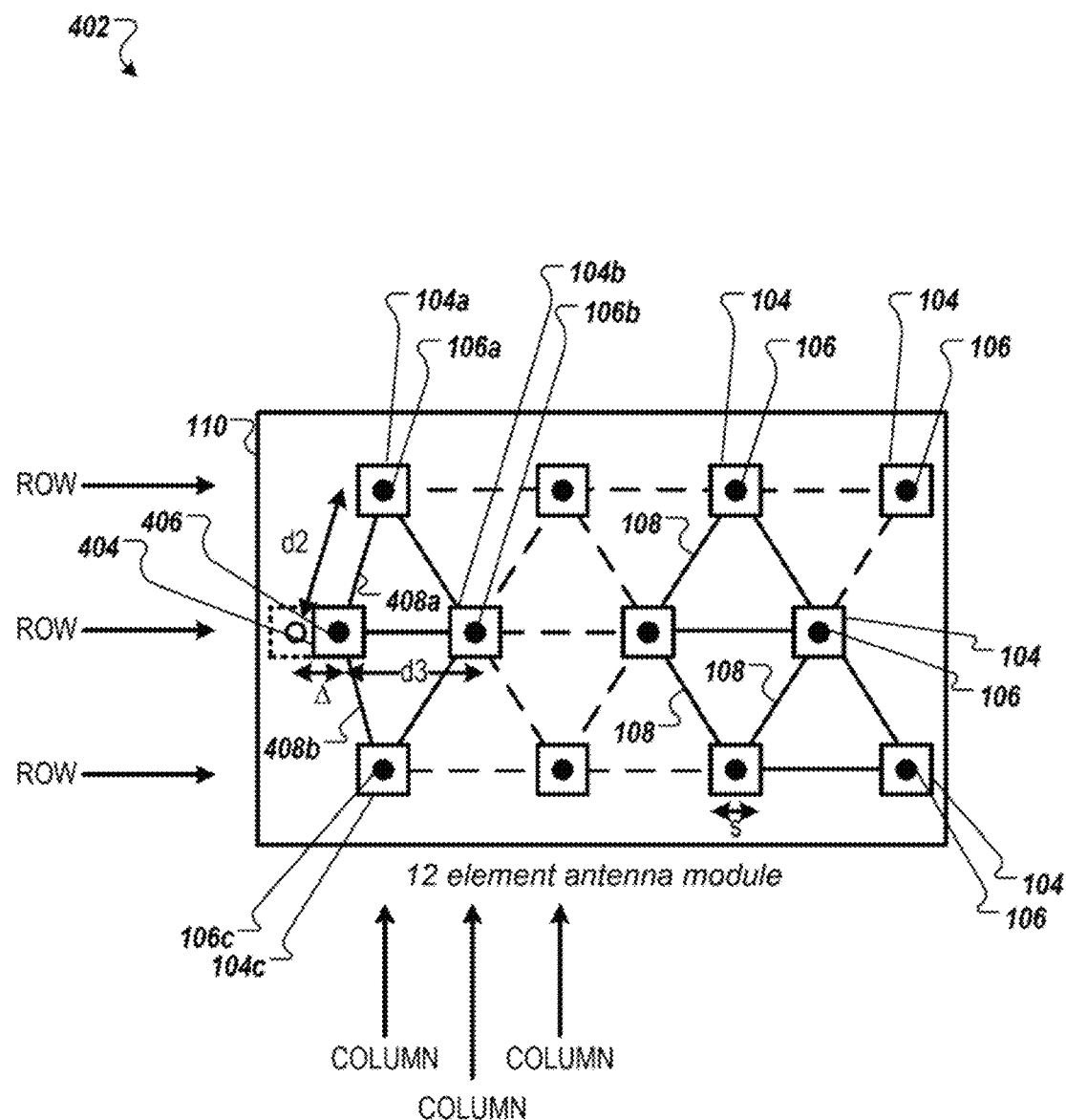
FIG. 4A is a schematic diagram of an antenna module with one shifted antenna element of a phased array antenna structure according to one embodiment.

FIG. 4A is a schematic diagram of an antenna module 402 with one shifted antenna element 404 of a phased array antenna structure according to one embodiment. The antenna module 402 is similar to the antenna module 102 of FIGS. 1A-1D except with one antenna element 404 that is shifted off of the triangular arrangement (e.g., a feed point 406 of the antenna element 404 is shifted to be off of the triangular lattice pattern). Each antenna element 104 and feed element 106 is the same as the antenna elements 104 and the feed elements 106 of FIGS. 1A-1D. The antenna elements 104 form equilateral triangles 108 as described with respect to FIGS. 1A-1D. Adjacent antenna elements 104 are separated by a first distance (d). The antenna elements 404 and the feed points 406 are identical to the antenna elements 104 and the feed points 106. In one embodiment, each feed point 106 of the antenna module 102 is located at a lattice point of an equilateral triangular lattice except a first feed point 406 of an antenna element 404 that is offset from a corresponding lattice point by an offset distance (Δ). The offset distance is a percentage value of the first distance. The antenna element 404 is adjacent to an edge 110 of the antenna module 402. In one embodiment, the triangular arrangement of the antenna elements 104 is part of at least one of a rhombic lattice (e.g., an isosceles triangular lattice), a hexagonal lattice, an equilateral triangular lattice, or a parallelogrammic lattice (e.g., a scalene triangular lattice).

In one embodiment, the antenna elements 104 and the antenna element 404 are organized as a first row, a second row, and a third row. The antenna element 404 is part of the second row. A direction of the offset of a feed point 406 of the antenna element 404 can be in a direction along the second row. The feed point 406 of the antenna element 404, a first feed point 106a of a first antenna element 104a of the first row, and a second feed point 106b of a second antenna element 104b of the second row form a first scalene triangle 408a. The feed point 406, the feed point 106b, and a feed point 106c of an antenna element 104c of the third row form a second scalene triangle 408b that has the same dimensions as but is inverted with respect to the first scalene triangle 408a. The antenna element 404 is separated from the antenna element 104a of the first row and the antenna element 104c of the third row by a second distance (d2) that is less than the first distance. The antenna element 404 is separated from the antenna element 104b of the second row by a third distance (d3) that is less than the first distance and the second distance.

In one embodiment, feed points 106 of the antenna elements 104 are located at a lattice point in a triangular lattice. The triangular lattice includes a set of lattice points and three mutually adjacent lattice points form an equilateral triangle. The feed point 406 of the antenna element 404 is offset (e.g., shifted) from a corresponding lattice point that forms an equilateral triangle with two mutually adjacent lattice point. The feed point 406 is shifted so as to increase a distance between the feed point 406 and the edge 110.

In other embodiments, the antenna element 404 can be shifted off of the triangular grid by the offset distance and by a second offset distance that is perpendicular to the offset distance. In this case, the antenna element 404 is shifted off of the second row.

Figure 4B:
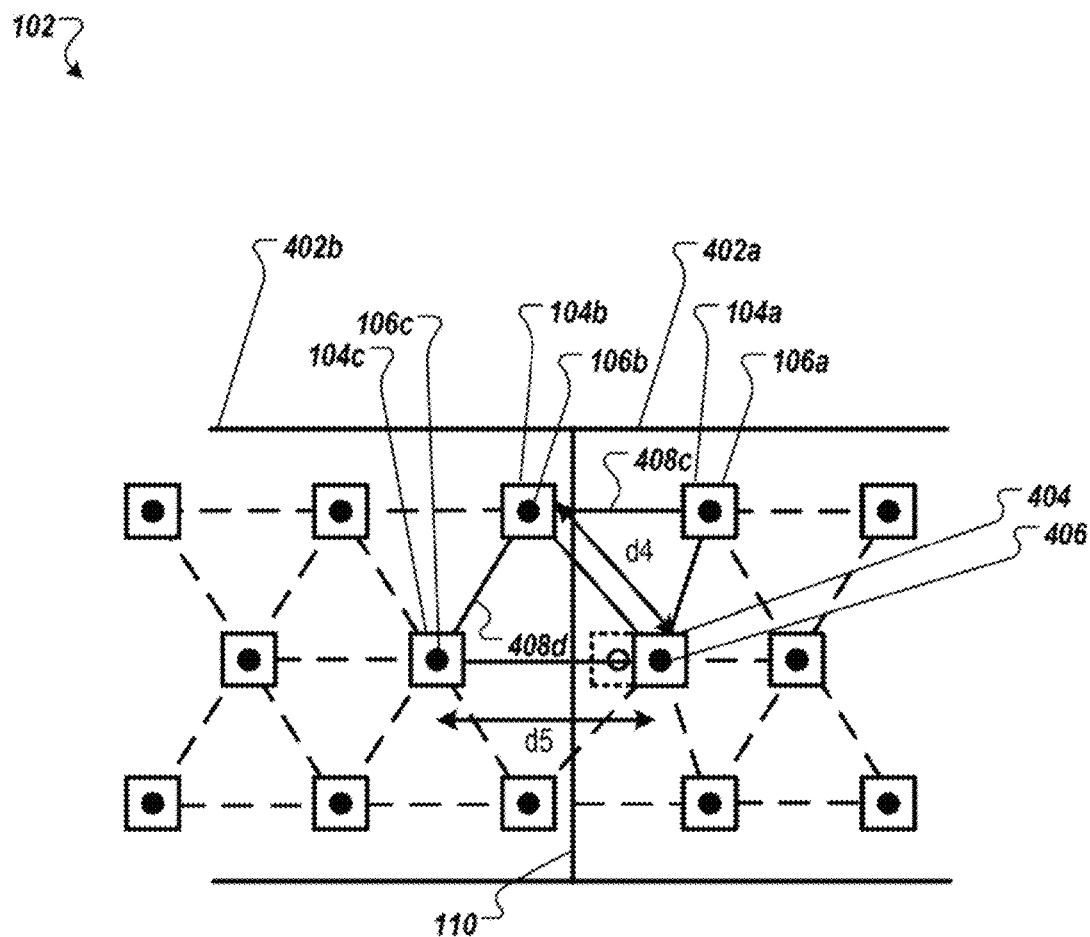
FIG. 4B is a schematic diagram of a first antenna module and a second antenna module of a phased array antenna structure according to one embodiment.

FIG. 4B is a schematic diagram of a first antenna module 402a and a second antenna module 402b of a phased array antenna structure according to one embodiment. The first antenna module 402a and the second antenna module 402b are the same as the antenna module 402 of FIG. 4A. The first antenna module 402a and the second antenna module 402b are identical, except for their position on the phased array antenna structure. As depicted, the first antenna module 402a is adjacent to (e.g., to the right of) the second antenna module 402b (which is to the left of the first antenna module 402a). Alternatively, the first antenna module 402a can be adjacent to (e.g., to the left of) the second antenna module 402b (which can be to the right of the first antenna module 402a). The first antenna module 402a and the second antenna module 402b share an edge 110. In one embodiment, the first antenna module 402a and the second antenna module 402b are coupled to a support structure (not shown in FIG. 4B) of a phased array antenna structure.

In a further embodiment, a first row of antenna elements 104 of the second antenna module 402b is aligned with a first row of antenna elements 104 of the first antenna module 402a, a second row of antenna elements of the second antenna module 402b is aligned with a second row of antenna elements 104 and antenna element 404 of the first antenna module 402a, and a third row of antenna elements 104 of the second antenna module 402b is aligned with a third row of antenna elements 104 of the first antenna module 402a. A feed point 406 of the antenna element 404 of the second row of the first antenna module 402a, a feed point 106a of the antenna element 104a of the first row of the first antenna module 402a, and a feed point 106b of an antenna element 104b of the first row of the second antenna module 402b are located to form a first scalene triangle 408c. Further, the feed point 406, the feed point 106b, and a feed point 106c of an antenna element 104c of the second row of the second antenna module 402b form a second scalene triangle 408d. Each feed point 106 of the antenna elements 104 are part of a triangular lattice pattern of feed points with offset feed points 406 of the antenna elements 404 of the phased array antenna structure.

In one embodiment, the antenna element 404 of the second row of the first antenna module 402a is separated from the antenna element 104b of the first row of the second antenna module 402b by a fourth distance (d4). The antenna element 404 is separated from the antenna element 104c of the second row of the second antenna module 402b by a fifth distance (d5). The fourth distance and the fifth distance are larger than the first distance (d) as described with respect to FIGS. 1A-1D. The fifth distance is larger than the fourth distance.

Figure 4C:
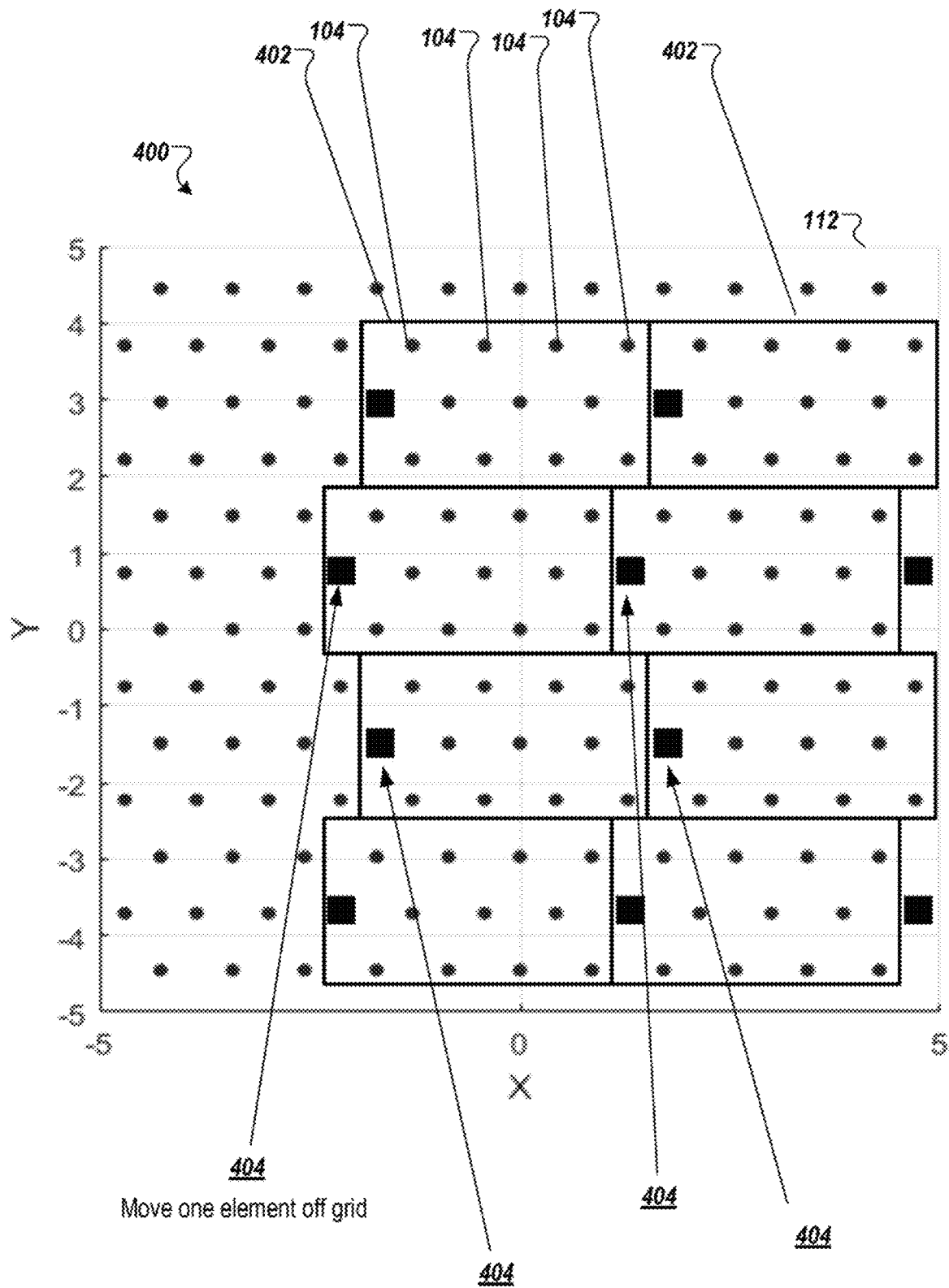
FIG. 4C is a schematic diagram of a phased array antenna structure constructed from antenna modules with one shifted antenna element according to one embodiment.

FIG. 4C is a schematic diagram of a phased array antenna structure 400 constructed from antenna modules 402 with one shifted antenna element 404a according to one embodiment. Although not all components of the antenna modules 402 are shown, the antenna modules 402 are the same or similar to the antenna modules 402 of FIGS. 4A-4B. In particular and for simplicity, the points represent the antenna elements 104 and 404, and the feed points 106 and 406 are not shown in FIG. 4C. The phased array antenna structure 100 includes a support structure 112. Each antenna element 104 that is not adjacent to an antenna element 404 is located to form an equilateral triangle with corresponding adjacent antenna elements 104. Antenna elements 104 that are adjacent to a shifted antenna element 404 are located to form scalene triangles as described with respect to FIGS. 4A-4B. The antenna elements 404 are represented as squares and the antenna elements 104 are represented as circles in FIG. 4C.

As depicted in FIG. 4C, each antenna module 402 of the phased array antenna structure 400 includes three rows and eight columns of antenna elements 104, and twelve total antenna elements (e.g., eleven antenna elements 104 and one antenna element 404). However, in other embodiments, antenna modules can have a different number of rows and columns of antenna elements as well as a different number of total antenna elements (e.g., a different number of antenna elements 104 and a different number of antenna elements 404).

In one embodiment, the phased array antenna structure 400 includes 4992 antenna elements and each antenna module 402 includes eleven antenna elements 104 and one antenna element 404, therefore the phased array antenna structure 400 includes 416 antenna modules 402. It should be noted that FIG. 4C does not show every antenna element of the phased array antenna structure 400.

In one embodiment, a RF module circuit is coupled to the phased array antenna, including the antenna modules 402, via the RFFE circuitry. Alternatively, a microwave radio or other signal source can be coupled to the antenna modules 402. Each of the antenna modules 402 can be coupled physically to the support structure and electrically coupled to a communication system, such as RF radio or a microwave radio. The antenna modules 402 can be coupled to a circuit board or other types of support structures.

Figure 5A:
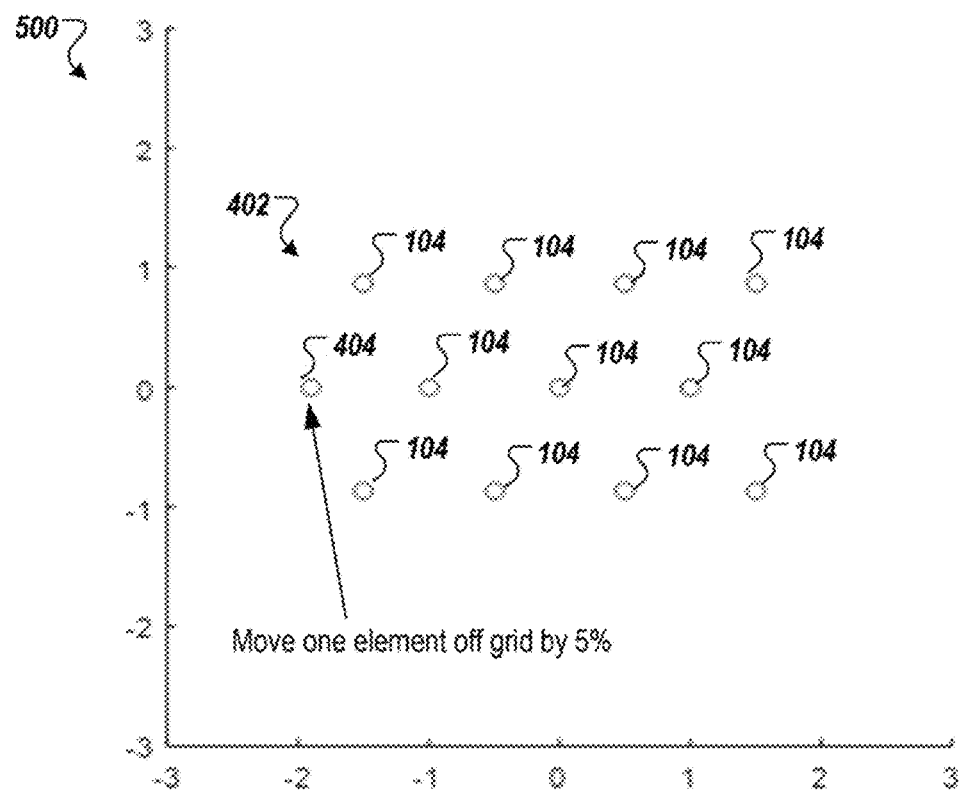
FIG. 5A is a schematic diagram of a triangular arrangement of antenna elements 104 with one offset antenna element on an antenna module of a phased array antenna according to one embodiment.

FIG. 5A is a schematic diagram of a triangular arrangement of antenna elements 104 with one offset antenna element 404 on an antenna module 402 of a phased array antenna structure 500 according to one embodiment. Although not all components of the phased array antenna structure 500 are shown, the phased array antenna structure 500 is the same or similar to the phased array antenna structure 400 of FIG. 4C. The antenna module 402 and the antenna elements 404 are the same as the antenna modules 402 and the antenna elements 404 of FIGS. 4A-4C. The antenna elements 104 are the same as the antenna elements 104 of FIGS. 1A-1D. In the depicted embodiment, the offset distance (Δ) is five percent (5%) of the first distance (d) (e.g., as described with respect to FIGS. 1A-1D).

Figure 5B:
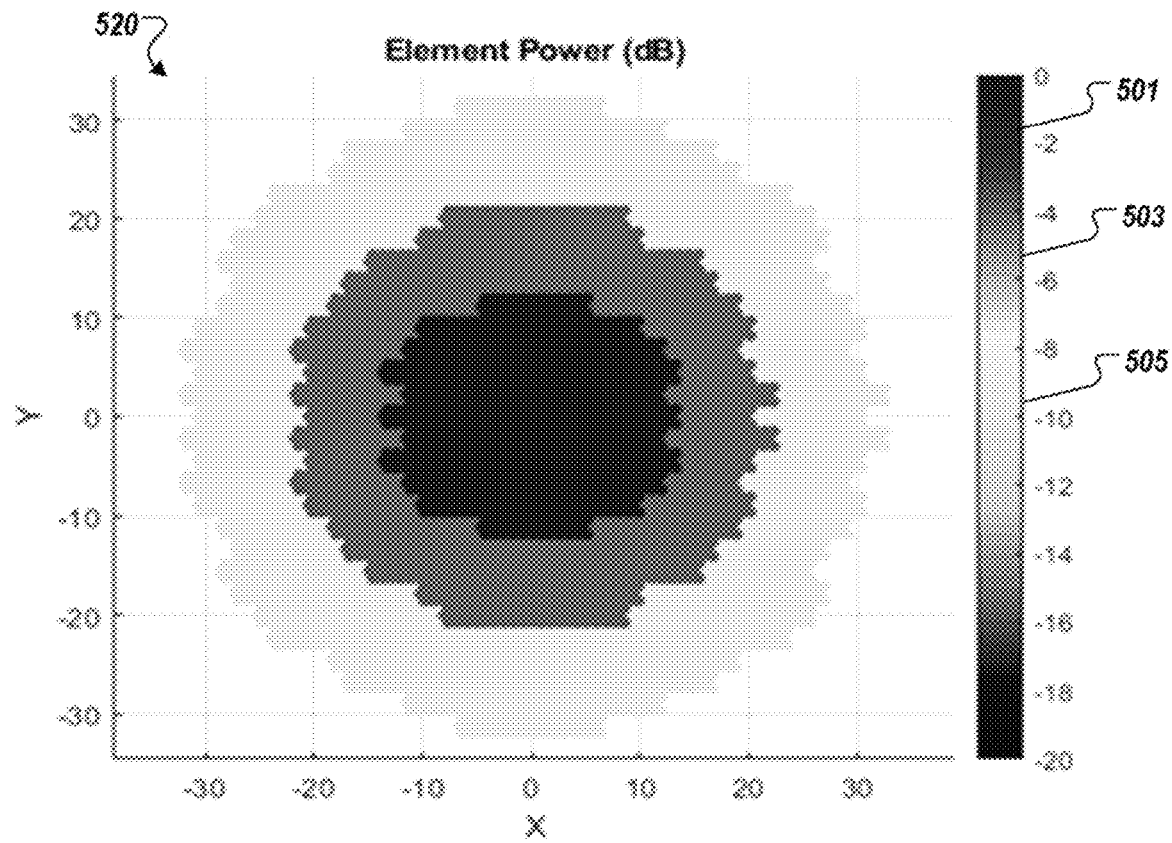
FIG. 5B is a graph of a power distribution of antenna elements of the phased array antenna structure according to one embodiment.

FIG. 5B is a graph of a power distribution 520 of antenna elements of the phased array antenna structure 500 according to one embodiment. Although not all components of the phased array antenna structure 500 are shown, the phased array antenna structure 500 is the same or similar to the phased array antenna structure 400 of FIG. 4C. The shape of the power distribution 520 represents the shape of the phased array antenna structure 400. In other words, antenna modules are arranged such that the antenna elements are organized on a triangular lattice in the same shape as the power distribution 520. In the depicted embodiments, a first set of antenna elements that are in the center of the phased array antenna structure 500 are set to a first power level 501 of between approximately 0 dB and −2 dB, a second set antenna elements that are further out from the center of the phased array antenna structure 500 are set to a second power level 503 of between approximately −2 dB and −6 dB, and a third set antenna elements that are furthest from the center of the phased array antenna structure 500 are set to a third power level 505 of approximately −6 dB to −10 dB. Each antenna element in the first set is set to the first power level 501. Each antenna element in the second set is set to the second power level 503. Each antenna element in the third set is set to the third power level 505. In the depicted embodiment, there are 4992 antenna elements, and their respective power is tapered from the center to the edge in three steps.

Figure 5C:
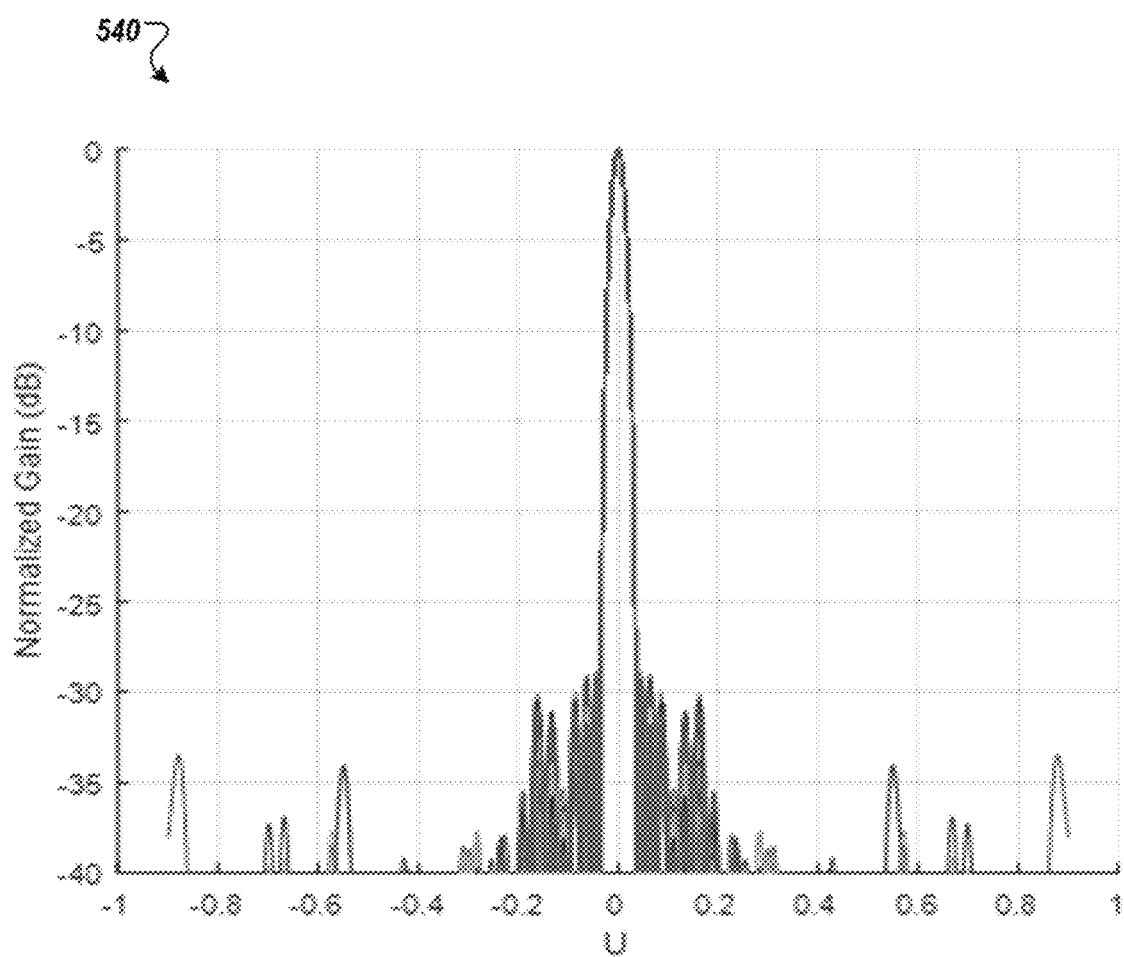
FIG. 5C is a graph of a normalized gain as a function of angle of a phased array antenna structure according to one embodiment.

FIG. 5C is a graph of a normalized gain 540 as a function of angle (U=sin(θ)) of a phased array antenna structure 500 according to one embodiment. Although not all components of the phased array antenna structure 500 are shown, the phased array antenna structure 500 is the same or similar to the phased array antenna structure 400 of FIG. 4C. In one embodiment, a normalized gain can be obtained by taking a Fourier transform of the power distribution 520 of FIG. 5B. The normalized gain 540 can be obtained by taking slices of the Fourier transform of the power distribution 520 and overlaying each slice. In the depicted embodiment, an array factor peak is 36.3 dBi and side lobes are optimized for −29 dBc. Further, a beam profile is maximal at approximately U=0 and there are grating lobes (e.g., side lobes) at U≈±0.2 and U≈±0.5 to ±0.9.

Figure 6A:
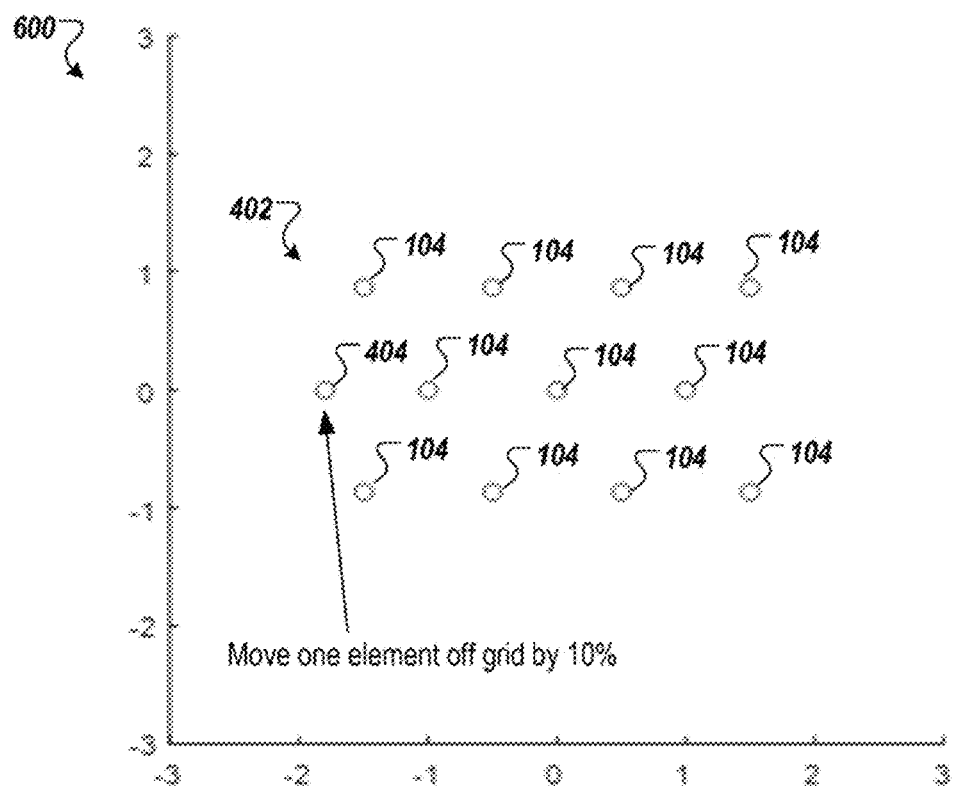
FIG. 6A is a schematic diagram of a triangular arrangement of antenna elements with one offset antenna element on an antenna module of a phased array antenna according to one embodiment.

FIG. 6A is a schematic diagram of a triangular arrangement of antenna elements 104 with one offset antenna element 404 on an antenna module 402 of a phased array antenna structure 600 according to one embodiment. Although not all components of the phased array antenna structure 600 are shown, the phased array antenna structure 600 is the same or similar to the phased array antenna structure 400 of FIG. 4C. The antenna module 402 and the antenna elements 404 are the same as the antenna modules 402 and the antenna elements 404 of FIGS. 4A-4C. The antenna elements 104 are the same as the antenna elements 104 of FIGS. 1A-1D. In the depicted embodiment, the offset distance (Δ) is ten percent (10%) of the first distance (d) (e.g., as described with respect to FIGS. 1A-1D). In other embodiments, the offset distance can be another percent of the first distance that does not result in two antenna elements overlapping.

Figure 6B:
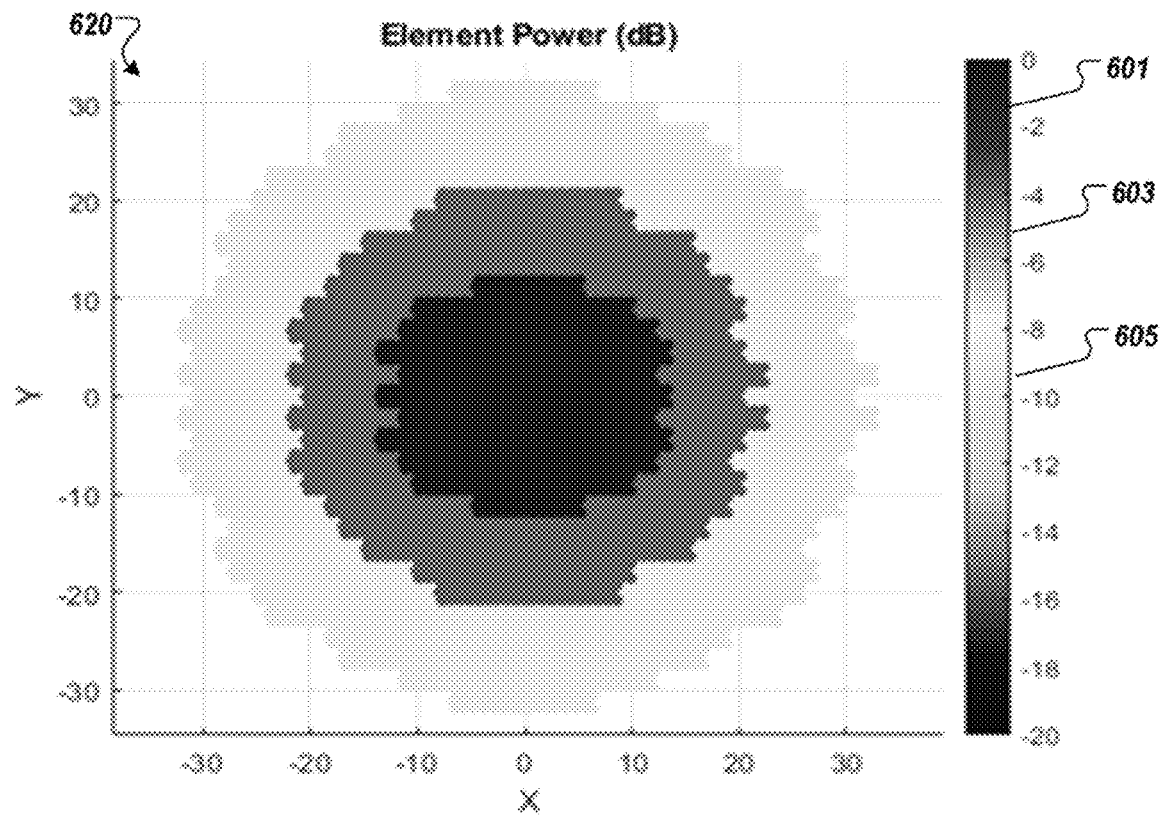
FIG. 6B is a graph of a power distribution of antenna elements of the phased array antenna structure according to one embodiment.

FIG. 6B is a graph of a power distribution 620 of antenna elements of the phased array antenna structure 600 according to one embodiment. Although not all components of the phased array antenna structure 600 are shown, the phased array antenna structure 600 is the same or similar to the phased array antenna structure 400 of FIG. 4C. The shape of the power distribution 620 represents the shape of the phased array antenna structure 400. In other words, antenna modules are arranged such that the antenna elements are organized on a triangular lattice in the same shape as the power distribution 620. In the depicted embodiments, a first set of antenna elements that are in the center of the phased array antenna structure 600 are set to a first power level 601 of between approximately 0 dB and −2 dB, a second set antenna elements that are further out from the center of the phased array antenna structure 500 are set to a second power level 603 of between approximately −2 dB and −6 dB, and a third set antenna elements that are furthest from the center of the phased array antenna structure 600 are set to a third power level 605 of approximately −6 dB to −10 dB. Each antenna element in the first set is set to the first power level 601. Each antenna element in the second set is set to the second power level 603. Each antenna element in the third set is set to the third power level 605. In the depicted embodiment, there are 4992 antenna elements, and their respective power is tapered from the center to the edge in three steps.

Figure 6C:
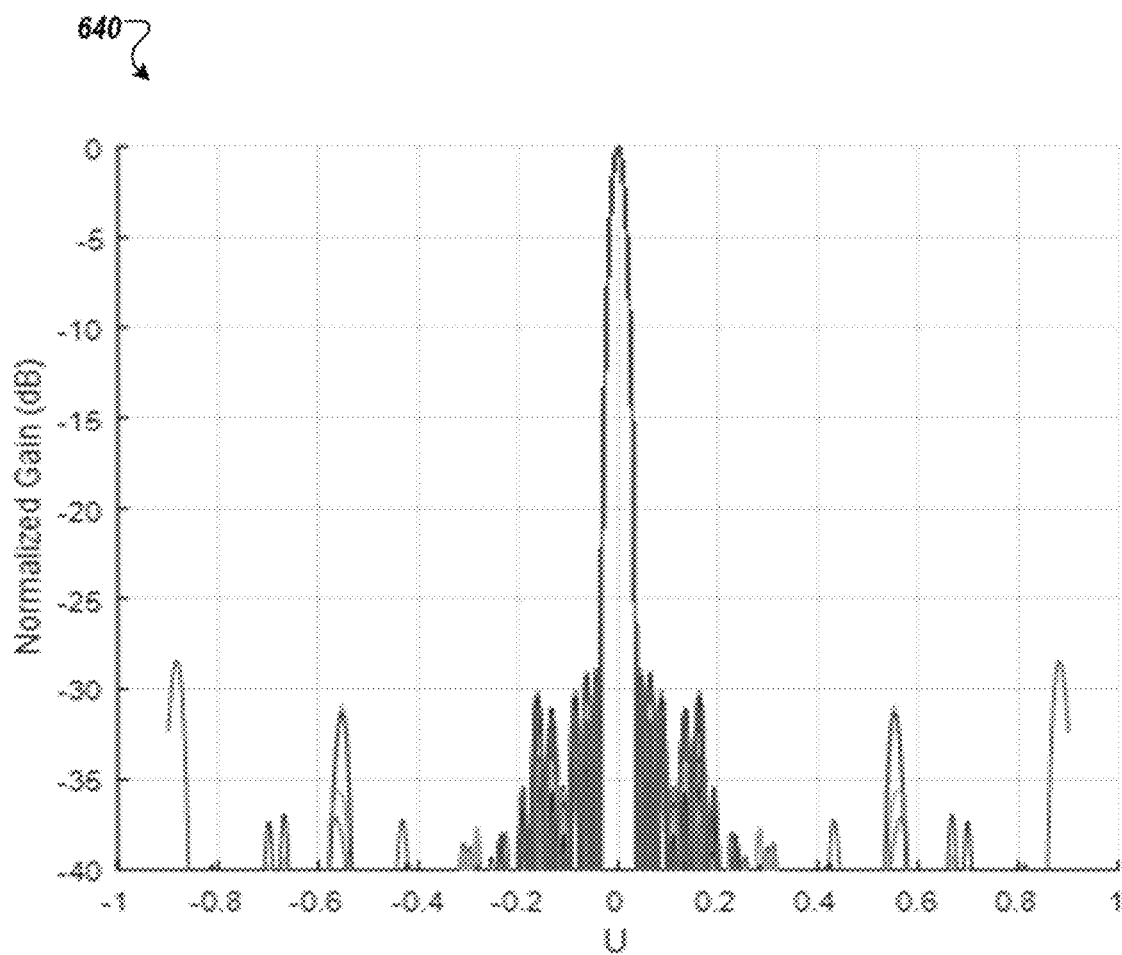
FIG. 6C is a graph of a normalized gain as a function of angle of a phased array antenna structure according to one embodiment.

FIG. 6C is a graph of a normalized gain 640 as a function of angle ($U=\sin(\theta)$) of a phased array antenna structure 600 according to one embodiment. Although not all components of the phased array antenna structure 600 are shown, the phased array antenna structure 600 is the same or similar to the phased array antenna structure 400 of FIG. 4C. In one embodiment, a normalized gain can be obtained by taking a Fourier transform of the power distribution 620 of FIG. 6B. The normalized gain 640 can be obtained by taking slices of the Fourier transform of the power distribution 620 and overlaying each slice. In the depicted embodiment, an array factor peak is 36.3 dBi and side lobes are optimized for −29 dBc. Further, a beam profile is maximal at approximately $U=0$ and there are grating lobes (e.g., side lobes) at $U\approx\pm0.2$ and $U\approx\pm0.5$ to $\pm1$.

Figure 7A:
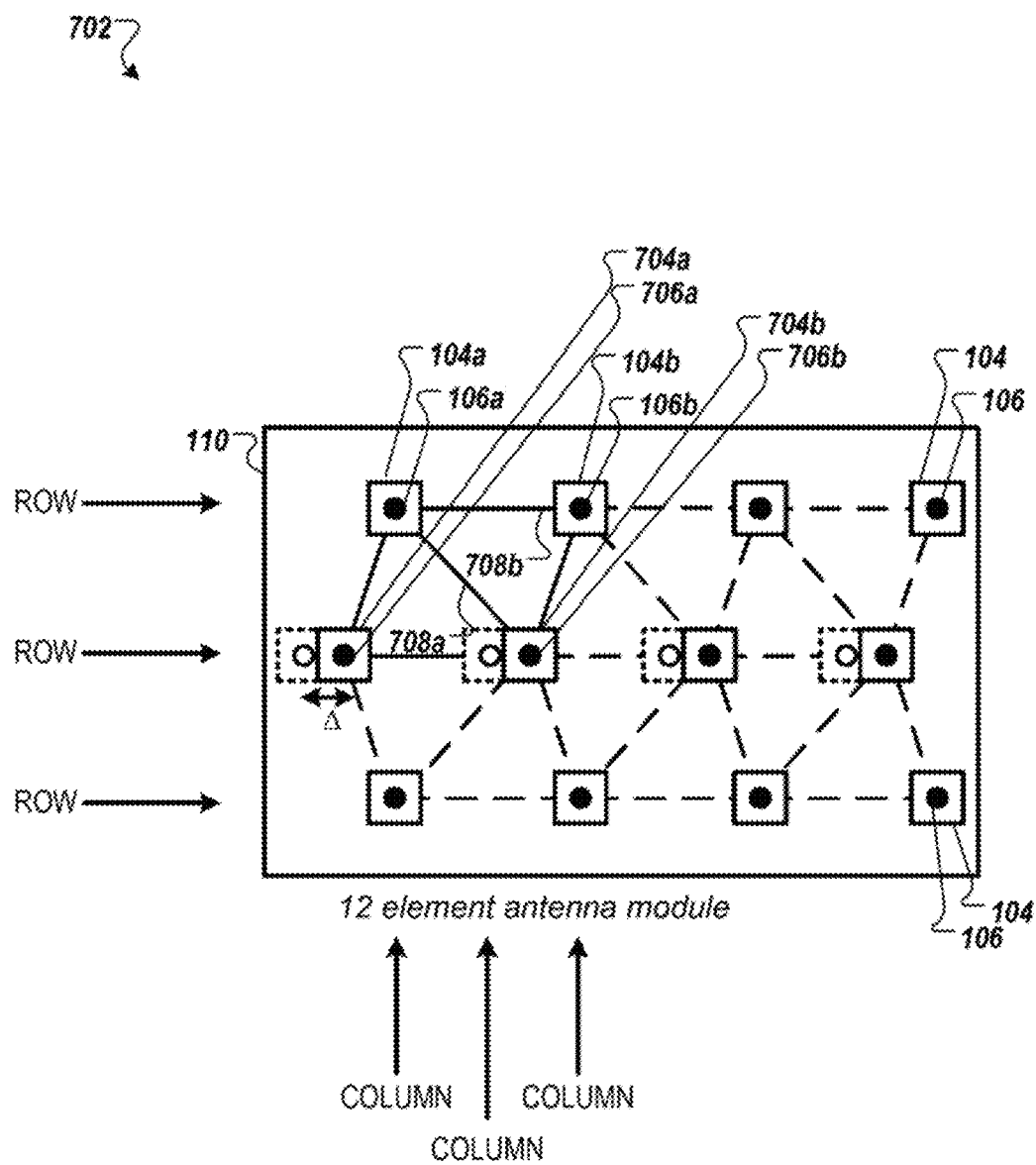
FIG. 7A is a schematic diagram of an antenna module with one row of shifted antenna elements of a phased array antenna structure according to one embodiment.

FIG. 7A is a schematic diagram of an antenna module 702 with one row of shifted antenna elements 704 of a phased array antenna structure according to one embodiment. The antenna module 702 is similar to the antenna module 102 of FIGS. 1A-1D except with one row of antenna elements 704 that is shifted off of the triangular arrangement (e.g., a row of feed points 706 of the antenna elements 704 is shifted to be off of the triangular lattice pattern). Each antenna element 104 and feed element 106 is the same as the antenna elements 104 and the feed elements 106 of FIGS. 1A-1D. Antenna elements 104 are separated by a first distance (d) from adjacent elements within the same row. Antenna elements 704 are separated by the first distance from adjacent antenna elements 704. The antenna elements 704 and the feed points 706 are identical to the antenna elements 104 and the feed points 106. In one embodiment, each feed point 106 of the antenna module 102 is located at a lattice point of an equilateral triangular lattice except a row of feed points 706 of antenna elements 704 that is offset from a corresponding lattice point by an offset distance (Δ). The offset distance is a percentage value of the first distance. The row of antenna elements 704 is adjacent to an edge 110 of the antenna module 702. A direction of the offset of antenna elements 704 can be in a direction along the row of antenna elements 704.

In one embodiment, the triangular arrangement of the antenna elements 104 is part of at least one of a rhombic lattice (e.g., an isosceles triangular lattice), a hexagonal lattice, an equilateral triangular lattice, or a parallelogrammic lattice (e.g., a scalene triangular lattice).

In one embodiment, the antenna elements 104 and the antenna elements 704 are organized as a first row, a second row, and a third row. The first row includes antenna elements 104. The second row includes antenna elements 704. The third row includes antenna elements 104. A first feed point 106*a* of a first antenna element 104*a* of the first row, a first feed point 706*a* of a first antenna element 704*a* of the second row, and a second feed point 706*b* of a second antenna element 704*b* of the second row are located to form a first scalene triangle 708*a*. The first antenna element 704*a* is separated from the second antenna element 704*b* by the first distance. The first antenna element 704*a* is separated from the first antenna element 104 by a second distance. The first antenna element 104*a* is separated from the second antenna element 704*b* by a third distance. The first distance, the second distance, and the third distance are all different. Further, the first feed point 106*a*, a second feed point 106*b* of a second antenna element 104*b* of the first row, and the second feed point 706*b* are located to form a second scalene triangle 708*b* with the same dimensions as, but inverted with respect to, the first scalene triangle 708*a*.

In one embodiment, feed points 106 of the antenna elements 104 are located at a lattice point in a triangular lattice. The triangular lattice includes a set of lattice points and three mutually adjacent lattice points form an equilateral triangle. The feed points 706 of the antenna elements 704 are arranged in a row that is offset from a corresponding row of lattice points that form an equilateral triangle with two mutually adjacent lattice points of the plurality of lattice points. The offset is a percentage value of the first distance. The row is shifted so as to increase a distance between the feed point 706*a* and the edge 110. In other words, a direction of the offset is along the shifted row.

Figure 7B:
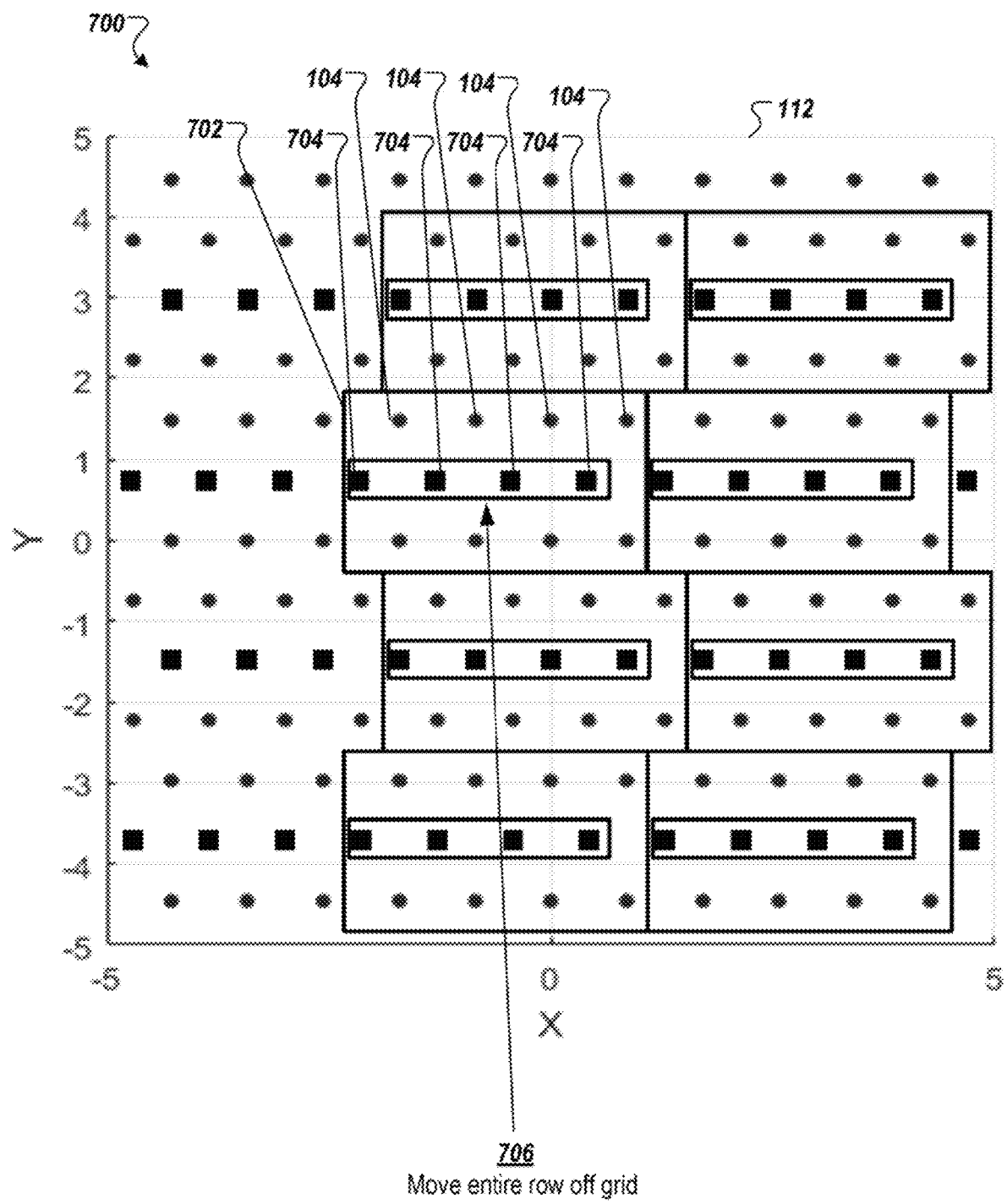
FIG. 7B is a schematic diagram of a phased array antenna structure constructed from antenna modules with one shifted row of antenna elements according to one embodiment.

FIG. 7B is a schematic diagram of a phased array antenna structure 700 constructed from antenna modules 702 with one shifted row of antenna elements 704 according to one embodiment. Although not all components of the antenna modules 702 are shown, the antenna modules 702 are the same or similar to the antenna modules 702 of FIG. 7A. In particular and for simplicity, the points represent the antenna elements 104 and 704, and the feed points 106 and 706 are not shown in FIG. 7B. The phased array antenna structure 700 includes a support structure 112. Sets of three adjacent antenna elements 104 are located to form an equilateral triangle with corresponding adjacent antenna elements 104. Sets of three adjacent antenna elements including one antenna element 104 and two antenna elements 704 are located to form a scalene triangle. Sets of adjacent antenna elements including two antenna elements 104 and one antenna element 704 are located to form a scalene triangle. The antenna elements 704 are represented as squares and the antenna elements 104 are represented as circles in FIG. 7B.

As depicted in FIG. 7B, each antenna module 702 of the phased array antenna structure 700 includes three rows and eight columns of antenna elements 104, and twelve total antenna elements (e.g., eight antenna elements 104 and four antenna elements 704). However, in other embodiments, antenna modules can have a different number of rows and columns of antenna elements as well as a different number of total antenna elements (e.g., a different number of antenna elements 104 and a different number of antenna elements 704).

In one embodiment, the phased array antenna structure 700 includes 4992 antenna elements and each antenna module 702 includes eight antenna elements 104 and four antenna elements 704, therefore the phased array antenna structure 700 includes 416 antenna modules 702. It should be noted that FIG. 7B does not show every antenna element of the phased array antenna structure 700.

In one embodiment, a RF module circuit is coupled to the phased array antenna, including the antenna modules 702, via RFFE circuitry. Alternatively, a microwave radio or other signal source can be coupled to the antenna modules 702. Each of the antenna modules 702 can be coupled physically to the support structure and electrically coupled to a communication system, such as RF radio or a microwave radio. The antenna modules 702 can be coupled to a circuit board or other types of support structures.

Figure 8A:
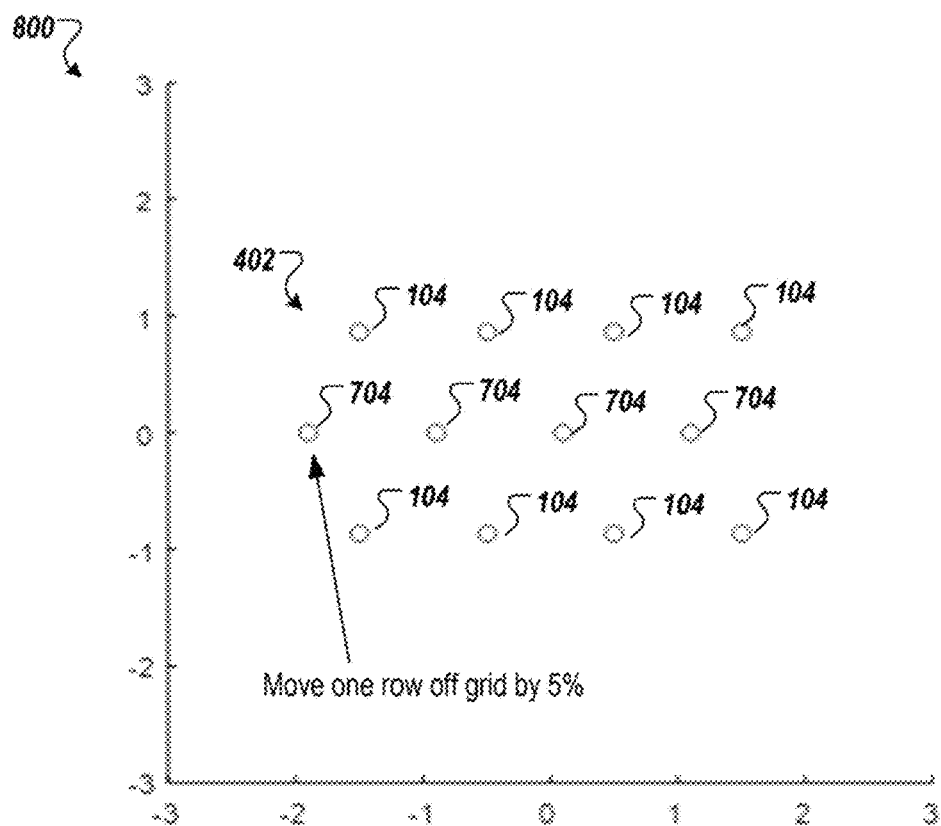
FIG. 8A is a schematic diagram of a triangular arrangement of antenna elements with one row offset antenna elements on an antenna module of a phased array antenna according to one embodiment.

FIG. 8A is a schematic diagram of a triangular arrangement of antenna elements 104 with one row offset antenna elements 704 on an antenna module 702 of a phased array antenna structure 800 according to one embodiment. Although not all components of the phased array antenna structure 800 are shown, the phased array antenna structure 800 is the same or similar to the phased array antenna structure 700 of FIG. 7B. The antenna module 702 and the antenna elements 704 are the same as the antenna modules 702 and the antenna elements 704 of FIGS. 7A-7B. The antenna elements 104 are the same as the antenna elements 104 of FIGS. 1A-1D. In the depicted embodiment, the offset distance ($\Delta$) is five percent (5%) of the first distance (d) (e.g., as described with respect to FIGS. 1A-1D).

Figure 8B:
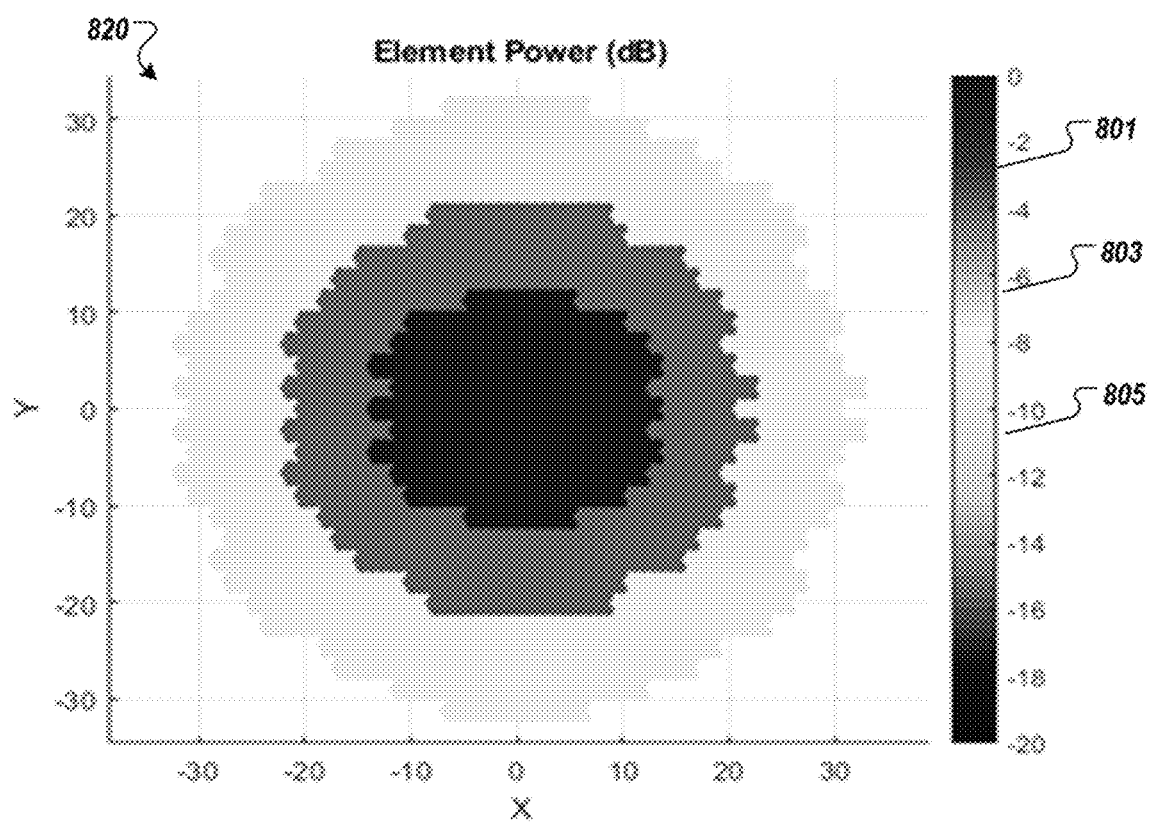
FIG. 8B is a graph of a power distribution of antenna elements of the phased array antenna structure according to one embodiment.

FIG. 8B is a graph of a power distribution 820 of antenna elements of the phased array antenna structure 800 according to one embodiment. Although not all components of the phased array antenna structure 800 are shown, the phased array antenna structure 800 is the same or similar to the phased array antenna structure 700 of FIG. 7B. The shape of the power distribution 820 represents the shape of the phased array antenna structure 800. In other words, antenna modules are arranged such that the antenna elements are organized on a triangular lattice in the same shape as the power distribution 820. In the depicted embodiments, a first set of antenna elements that are in the center of the phased array antenna structure 800 are set to a first power level 801 of between approximately 0 dB and −2 dB, a second set antenna elements that are further out from the center of the phased array antenna structure 800 are set to a second power level 803 of between approximately −2 dB and −6 dB, and a third set antenna elements that are furthest from the center of the phased array antenna structure 800 are set to a third power level 805 of approximately −6 dB to −10 dB. Each antenna element in the first set is set to the first power level 801. Each antenna element in the second set is set to the second power level 803. Each antenna element in the third set is set to the third power level 805. In the depicted embodiment, there are 4992 antenna elements, and their respective power is tapered from the center to the edge in three steps.

Figure 8C:
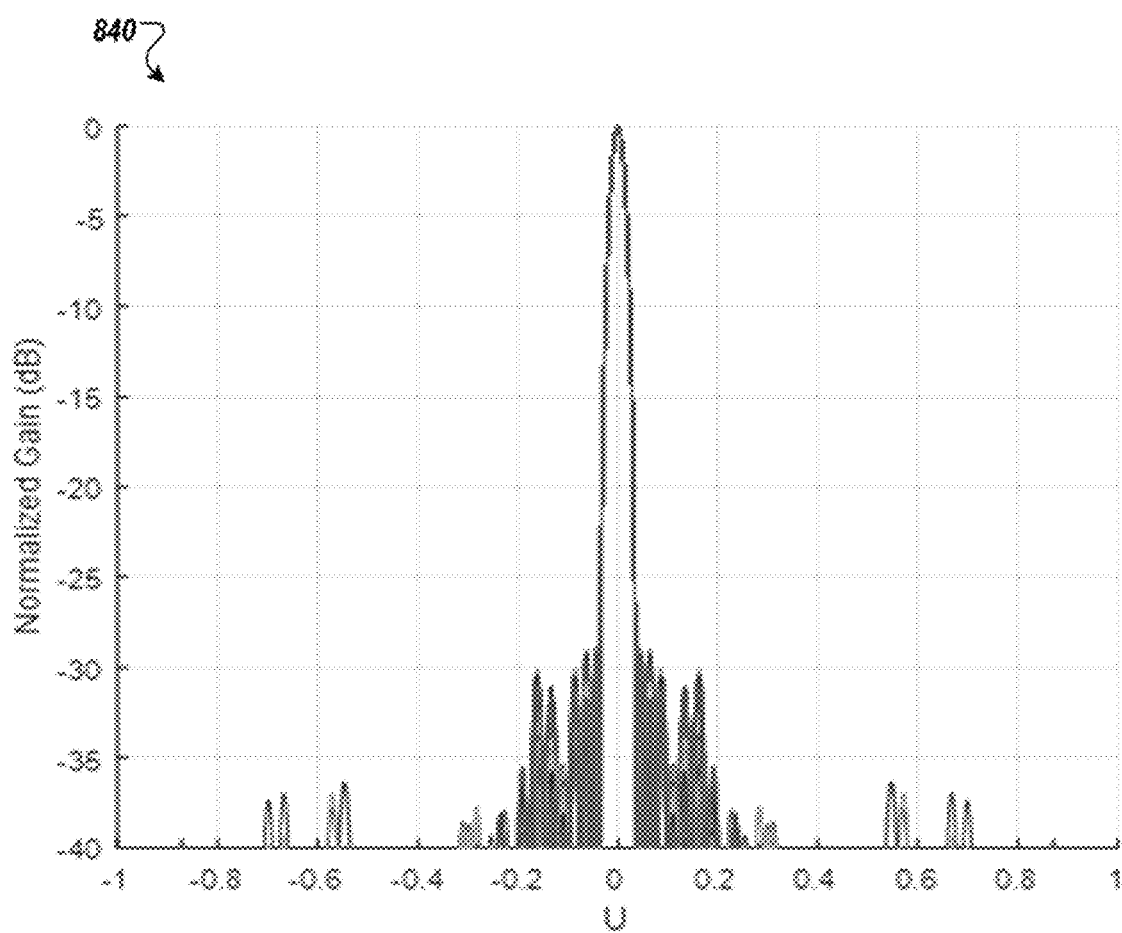
FIG. 8C is a graph of a normalized gain as a function of U of a phased array antenna structure according to one embodiment.

FIG. 8C is a graph of a normalized gain 840 as a function of angle (U=sin($\theta$)) of a phased array antenna structure 800 according to one embodiment. Although not all components of the phased array antenna structure 800 are shown, the phased array antenna structure 800 is the same or similar to the phased array antenna structure 700 of FIG. 7B. In one embodiment, a normalized gain can be obtained by taking a Fourier transform of the power distribution 820 of FIG. 8B. The normalized gain 840 can be obtained by taking slices of the Fourier transform of the power distribution 820 and overlaying each slice. In the depicted embodiment, an array factor peak is 36.3 dBi and side lobes are optimized for −29 dBc. Further, a beam profile is maximal at approximately U=0 and there are grating lobes (e.g., side lobes) at U$\approx$±0.2 and U$\approx$±0.5 to ±0.7.

Figure 9A:
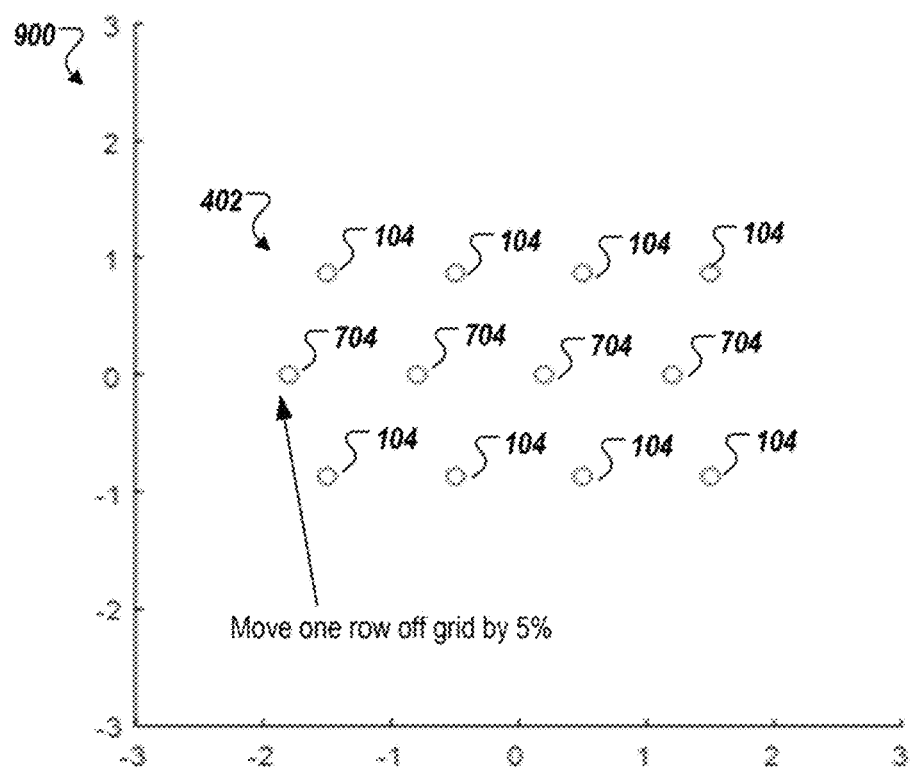
FIG. 9A is a schematic diagram of a triangular arrangement of antenna elements with one row offset antenna elements on an antenna module of a phased array antenna according to one embodiment.

FIG. 9A is a schematic diagram of a triangular arrangement of antenna elements 104 with one row offset antenna elements 704 on an antenna module 702 of a phased array antenna structure 900 according to one embodiment. Although not all components of the phased array antenna structure 800 are shown, the phased array antenna structure 900 is the same or similar to the phased array antenna structure 700 of FIG. 7B. The antenna module 702 and the antenna elements 704 are the same as the antenna modules 702 and the antenna elements 704 of FIGS. 7A-7B. The antenna elements 104 are the same as the antenna elements 104 of FIGS. 1A-1D. In the depicted embodiment, the offset distance ($\Delta$) is ten percent (10%) of the first distance (d) (e.g., as described with respect to FIGS. 1A-1D). In other embodiments, the offset distance can be another percent of the first distance that does not result in two antenna elements overlapping. A direction of the offset of antenna elements 704 can be in a direction along the row of antenna elements 704.

Figure 9B:
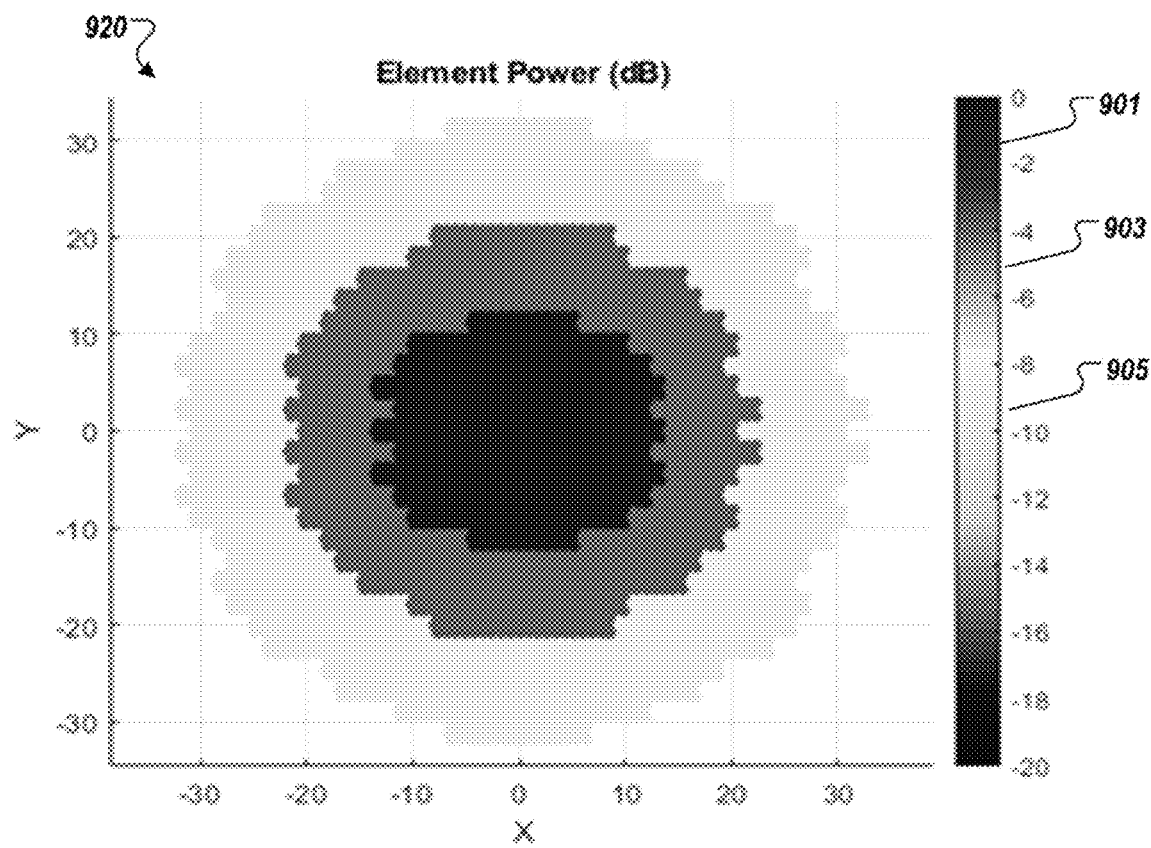
FIG. 9B is a graph of a power distribution of antenna elements of the phased array antenna structure according to one embodiment.

FIG. 9B is a graph of a power distribution 920 of antenna elements of the phased array antenna structure 900 according to one embodiment. Although not all components of the phased array antenna structure 900 are shown, the phased array antenna structure 900 is the same or similar to the phased array antenna structure 700 of FIG. 7B. The shape of the power distribution 920 represents the shape of the phased array antenna structure 900. In other words, antenna modules are arranged such that the antenna elements are organized on a triangular lattice in the same shape as the power distribution 920. In the depicted embodiments, a first set of antenna elements that are in the center of the phased array antenna structure 900 are set to a first power level 901 of between approximately 0 dB and −2 dB, a second set antenna elements that are further out from the center of the phased array antenna structure 900 are set to a second power level 903 of between approximately −2 dB and −6 dB, and a third set antenna elements that are furthest from the center of the phased array antenna structure 900 are set to a third power level 905 of approximately −6 dB to −10 dB. Each antenna element in the first set is set to the first power level 901. Each antenna element in the second set is set to the second power level 903. Each antenna element in the third set is set to the third power level 905. In the depicted embodiment, there are 4992 antenna elements, and their respective power is tapered from the center to the edge in three steps.

Figure 9C:
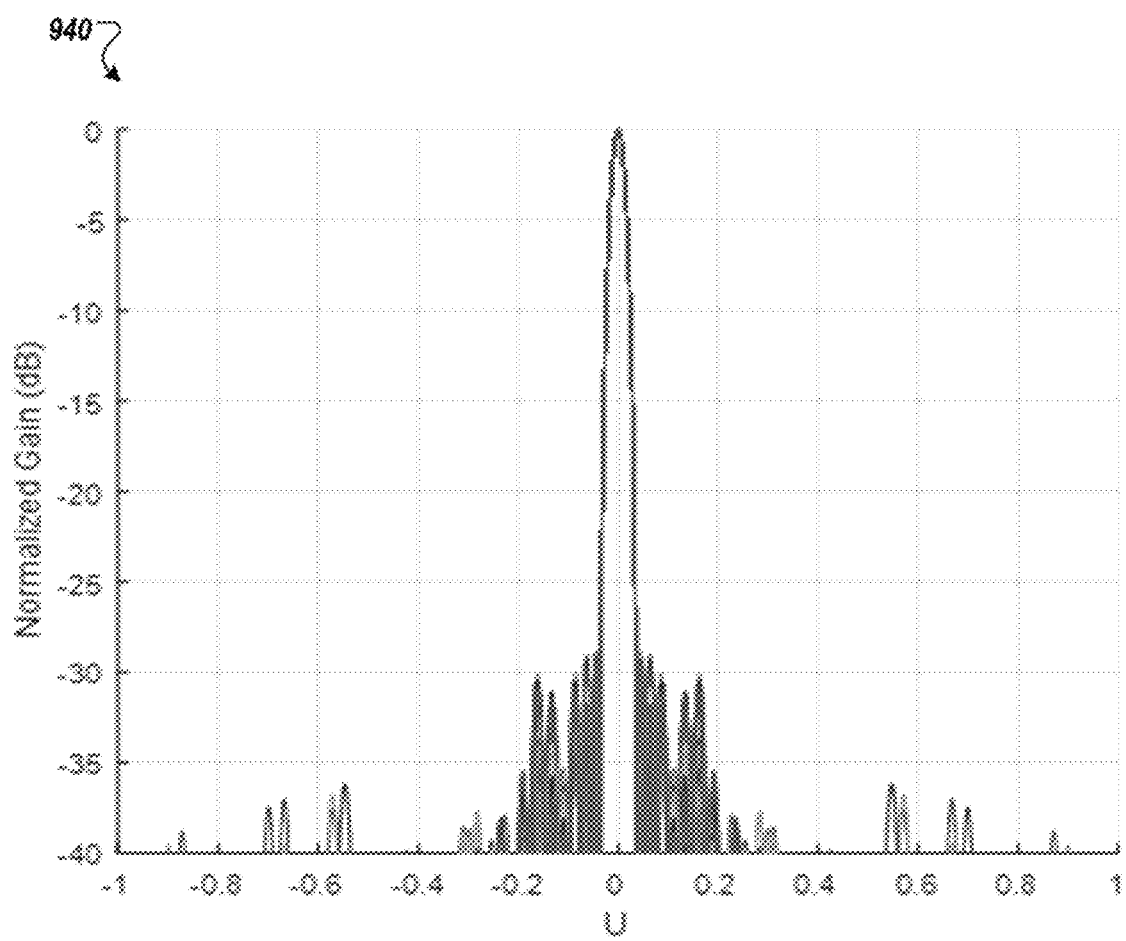
FIG. 9C is a graph of a normalized gain as a function of U of a phased array antenna structure according to one embodiment.

FIG. 9C is a graph of a normalized gain 940 as a function of angle (U=sin($\theta$)) of a phased array antenna structure 900 according to one embodiment. Although not all components of the phased array antenna structure 900 are shown, the phased array antenna structure 900 is the same or similar to the phased array antenna structure 700 of FIG. 7B. In one embodiment, a normalized gain can be obtained by taking a Fourier transform of the power distribution 920 of FIG. 9B. The normalized gain 940 can be obtained by taking slices of the Fourier transform of the power distribution 920 and overlaying each slice. In the depicted embodiment, an array factor peak is 36.3 dBi and side lobes are optimized for −29 dBc. Further, a beam profile is maximal at approximately U=0 and there are grating lobes (e.g., side lobes) at U$\approx$±0.2 and U$\approx$±0.5 to ±0.9.

Figure 10:
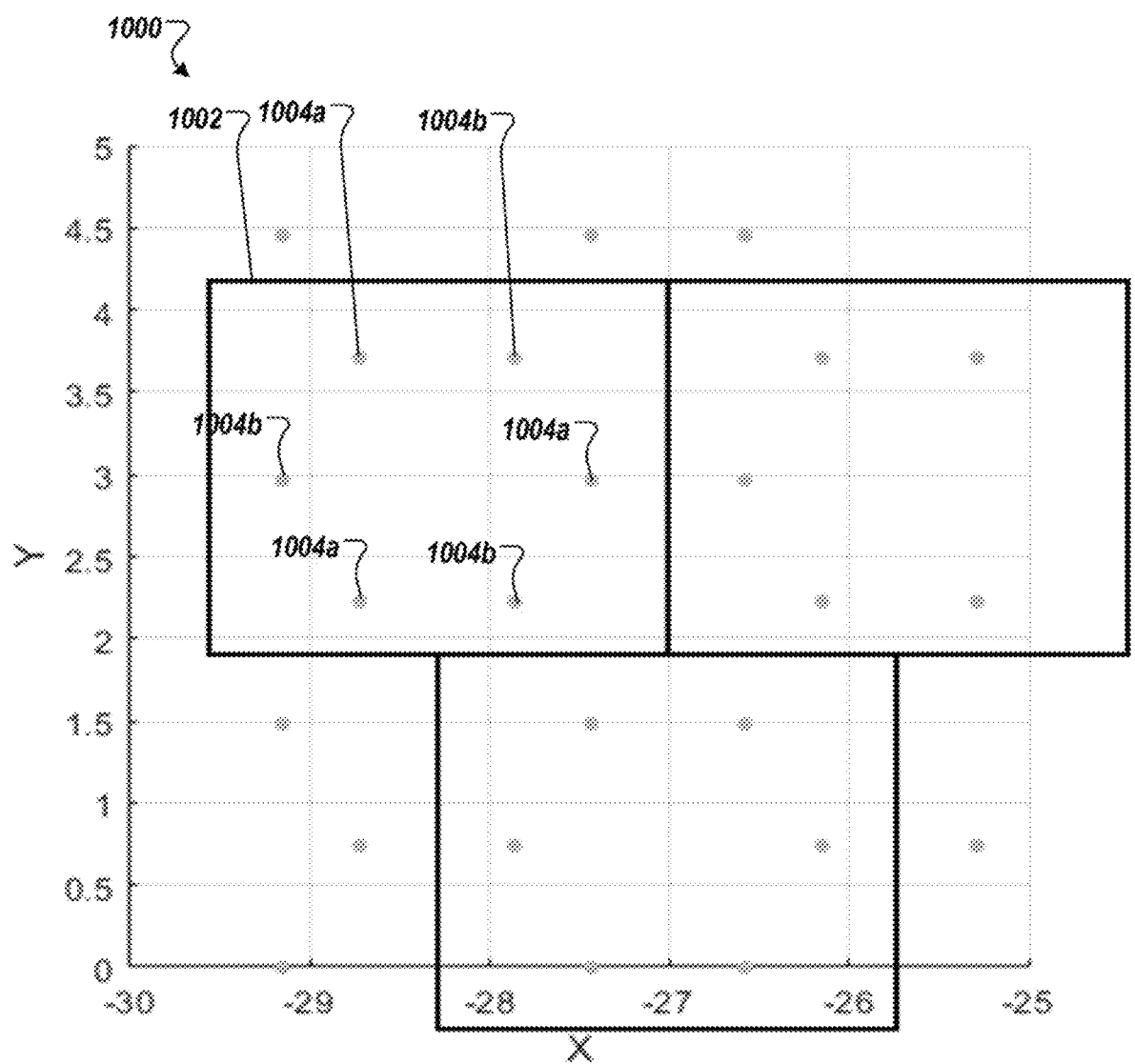
FIG. 10 is a schematic diagram of a phased array antenna structure with antenna elements on a honeycomb lattice pattern according to one embodiment.

FIG. 10 is a schematic diagram of a phased array antenna structure 1000 with antenna elements 1004 on a honeycomb lattice pattern according to one embodiment. The phased array antenna structure 1000 can be referred to as a thinned phased array antenna structure. The phased array antenna structure 1000 can be constructed with antenna modules 1002. In one embodiment, an antenna module 1002 includes six antenna elements 1004 arranged with a honeycomb pattern. The antenna elements are the same as the antenna elements 102 of FIGS. 1A-1D. In another embodiment, the antenna module 1002 includes three antenna elements 1004a arranged on a first equilateral triangular pattern and three antenna elements 1004a arranged on a second equilateral triangle pattern with the same dimensions but rotated with respect to the first equilateral triangular pattern. In another embodiment, the phased array antenna structure 1000 can be obtained by removing (e.g., intentionally removing) each antenna element of a triangular lattice that falls on an intersection of three antenna modules 1002 and each antenna element that falls at a center of each antenna module 1002.

In one embodiment, antenna elements that fall on an intersection of three antenna modules 1002 can be terminated with a matched load. In a further embodiment, antenna elements that fall in the center of each antenna module 1002 can be terminated with a matched load. A terminated element is an antenna element that is terminated to a matched load.

In one embodiment, antenna elements that would fall on an intersection of three antenna modules 1002 can be not printed at the time of manufacturing of the antenna modules. In a further embodiment, antenna elements that would fall in the center of each antenna module 1002 can be not printed at the time of manufacturing of the antenna modules.

Figure 11:
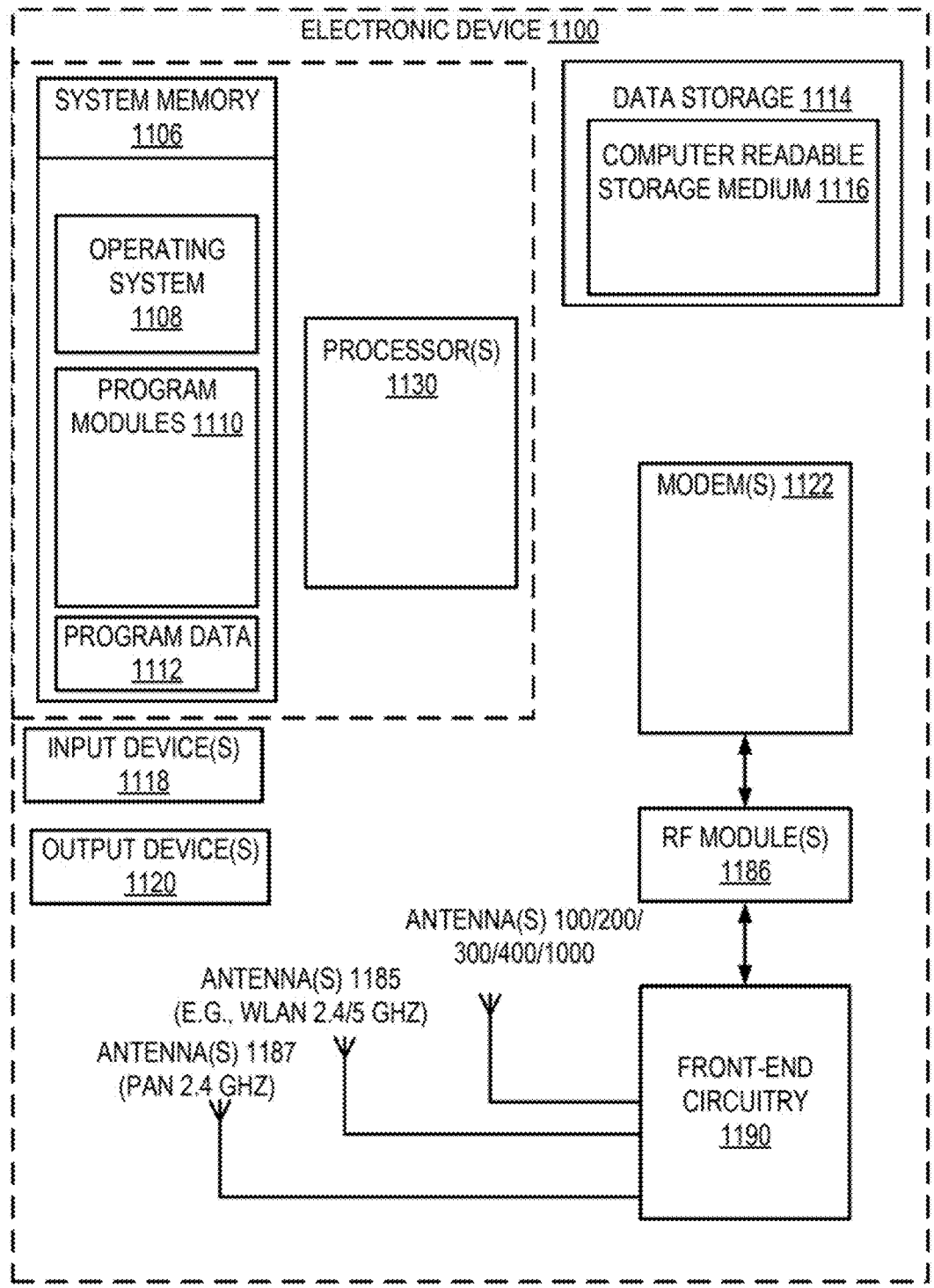
FIG. 11 is a block diagram of an electronic device that includes a phased array antenna structure with antenna elements on a triangular lattice on a rectangular antenna module as described herein according to one embodiment.

FIG. 11 is a block diagram of an electronic device 1100 that includes a phased array antenna structure with antenna elements on a triangular lattice on a rectangular antenna module as described herein according to one embodiment. In one embodiment, the electronic device 1100 includes the phased array antenna structure 100 of FIG. 1D. In another embodiment, the electronic device 1100 includes the phased array antenna structure 120 of FIG. 1E, the phased array antenna structure 130 of FIG. 1F, or the phased array antenna structure 140 of FIG. 1G. In another embodiment, the electronic device 1100 includes the phased array antenna structure 200 of FIG. 2. In another embodiment, the electronic device 1100 includes the phased array antenna structure 300 of FIG. 3. In another embodiment, the electronic device 1100 includes the phased array antenna structure 400 of FIG. 4C. In another embodiment, the electronic device 1100 includes the phased array antenna structure 500 of FIG. 5. In another embodiment, the electronic device 1100 includes the phased array antenna structure 600 of FIG. 6. In another embodiment, the electronic device 1100 includes the phased array antenna structure 700 of FIG. 7B. In another embodiment, the electronic device 1100 includes the phased array antenna structure 800 of FIG. 8. In another embodiment, the electronic device 1100 includes the phased array antenna structure 900 of FIG. 9. In another embodiment, the electronic device 1100 includes the phased array antenna structure 1000 of FIG. 10. Alternatively, the electronic device 1100 may be other electronic devices, as described herein.

The electronic device 1100 includes one or more processor(s) 1130, such as one or more CPUs, microcontrollers, field programmable gate arrays, or other types of processors. The electronic device 1100 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of methods to control operation of the electronic device 1100. The electronic device 1100 performs functions by using the processor(s) 1130 to execute instructions provided by the system memory 1106.

The electronic device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the electronic device 1100, the system memory 1106 and the processor(s) 1130 also constituting computer-readable media. The electronic device 1100 may also include one or more input devices 1118 (keyboard, mouse device, specialized selection keys, etc.) and one or more output devices 1120 (displays, printers, audio output mechanisms, etc.).

The electronic device 1100 further includes a modem 1122 to allow the electronic device 1100 to communicate via a wireless connections (e.g., such as provided by the wireless communication system) with other computing devices, such as remote computers, an item providing system, and so forth. The modem 1122 can be connected to one or more radio frequency (RF) modules 1186. The RF modules 1186 may be a wireless local area network (WLAN) module, a wide area network (WAN) module, wireless personal area network (WPAN) module, Global Positioning System (GPS) module, or the like. The antenna structures (antenna(s) 100/120/130/140/200/300/400/600/600/700/800/900/1000, 1185, 1187) are coupled to the front-end circuitry 1190, which is coupled to the modem 1122. The front-end circuitry 1190 may include radio front-end circuitry, antenna switching circuitry, impedance matching circuitry, or the like. The antennas 100/120/130/140/200/300/400/600/600/700/800/900/1000 may be GPS antennas, Near-Field Communication (NFC) antennas, other WAN antennas, WLAN or PAN antennas, or the like. The modem 1122 allows the electronic device 1100 to handle both voice and non-voice communications (such as communications for text messages, multimedia messages, media downloads, web browsing, etc.) with a wireless communication system. The modem 1122 may provide network connectivity using any type of mobile network technology including, for example, Cellular Digital Packet Data (CDPD), General Packet Radio Service (GPRS), EDGE, Universal Mobile Telecommunications System (UMTS), Single-Carrier Radio Transmission Technology (1xRTT), Evaluation Data Optimized (EVDO), High-Speed Down-Link Packet Access (HSDPA), Wi-Fi®, Long Term Evolution (LTE) and LTE Advanced (sometimes generally referred to as 4G), etc.

The modem 1122 may generate signals and send these signals to antenna(s) 100/120/130/140/200/300/400/600/600/700/800/900/1000 of a first type (e.g., WLAN 5 GHz), antenna(s) 1185 of a second type (e.g., WLAN 2.4 GHz), and/or antenna(s) 1187 of a third type (e.g., WAN), via front-end circuitry 1190, and RF module(s) 1186 as descried herein. Antennas 100/120/130/140/200/300/400/600/600/700/800/900/1000, 1185, 1187 may be configured to transmit in different frequency bands and/or using different wireless communication protocols. The antennas 100/120/130/140/200/300/400/600/600/700/800/900/1000, 1185, 1187 may be directional, omnidirectional, or non-directional antennas. In addition to sending data, antennas 100/200/250/300/400/1000, 1185, 1187 may also receive data, which is sent to appropriate RF modules connected to the antennas. One of the antennas 100/120/130/140/200/300/400/600/600/700/800/900/1000, 1185, 1187 may be any combination of the antenna structures described herein.

In one embodiment, the electronic device 1100 establishes a first connection using a first wireless communication protocol, and a second connection using a different wireless communication protocol. The first wireless connection and second wireless connection may be active concurrently, for example, if an electronic device is receiving a media item from another electronic device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna.

Though a modem 1122 is shown to control transmission and reception via antenna (100/120/130/140/200/300/400/600/600/700/800/900/1000, 1185, 1187), the electronic device 1100 may alternatively include multiple modems, each of which is configured to transmit/receive data via a different antenna and/or wireless transmission protocol.

Figure 12:
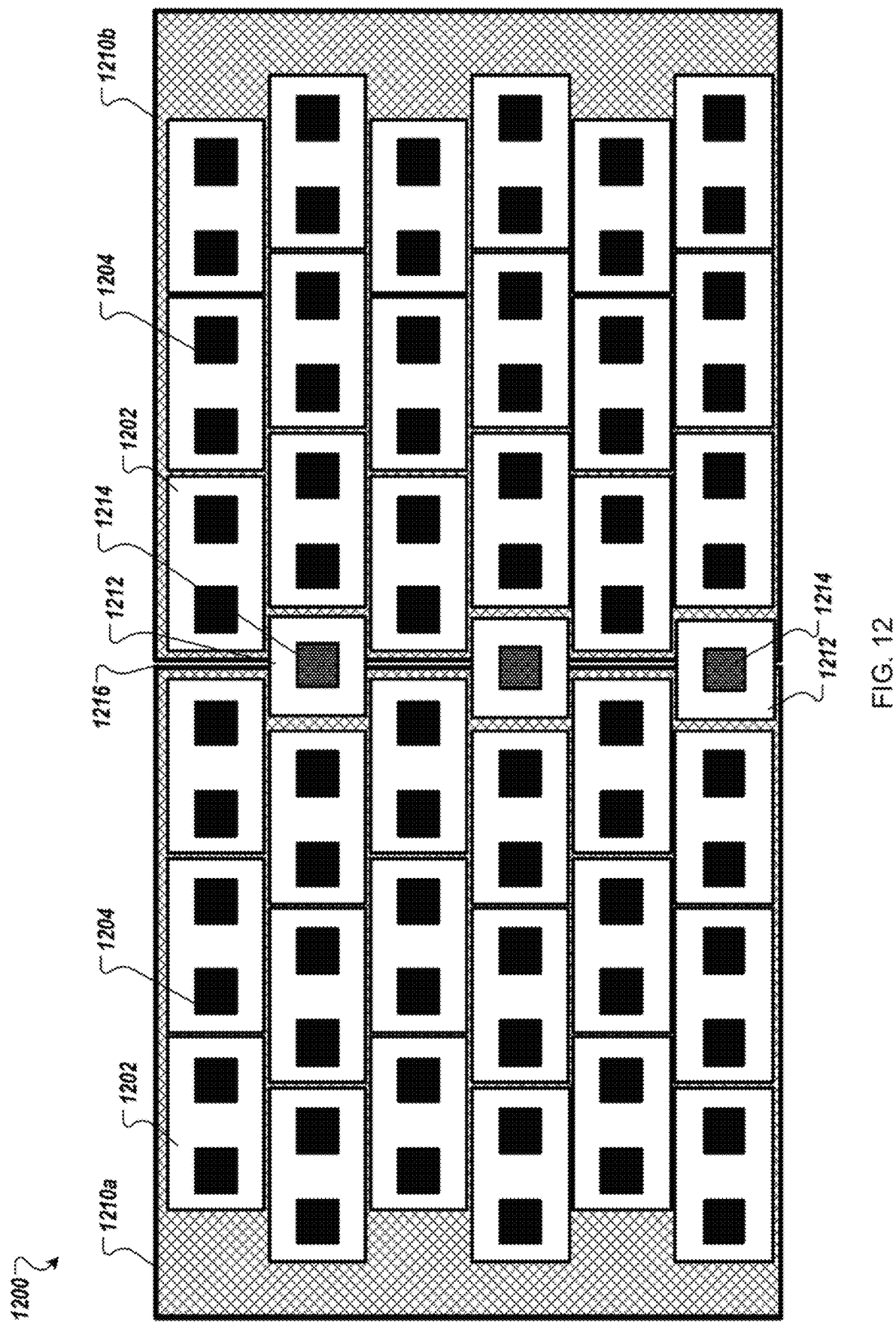
FIG. 12 is a schematic diagram of a phased array antenna structure constructed from antenna modules according to one embodiment.

FIG. 12 is a schematic diagram of a phased array antenna structure 1200 constructed from antenna modules 1202 according to one embodiment. Although not all components of the antenna structure are shown, the phased array antenna structure 1200 is similar to the antenna structures described herein. In particular and for simplicity, the squares represent the antenna elements 1204 and bridge element 1214. Feed points (not shown in FIG. 12) can be coupled to each of the antenna elements 1204.

In the depicted embodiment, the phased array antenna structure 1200 includes a first panel that includes a first circuit board 1210*a* and a second panel that includes a second circuit board 1210*b*. The second panel is identical to the first panel and disposed adjacent to the first panel with a gap 1216 between the first panel and the second panel. In other words, the first panel and the second panel are separated by a distance. Each circuit board 1210 includes a set of antenna elements 1204. The antenna elements 1204 are located on a triangular lattice pattern. Each circuit board 1210 also includes a set of antenna modules 1202. Each of the antenna modules 1202 are identical to each of the other antenna modules 1202 and are electrically and physically coupled to a circuit board 1210. Each of the antenna modules 1202 includes two of the antenna elements 1204. The antenna modules 1202 can be arranged in rows that are offset (e.g., shifted in a direction parallel to the rows) from adjacent rows in order for the antenna elements 1204 to form the triangular lattice pattern.

In one embodiment, the first circuit board 1210*a* includes a first set of antenna modules 1202. The second circuit board 1210*b* includes a second set of antenna modules 1202. An antenna module 1202 includes two antenna elements 1204. Although the antenna modules 1202 are depicted as each having two antenna elements 1204, in other embodiments the antenna modules can include a different number of antenna elements, such as one, three, six, ten, twelve, or other suitable number. The antenna elements can be patch elements, slot elements, or other suitable type of antenna element.

A bridge structure 1212 overlies over a gap 1216 (e.g., an open area) between the first circuit board 1210*a* and the second circuit board 1210*b*. The bridge structure 1212 can also be referred to as a support structure herein. The bridge structure 1212 includes a bridge module (not shown in FIG. 12) that includes a bridge element 1214. The bridge element 1214 is an antenna element that is similar to the antenna elements 1204, except that the bridge element 1214 is coupled to a terminating resistor (not shown in FIG. 12) while the antenna elements 1204 can be coupled to an amplifier, such as a low-noise amplifier (LNA), a power amplifier (PA), a variable-gain amplifier (VGA), or other suitable amplifier. In other words, the bridge element 1214 is a passive antenna element (also referred to as a terminated bridge element, or dummy elements) while the antenna elements 1204 are active antenna elements (also referred to as dominos). The bridge elements are not connected to any transmit or receive networks, but are internally terminated in a passive matched load (e.g., a resistor). The bridge structure 1212 is adhered (e.g., attached) to the first circuit board 1210*a* and to the second circuit board 1210*b* with a bonding material. In other words, a first portion of the bridge structure 1212 overlies the first circuit board 1210*a*, and a second portion of the bridge structure 1212 overlies the second circuit board 1210*b*. The bonding material can be a material such as solder, epoxy, a conductive bonding paste, a non-conductive bonding paste, or other type of bonding material that affixes the bridge structure 1212 over the gap 1216 between the first circuit board 1210*a* and the second circuit board 1210*b*. Multiple bridge structures 1212 can overlie the gap 1216. In the depicted embodiment, there are three bridge structures 1212, each including one bridge element 1214, that are disposed over the gap 1216 within alternating rows of antenna modules 1202 (e.g., in the depicted embodiment, there are six rows of antenna modules 1202 in each circuit board 1210). For example, a panel can be approximately 18 inches x 24 inches in size. The dimensions of the phased array antenna structure 1200 can require a different number of panels to be connected (e.g., stitched) together by additional bridge structures. Larger phased array antenna structures require more panels. In other embodiment, the circuit boards 1210 can include a different number of rows of antenna modules, and thus a different number of bridge structures 1212 can overlie the gap between circuit boards. In further embodiments, the antenna elements can be arranged in a lattice pattern other than a triangular lattice pattern, and a different number of bridge structures may overlie the gap. Additionally or alternatively, the bridge structures can include more than one bridge elements.

The bridge structures 1212 that are used to stitch multiple panels can be bonded to the panels and/or circuit boards after assembly of the phased array antenna structure. The bridge elements 1214 can be terminated via a resistor (e.g., rather than an amplifier). After assembly of the phased array antenna structure, the gap (e.g., between two panels) is present due to tolerances of fastening down circuit boards to panels and to support structures, as well as due to tolerances associated with circuit board connectors (such as PCB-to-PCB connectors). The gap can be on the order of 1 mm to 3 mm and introduces a keepout region.

Figure 13:
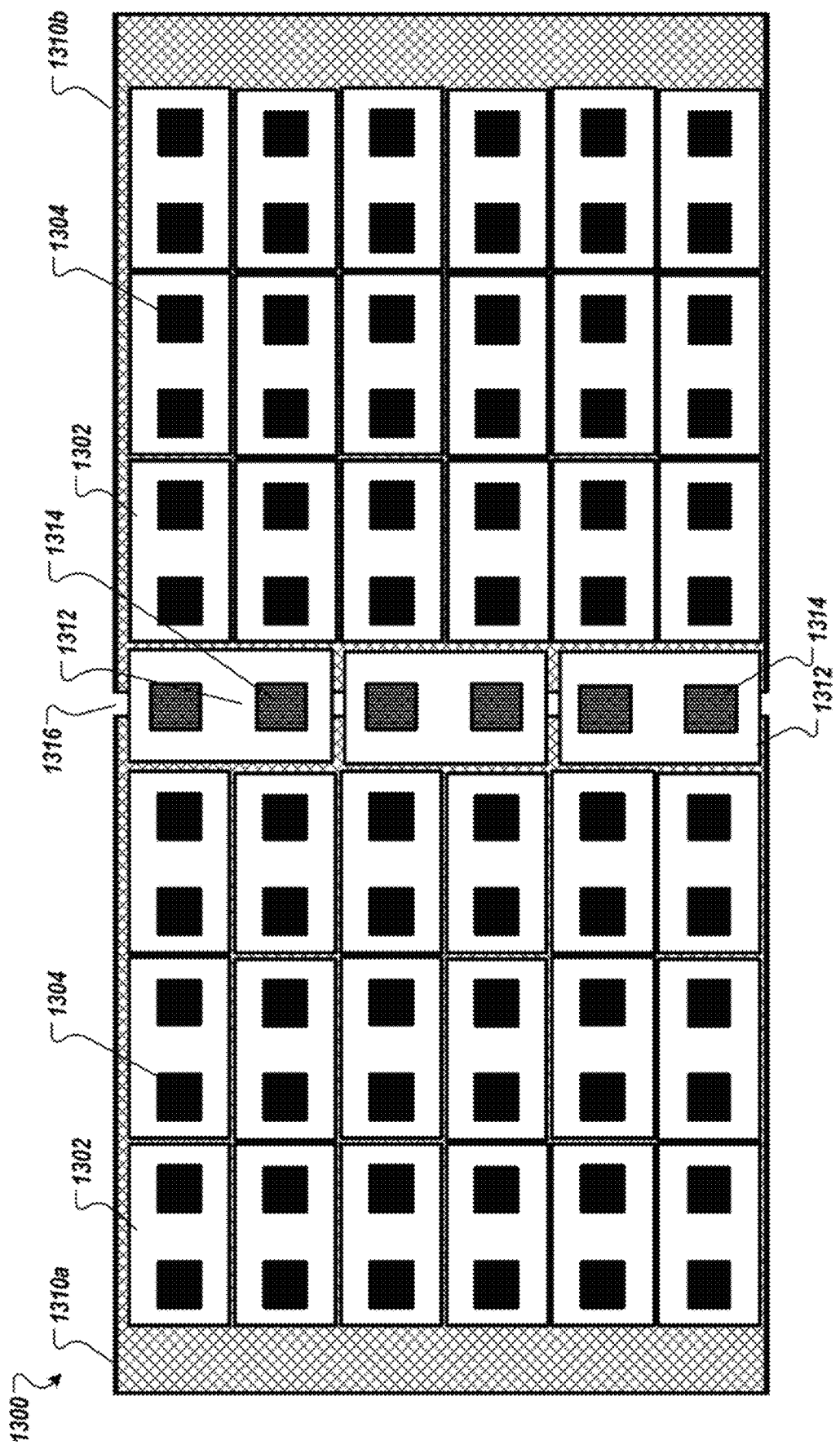
FIG. 13 is a schematic diagram of a phased array antenna structure constructed from antenna modules according to one embodiment.

FIG. 13 is a schematic diagram of a phased array antenna structure 1300 constructed from antenna modules 1302 according to one embodiment. Although not all components of the phased array antenna structure 1300 are shown, the phased array antenna structure 1300 is similar to the phased array antenna structures described herein. In particular and for simplicity, the squares represent the antenna elements 1304 and the bridge element 1314.

In the depicted embodiment, the phased array antenna structure 1300 includes a first panel that includes a first circuit board 1310*a* and a second panel that includes a second circuit board 1310*b*. The second panel is identical to the first panel and disposed adjacent to the first panel with a gap 1316 between the first panel and the second panel.

Each circuit board 1310 includes a set of antenna elements 1304. The antenna elements 1304 are located on a rectangular lattice pattern. A first antenna element and a second antenna element are located on a longitudinal axis of the rectangular shape. Each circuit board 1310 also includes a set of antenna modules 1302. Each of the antenna modules 1302 are identical to each of the other antenna modules 1302 and are electrically and physically coupled to a circuit board 1310. Each of the antenna modules 1302 includes two of the antenna elements 1304. The antenna modules 1202 can be arranged in rows and columns in order for the antenna elements 1304 to form the rectangular lattice pattern. In some embodiments, the inter-element spacing between antenna elements 1304 within a row is the same as the inter-element spacing between antenna elements 1304 within a column, and in such a case, the antenna elements 1304 are located on a square lattice pattern, or a square grid.

The antenna modules 1302 can be the same or similar to the antenna modules 1202 of FIG. 12, and although depicted with two antenna elements 1304, they can be designed to include a different number of antenna elements.

A bridge structure 1312 overlies a gap 1316 between the first circuit board 1310a and the second circuit board 1310b. The bridge structure 1312 includes a bridge module (not shown in FIG. 13) that includes two bridge elements 1314. The bridge elements 1314 the same as the bridge elements 1214, and the antenna elements 1304 are the same as the antenna elements 1204 of FIG. 12. The bridge structure 1312 is adhered (e.g., attached) to the first circuit board 1310a and to the second circuit board 1310b with a bonding material. Multiple bridge structures 1312 can overlie the gap 1316. In the depicted embodiment, there are three bridge structures 1312, each including two bridge elements 1314 that overlie the gap 1316. In other words, there are six rows of antenna modules 1302 (that include one row and two columns of antenna elements 1304) in each circuit board 1310, and there are three bridge structures 1312 (that include two rows and one column of bridge elements 1314). In other words, the bridge modules appear rotated by 90 degrees with respect to the antenna modules 1302. In other embodiments, and a different number of bridge structures may be disposed over the gap. In some embodiments, each bridge structure can include just one bridge element. In other embodiments, each bridge structure can include three, four, six, or other number of bridge elements. If the gap 1316 is large relative to a wavelength (such as would correspond to an operating frequency of the phased array antenna), additional bridge modules may be required to be located over the gap.

Figure 14:
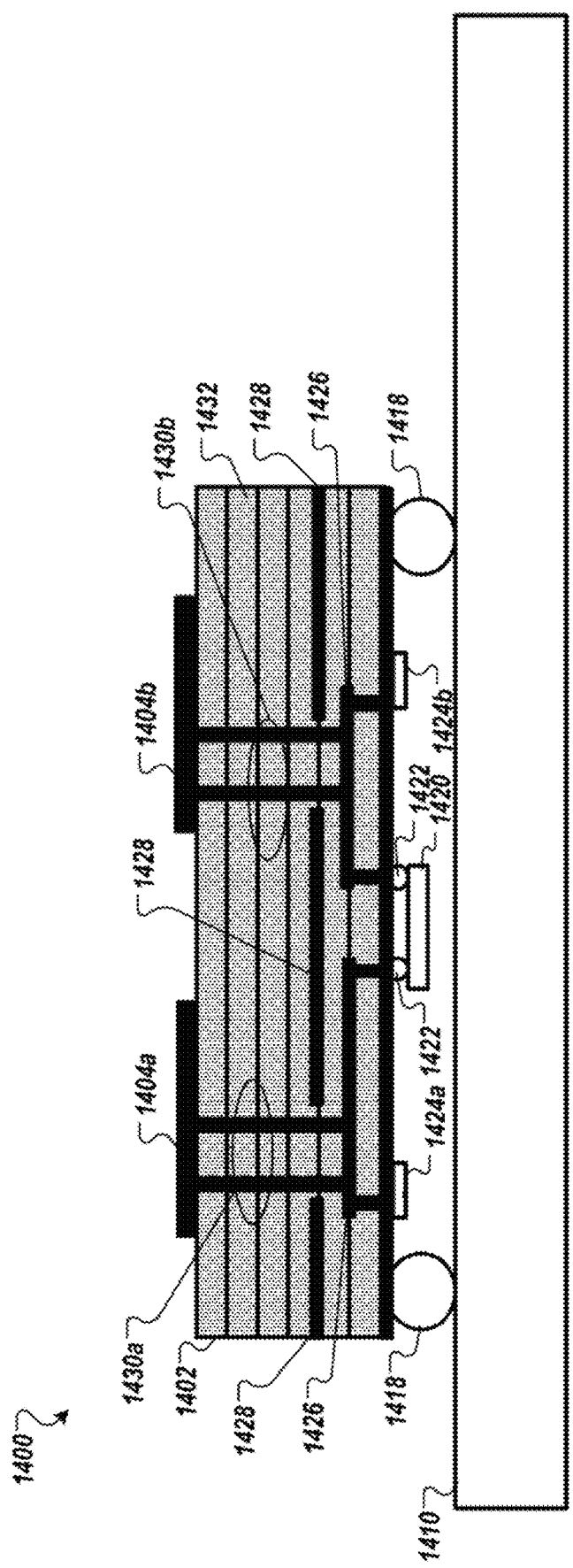
FIG. 14 is a schematic diagram of a cross-sectional view of an antenna module of a phased array antenna structure according to one embodiment.

FIG. 14 is a schematic diagram of a cross-sectional view of an antenna module 1402 of a phased array antenna structure 1400 according to one embodiment. Although not all components of the phased array antenna structure 1400 are shown, the phased array antenna structure 1400 is similar to the phased array antenna structures described herein. The antenna module 1402 is the same or similar as the antenna modules 1202 of FIG. 12 and the antenna modules 1302 of FIG. 13. The antenna module 1402 is disposed on a circuit board 1410. Although only one antenna module 1402 is shown, in other embodiments, the circuit board includes more than one antenna modules. The antenna module 1402 is connected to the circuit board 1410 by surface mount connectors, such as a ball grid array (BGA) 1418. The BGA 1418 allows the antenna module 1402 to be permanently surface-mounted to the circuit board 1410.

The antenna module 1402 includes a first antenna element 1404a and a second antenna element 1404b. The antenna module 1402 includes an active antenna front-end module 1420 (e.g., a radio frequency front end (RFFE) circuitry) coupled to the first antenna element 1404a and to the second antenna element 1404b. The active antenna front-end module 1420 includes a PA and/or an LNA such that the antenna elements 1404 are active antenna elements for transmitting and receiving RF signals. In one embodiment, the active antenna front-end module 1420 can be connected to the antenna module 1402 by a flip-chip micro-BGA 1422. The flip-chip micro-BGA 1422 can offer high signal speeds and low inductance compared to a standard BGA and thus can be useful for high-frequency applications. The antenna module 1402 further includes a first resistor 1424a and a second resistor 1424b. The resistors 1424 can be mounted using surface mount technology (SMT) and/or can be referred to as surface mounted devices (SMD). The resistors 1424 provide a terminated port of 90 degree hybrid. For example, the antenna module 1402 can use a dual-linear polarized antenna element (e.g., a two-port device). Two antenna ports can be connected to a 90 degree hybrid coupler (e.g., a four-port device). In such a configuration, two ports of the hybrid coupler can correspond to circular polarized inputs and/or outputs. The combination of the antenna element and the hybrid coupler can allow a dual-linear polarized antenna to act as a dual-circularly polarized antenna.

The active antenna front-end module 1420, the first resistor 1424a, and the second resistor 1424b are electrically coupled to the first antenna element 1404a and the second antenna element 1404b. In particular, the active antenna front-end module 1420 and the first resistor 1424a are coupled to the first antenna element 1404a by a first set of feed lines 1430a. The active antenna front-end module 1420 and the second resistor 1424b are coupled to the second antenna element 1404b by a second set of feed lines 1430b. The feed lines 1430 (also referred to as vias herein) run within (e.g., are embedded within) dielectric material 1432 of the antenna module 1402. A ground plane 1428 is located within the dielectric material 1432 and is separated from the antenna elements 1404 by a distance. The dielectric material 1432 fills the space between the antenna elements 1404 and the BGA 1418. The antenna module 1402 also includes transmission lines 1426 embedded within the dielectric material 1432 to send and receive (e.g., to transfer) signals, such as RF signals. In some embodiments that antenna elements 1404 can be dual-feel elements and the transmission lines 1426 can be 90 degree hybrid transmission lines.

Although the antenna module 1402 is depicted in FIG. 14 as being connected to the circuit board 1410 by a BGA, in other embodiments, other types of connections can be used, such as leads that allow for increased mechanical compliance. Although the resistors 1424 are depicted as SMT resistors, in other embodiments, other resistors can be used, such as through-hole mounted resistors or resistive elements. In some cases, the resistors 1424 can be coupled between the elements and a ground potential. Alternatively, a resister can be coupled between two terminals of an antenna element, such as between balanced feed lines.

Figure 15:
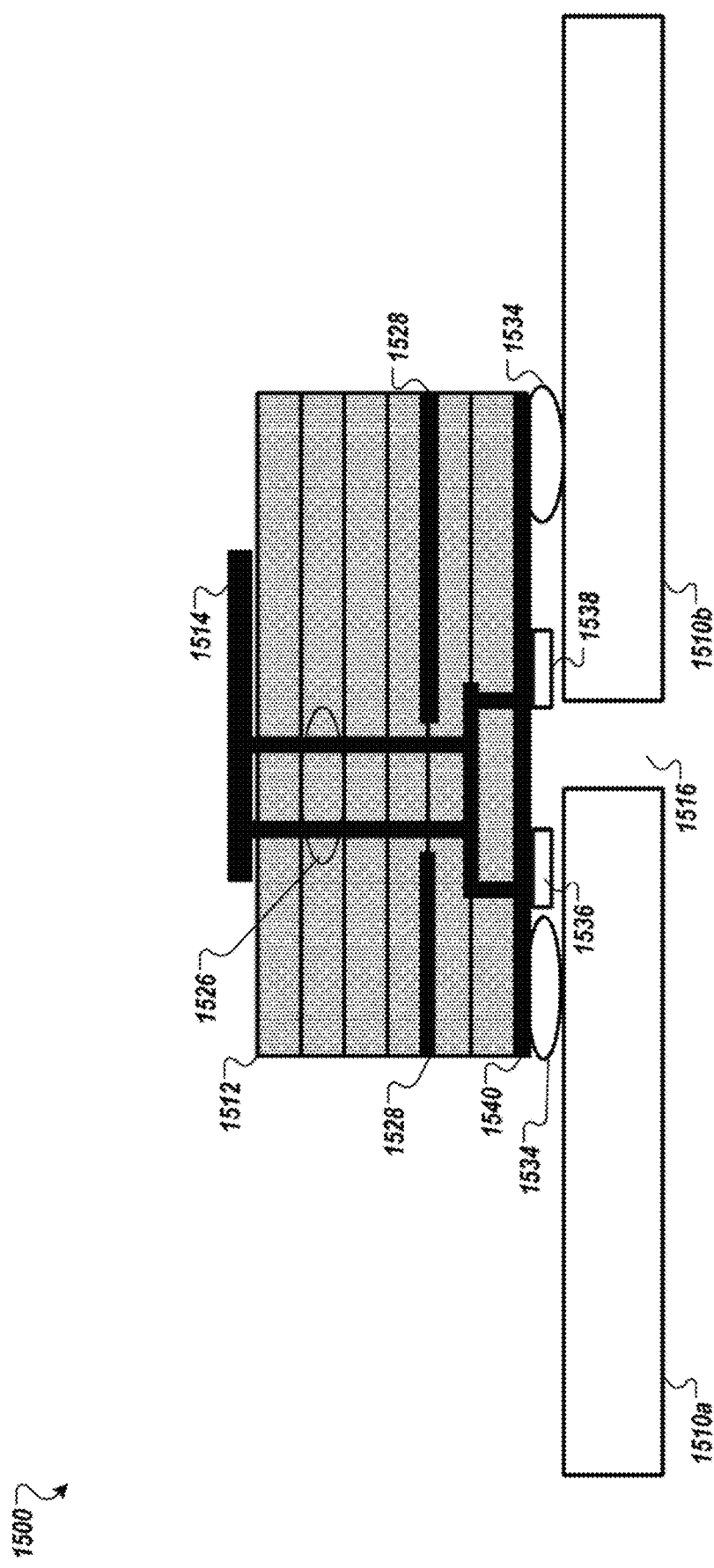
FIG. 15 is a schematic diagram of a cross-sectional view of a bridge module of a phased array antenna structure according to one embodiment.

FIG. 15 is a schematic diagram of a cross-sectional view of a bridge module 1512 of a phased array antenna structure 1500 according to one embodiment. Although not all components of the phased array antenna structure 1500 are shown, the phased array antenna structure 1500 is similar to the phased array antenna structures described herein. The bridge module 1512 is the same or similar as the bridge modules described with respect to FIGS. 12-13. The bridge module 1512 is disposed over a gap 1516 between a first circuit board 1510a and a second circuit board 1510b. The first circuit board 1510a is disposed on a first panel and the second circuit board 1510*b* is disposed on a second panel that is identical to the first panel. The second panel is located adjacent to the first panel to form the gap 1516. A support structure 1540 which includes the bridge module 1512 is disposed over the gap 1516, such that a first portion of the of the bridge module 1512 is located above the first circuit board 1510*a* and a second portion of the bridge module 1512 is located above the second circuit board 1510*b*. Although only one bridge module 1512 is shown, in other embodiments, there can be more than one bridge modules disposed over the gap 1516.

The support structure 1540 is connected (e.g., fixed, bonded, attached) to the first circuit board 1510*a* and to the second circuit board 1510*b* by bonding elements 1534. The bonding elements can be elements which serve to attach the support structure to the circuit boards, and can be a bonding paste (e.g., that can be conductive or non-conductive), glue, epoxy, pins, or the like. The bridge module 1512 includes a bridge element 1514 that is a passive antenna element. The bridge module 1512 includes a first resistor 1536 than is an antenna termination (e.g., as a 50 ohm load) to terminate the bridge element 1514 such that the bridge element 1514 is a passive antenna. The bridge module includes a second resistor 1538 for a terminated port of 90 degree hybrid. In one embodiment, the first resistor 1536 and the second resistor 1538 can be mounted using SMT. In other embodiments, the first resistor and the second resistor can be mounted in other ways, such as through-hole mounted.

The first resistor 1536 and the second resistor 1538 are electrically coupled to the bridge element 1514 by feed lines 1530. The feed lines 1530 are embedded within dielectric material 1532 and extend from transmission lines 1526 to the bridge element 1514. In some embodiments, the transmission lines 1526 can introduce a 90 degree phase shift by using tuned line lengths or a 90 degree hybrid coupler that can be included between module ports and antenna ports. In some embodiments that bridge element 1514 can be a dual-feel element and the transmission lines 1526 can be 90 degree hybrid transmission lines. A ground plane 1528 is located within the dielectric material 1532 and is separated from the bridge element 1514 by a distance. The dielectric material 1532 fills the space between the bridge element 1514 and the support structure 1540.

Figure 16:
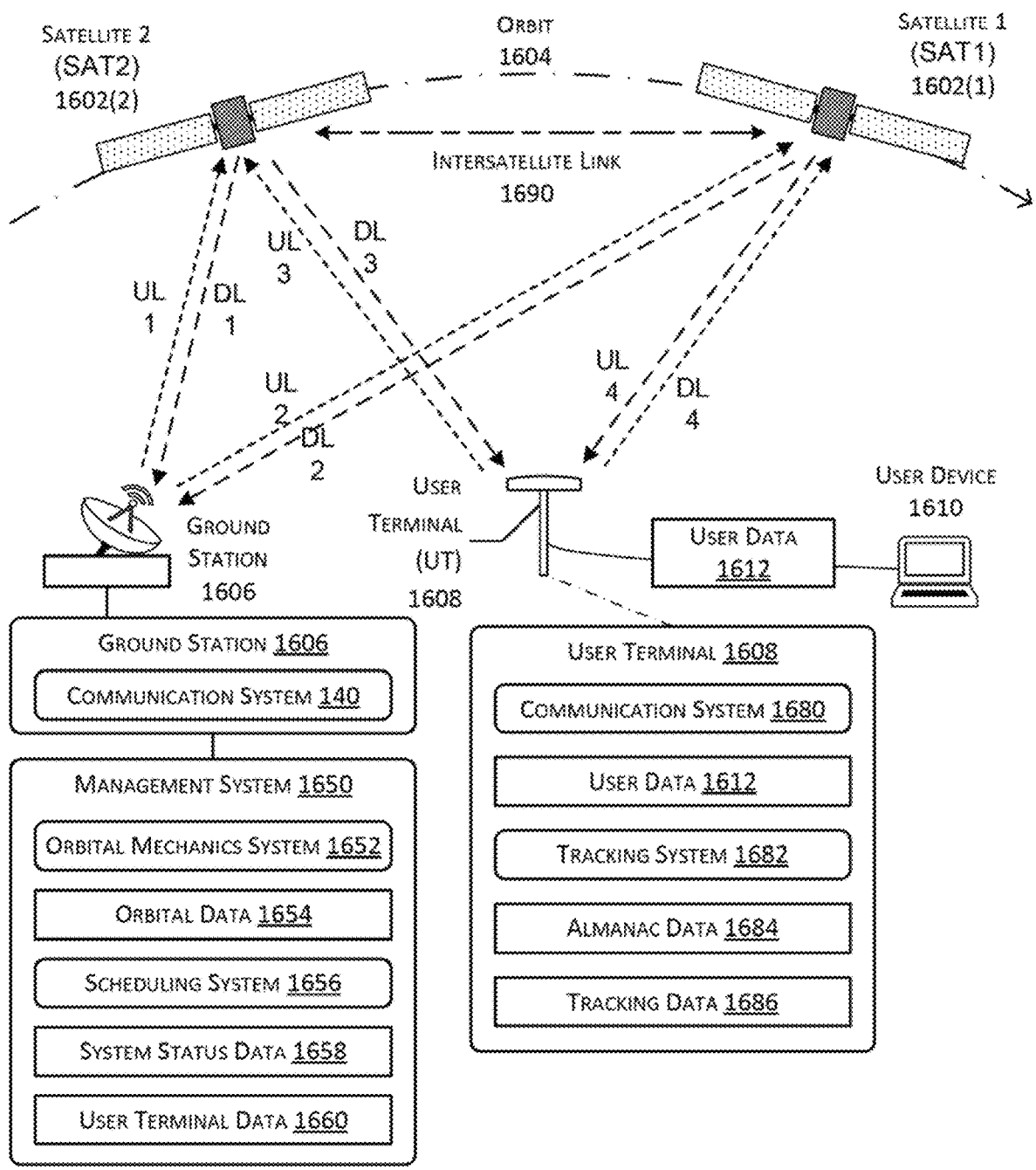
FIG. 16 illustrates a system including a constellation of satellites, each satellite being in orbit according to one embodiment.

FIG. 16 illustrates a system 1600 including a constellation of satellites 1602(1), 1602(2), . . . , 1602(S), each satellite 1602 being in orbit 1604 according to one embodiment. The system 1600 shown here comprises a plurality (or "constellation") of satellites 1602(1), 1602(2), . . . , 1602(S), each satellite 1602 being in orbit 1604. Also shown is a ground station 1606, user terminal (UTs) 1608, and a user device 1610.

The constellation may comprise hundreds or thousands of satellites 1602, in various orbits 1604. For example, one or more of these satellites 1602 may be in non-geosynchronous orbits (NGOs) in which they are in constant motion with respect to the Earth. For example, the orbit 1604 is a low earth orbit (LEO). In this illustration, orbit 1604 is depicted with an arc pointed to the right. A first satellite (SAT1) 1602(1) is leading (ahead of) a second satellite (SAT2) 1602(2) in the orbit 1604. The satellite 1602 is discussed in more detail with regard to FIG. 17.

One or more ground stations 1606 are in communication with one or more satellites 1602. The ground stations 1606 may pass data between the satellites 1602, a management system 1650, networks such as the Internet, and so forth. The ground stations 1606 may be emplaced on land, on vehicles, at sea, and so forth. Each ground station 1606 may comprise a communication system 1640. Each ground station 1606 may use the communication system 1640 to establish communication with one or more satellites 1602, other ground stations 1606, and so forth. The ground station 1606 may also be connected to one or more communication networks. For example, the ground station 1606 may connect to a terrestrial fiber optic communication network. The ground station 1606 may act as a network gateway, passing user data 1612 or other data between the one or more communication networks and the satellites 1602. Such data may be processed by the ground station 1606 and communicated via the communication system 1640. The communication system 1640 of a ground station may include components similar to those of the communication system of a satellite 1602 and may perform similar communication functionalities. For example, the communication system 1640 may include one or more modems, digital signal processors, power amplifiers, antennas (including at least one antenna that implements multiple antenna elements, such as a phased array antenna, as well as at least one active antenna element, and at least one passive antenna element), processors, memories, storage devices, communications peripherals, interface buses, and so forth.

The ground stations 1606 are in communication with a management system 1650. The management system 1650 is also in communication, via the ground stations 1606, with the satellites 1602 and the UTs 1608. The management system 1650 coordinates operation of the satellites 1602, ground stations 1606, UTs 1608, and other resources of the system 1600. The management system 1650 may comprise one or more of an orbital mechanics system 1652 or a scheduling system 1656.

The orbital mechanics system 1652 determines orbital data 1654 that is indicative of a state of a particular satellite 1602 at a specified time. In one implementation, the orbital mechanics system 1652 may use orbital elements that represent characteristics of the orbit 1604 of the satellites 1602 in the constellation to determine the orbital data 1654 that predicts location, velocity, and so forth of particular satellites 1602 at particular times or time intervals. For example, the orbital mechanics system 1652 may use data obtained from actual observations from tracking stations, data from the satellites 1602, scheduled maneuvers, and so forth to determine the orbital elements. The orbital mechanics system 1652 may also consider other data, such as space weather, collision mitigation, orbital elements of known debris, and so forth.

The scheduling system 1656 schedules resources to provide communication to the UTs 1608. For example, the scheduling system 1656 may determine handover data that indicates when communication is to be transferred from the first satellite 1602(1) to the second satellite 1602(2). Continuing the example, the scheduling system 1656 may also specify communication parameters such as frequency, timeslot, and so forth. During operation, the scheduling system 1656 may use information such as the orbital data 1654, system status data 1658, user terminal data 1660, and so forth.

The system status data 1658 may comprise information such as which UTs 1608 are currently transferring data, satellite availability, current satellites 1602 in use by respective UTs 1608, capacity available at particular ground stations 1606, and so forth. For example, the satellite availability may comprise information indicative of satellites 1602 that are available to provide communication service or those satellites 1602 that are unavailable for communication service. Continuing the example, a satellite 1602 may be unavailable due to malfunction, previous tasking, maneuvering, and so forth. The system status data 1658 may be indicative of past status, predictions of future status, and so forth. For example, the system status data 1658 may include information such as projected data traffic for a specified interval of time based on previous transfers of user data 1612. In another example, the system status data 1658 may be indicative of future status, such as a satellite 1602 being unavailable to provide communication service due to scheduled maneuvering, scheduled maintenance, scheduled decommissioning, and so forth.

The user terminal data 1660 may comprise information such a location of a particular UT 1608. The user terminal data 1660 may also include other information such as a priority assigned to user data 1612 associated with that UT 1608, information about the communication capabilities of that particular UT 1608, and so forth. For example, a particular UT 1608 in use by a business may be assigned a higher priority relative to a UT 1608 operated in a residential setting. Over time, different versions of UTs 1608 may be deployed, having different communication capabilities such as being able to operate at particular frequencies, supporting different signal encoding schemes, having different antenna configurations, and so forth.

The UT 1608 includes a communication system 1680 to establish communication with one or more satellites 1602. The communication system 1680 of the UT 1608 may include components similar to those of the communication system 1712 of a satellite 1602 and may perform similar communication functionalities. For example, the communication system 1680 may include one or more modems, digital signal processors, power amplifiers, antennas (including at least one antenna that implements multiple antenna elements, such as a phased array antenna), processors, memories, storage devices, communications peripherals, interface buses, and so forth. The UT 1608 passes user data 1612 between the constellation of satellites 1602 and the user device 1610. The user data 1612 includes data originated by the user device 1610 or addressed to the user device 1610. The UT 1608 may be fixed or in motion. For example, the UT 1608 may be used at a residence, or on a vehicle such as a car, boat, aerostat, drone, airplane, and so forth.

The UT 1608 includes a tracking system 1682. The tracking system 1682 uses almanac data 1684 to determine tracking data 1686. The almanac data 1684 provides information indicative of orbital elements of the orbit 1604 of one or more satellites 1602. For example, the almanac data 1684 may comprise orbital elements such as "two-line element" data for the satellites 1602 in the constellation that are broadcast or otherwise sent to the UTs 1608 using the communication system 1680.

The tracking system 1682 may use the current location of the UT 1608 and the almanac data 1684 to determine the tracking data 1686 for the satellite 1602. For example, based on the current location of the UT 1608 and the predicted position and movement of the satellites 1602, the tracking system 1682 is able to calculate the tracking data 1686. The tracking data 1686 may include information indicative of azimuth, elevation, distance to the second satellite, time of flight correction, or other information at a specified time. The determination of the tracking data 1686 may be ongoing. For example, the first UT 1608 may determine tracking data 1686 every 1600 ms, every second, every five seconds, or at other intervals.

With regard to FIG. 16, an uplink is a communication link which allows data to be sent to a satellite 1602 from a ground station 1606, UT 1608, or device other than another satellite 1602. Uplinks are designated as UL1, UL2, UL3 and so forth. For example, UL1 is a first uplink from the ground station 1606 to the second satellite 1602(2). In comparison, a downlink is a communication link which allows data to be sent from the satellite 1602 to a ground station 1606, UT 1608, or device other than another satellite 1602. For example, DL1 is a first downlink from the second satellite 1602(2) to the ground station 1606. The satellites 1602 may also be in communication with one another. For example, an intersatellite link 1690 provides for communication between satellites 1602 in the constellation.

The satellite 1602, the ground station 1606, the user terminal 1608, the user device 1610, the management system 1650, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 17:
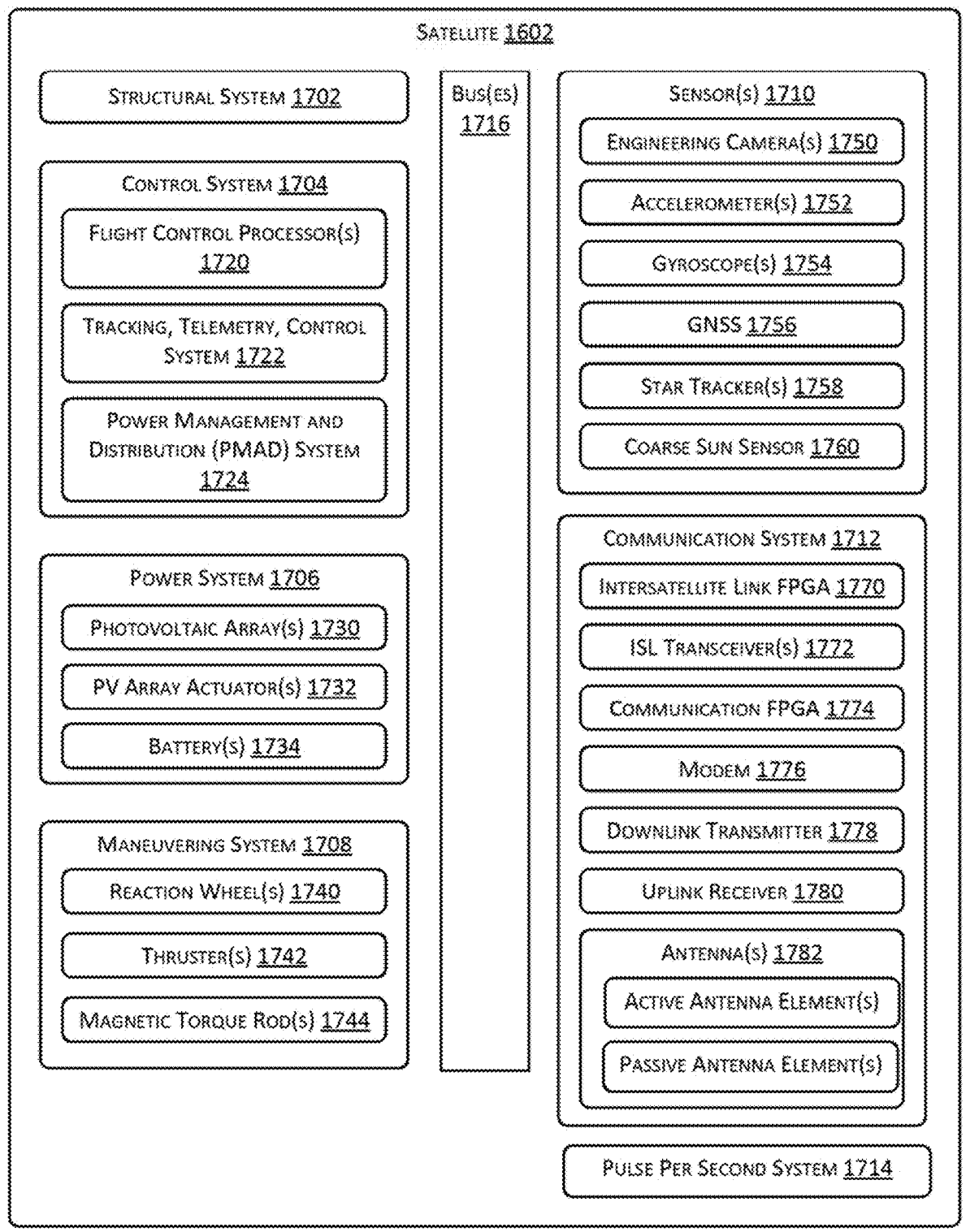
FIG. 17 is a block diagram of some systems associated with the satellite, according to some implementations.

FIG. 17 is a block diagram of some systems associated with the satellite 1602, according to some implementations. The satellite 1602 may comprise a structural system 1702, a control system 1704, a power system 1706, a maneuvering system 1708, one or more sensors 1710, and a communication system 1712. A pulse per second (PPS) system 1714 may be used to provide timing reference to the systems onboard the satellite 1602. One or more busses 1716 may be used to transfer data between the systems onboard the satellite 1602. In some implementations, redundant busses 1716 may be provided. The busses 1716 may include, but are not limited to, data busses such as Controller Area Network Flexible Data Rate (CAN FD), Ethernet, Serial Peripheral Interface (SPI), and so forth. In some implementations the busses 1716 may carry other signals. For example, a radio frequency bus may comprise coaxial cable, waveguides, and so forth to transfer radio signals from one part of the satellite 1602 to another. In other implementations, some systems may be omitted or other systems added.

One or more of these systems may be communicatively coupled with one another in various combinations.

The structural system 1702 comprises one or more structural elements to support operation of the satellite 1602. For example, the structural system 1702 may include trusses, struts, panels, and so forth. The components of other systems may be affixed to, or housed by, the structural system 1702. For example, the structural system 1702 may provide mechanical mounting and support for solar panels in the power system 1706. The structural system 1702 may also provide for thermal control to maintain components of the satellite 1602 within operational temperature ranges. For example, the structural system 1702 may include louvers, heat sinks, radiators, and so forth.

The control system 1704 provides various services, such as operating the onboard systems, resource management, providing telemetry, processing commands, and so forth. For example, the control system 1704 may direct operation of the communication system 1712. The control system 1704 may include one or more flight control processors 1720. The flight control processors 1720 may comprise one or more processors, FPGAs, and so forth. A tracking, telemetry, and control (TTC) system 1722 may include one or more processors, radios, and so forth. For example, the TTC system 1722 may comprise a dedicated radio transmitter and receiver to receive commands from a ground station 1606, send telemetry to the ground station 1606, and so forth. A power management and distribution (PMAD) system 1724 may direct operation of the power system 1706, control distribution of power to the systems of the satellite 1602, control battery 1734 charging, and so forth.

The power system 1706 provides electrical power for operation of the components onboard the satellite 1602. The power system 1706 may include components to generate electrical energy. For example, the power system 1706 may comprise one or more photovoltaic arrays 1730 comprising a plurality of photovoltaic cells, thermoelectric devices, fuel cells, and so forth. One or more PV array actuators 1732 may be used to change the orientation of the photovoltaic array(s) 1730 relative to the satellite 1602. For example, the PV array actuator 1732 may comprise a motor. The power system 1706 may include components to store electrical energy. For example, the power system 1706 may comprise one or more batteries 1734, fuel cells, and so forth.

The maneuvering system 1708 maintains the satellite 1602 in one or more of a specified orientation or orbit 1604. For example, the maneuvering system 1708 may stabilize the satellite 1602 with respect to one or more axes. In another example, the maneuvering system 1708 may move the satellite 1602 to a specified orbit 1604. The maneuvering system 1708 may include one or more of reaction wheel(s) 1740, thrusters 1742, magnetic torque rods 1744, solar sails, drag devices, and so forth. The thrusters 1742 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 1706 to expel the water and produce thrust. During operation, the maneuvering system 1708 may use data obtained from one or more of the sensors 1710.

The satellite 1602 includes one or more sensors 1710. The sensors 1710 may include one or more engineering cameras 1750. For example, an engineering camera 1750 may be mounted on the satellite 1602 to provide images of at least a portion of the photovoltaic array 1730. Accelerometers 1752 provide information about acceleration of the satellite 1602 along one or more axes. Gyroscopes 1754 provide information about rotation of the satellite 1602 with respect to one or more axes. The sensors 1710 may include a global navigation satellite system (GNSS) 1756 receiver, such as Global Positioning System (GPS) receiver, to provide information about the position of the satellite 1602 relative to Earth. In some implementations the GNSS 1756 may also provide information indicative of velocity, orientation, and so forth. One or more star trackers 1758 may be used to determine an orientation of the satellite 1602. A coarse sun sensor 1760 may be used to detect the sun, provide information on the relative position of the sun with respect to the satellite 1602, and so forth. The satellite 1602 may include other sensors 1710 as well. For example, the satellite 1602 may include a horizon detector, radar, lidar, and so forth.

The communication system 1712 provides communication with one or more other devices, such as other satellites 1602, ground stations 1606, user terminals 1608, and so forth. The communication system 1712 may include one or more modems 1776, digital signal processors, power amplifiers, antennas 1782 (including at least one antenna that implements multiple antenna elements, such as a phased array antenna), processors, memories, storage devices, communications peripherals, interface buses, and so forth. Such components support communications with other satellites 1602, ground stations 1606, user terminals 1608, and so forth using radio frequencies within a desired frequency spectrum. The antennas 1782 include at least one active antenna element (which can be the same or similar to the antenna elements 1204 of FIG. 12 and the antenna elements 1304 of FIG. 13, or another antenna elements as discussed with respect to FIGS. 1-11) and at least one passive antenna element (which can be the same or similar to the bridge elements 1214 of FIG. 12 and the bridge elements 1314 of FIG. 13). The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 1712 may be output to other systems, such as to the control system 1704, for further processing. Output from a system, such as the control system 1704, may be provided to the communication system 1712 for transmission.

The communication system 1712 may include hardware to support the intersatellite link 1690. For example, an intersatellite link FPGA 1770 may be used to modulate data that is sent and received by an ISL transceiver 1772 to send data between satellites 1602. The ISL transceiver 1772 may operate using radio frequencies, optical frequencies, and so forth.

A communication FPGA 1774 may be used to facilitate communication between the satellite 1602 and the ground stations 1606, UTs 1608, and so forth. For example, the communication FPGA 1774 may direct operation of a modem 1776 to modulate signals sent using a downlink transmitter 1778 and demodulate signals received using an uplink receiver 1780. The satellite 1602 may include one or more antennas 1782. For example, one or more parabolic antennas may be used to provide communication between the satellite 1602 and one or more ground stations 1606. In another example, a phased array antenna may be used to provide communication between the satellite 1602 and the UTs 1608.

Figure 18:
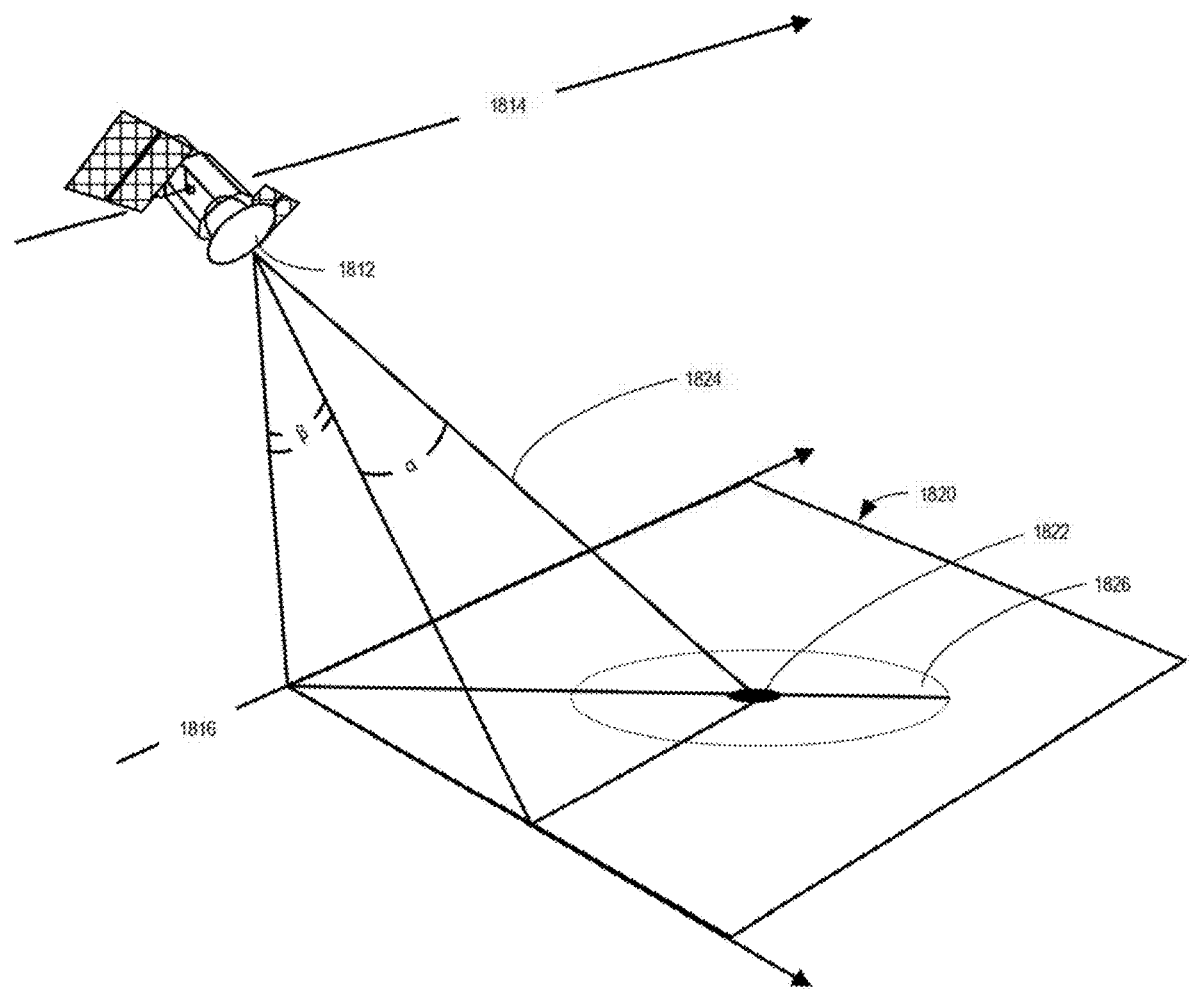
FIG. 18 illustrates the satellite including an antenna system that is steerable according to one embodiment.

FIG. 18 illustrates the satellite 1800 including an antenna system 1812 that is steerable. The satellite 1800 is an example of a satellite 1602 of FIG. 16. The antenna system 1812 may include multiple antenna elements (including active antenna elements and passive antenna elements) that form an antenna and that can be mechanically or electrically steered individually, collectively, or a combination thereof In an example, the antenna is a phased array antenna.

In orbit 1604, the satellite 1800 follows a path 1814, the projection of which onto the surface of the Earth forms a ground path 1816. In the example illustrated in FIG. 18, the ground path 1816 and a projected axis extending orthogonally from the ground path 1816 at the position of the satellite 1800, together define a region 1820 of the surface of the Earth. In this example, the satellite 1800 is capable of establishing uplink and downlink communications with one or more of ground stations, user terminals, or other devices within the region 1820, including a ground station 1606 and a user terminal 1608 of FIG. 16. In some embodiments, the region 1820 may be located in a different relative position to the ground path 1816 and the position of the satellite 1800. For example, the region 1820 may describe a region of the surface of the Earth directly below the satellite 1800. Furthermore, embodiments may include communications between the satellite 1800, an airborne communications system, and so forth.

As shown in FIG. 18, a communication target 1822 (e.g., a ground station or a user terminal) is located within the region 1820. The satellite 1800 controls the antenna system 1812 to steer transmission and reception of communications signals to selectively communicate with the communication target 1822. For example, in a downlink transmission from the satellite 1800 to the communication target 1822, a signal beam 1824 emitted by the antenna system 1812 is steerable within an area 1826 of the region 1820. In some implementations, the signal beam 1824 may comprise a plurality of subbeams. The extents of the area 1826 define an angular range within which the signal beam 1824 is steerable, where the direction of the signal beam 1824 is described by a beam angle "α" relative to a surface normal vector of the antenna system 1812. In two-dimensional phased array antennas, the signal beam 1824 is steerable in two dimensions, described in FIG. 18 by a second angle "β" orthogonal to the beam angle a. In this way, the area 1826 is a two-dimensional area within the region 1820, rather than a linear track at a fixed angle determined by the orientation of the antenna system 1812 relative to the ground path 1816.

In FIG. 18, as the satellite 1800 follows the path 1814, the area 1826 tracks along the surface of the Earth. In this way, the communication target 1822, which is shown centered in the area 1826 for clarity, is within the angular range of the antenna system 1812 for a period of time. During that time, signals communicated between the satellite 1800 and the communication target 1822 are subject to bandwidth constraints, including but not limited to signal strength and calibration of the signal beam 1824. In an example, for phased array antenna systems, the signal beam 1824 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 19:
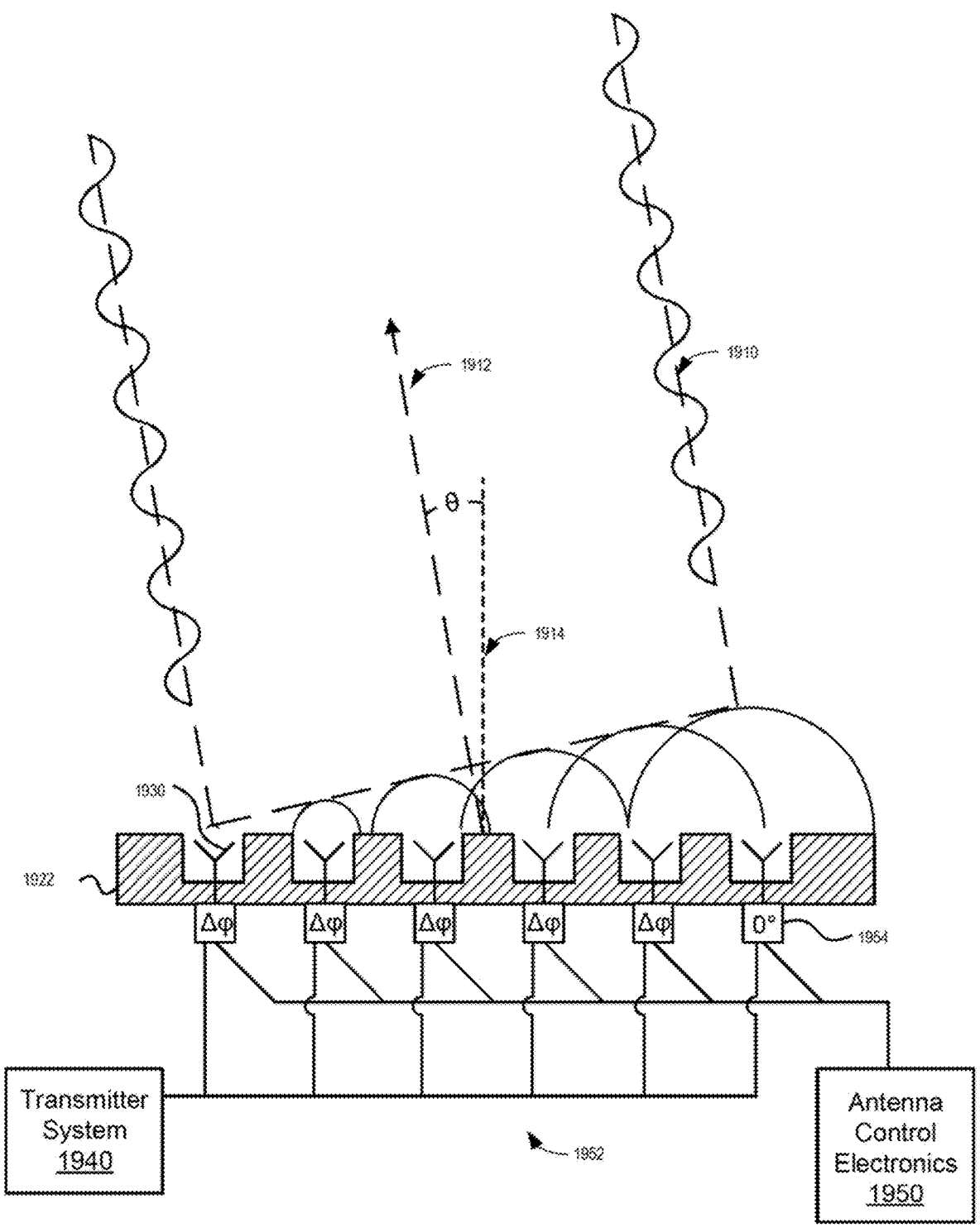
FIG. 19 illustrates a simplified schematic of an antenna, according to embodiments of the present disclosure.

FIG. 19 illustrates a simplified schematic of an antenna 1900, according to embodiments of the present disclosure. The antenna 1900 may be a component of the antenna system 1812 of FIG. 18. As illustrated, the antenna 1900 is a phased array antenna that includes multiple antenna elements 1930 (including active antenna elements and passive antenna elements). Interference between the antenna elements 1930 forms a directional radiation pattern in both transmitter and receiver arrays forming a beam 1910 (beam extents shown as dashed lines). The beam 1910 is a portion of a larger transmission pattern (not shown) that extends beyond the immediate vicinity of the antenna 1900. The beam 1910 is directed along a beam vector 1912, described by an angle "θ" relative to an axis 1914 normal to a surface of the antenna 1900. As described below, the beam 1910 is one or more of steerable or shapeable through control of operating parameters including, but not limited to a phase and an amplitude of each antenna element 1930.

In FIG. 19, the antenna 1900 includes, within a transmitter section 1922, the plurality of antenna elements 1930, which may include, but are not limited to, omnidirectional transmitter antennas coupled to a transmitter system 1940, such as the downlink transmitter 1778. The transmitter system 1940 provides a signal, such as a downlink signal to be transmitted to a ground station on the surface. The downlink signal is provided to each antenna element 1930 as a time-varying signal that may include several multiplexed signals. To steer the beam 1910 relative to the axis 1914, the phased array antenna 1900 includes antenna control electronics 1950 controlling a radio frequency (RF) feeding network 1952, including a plurality of signal conditioning components 1954 interposed between the antenna elements 1930 and the transmitter system 1940. The signal conditioning components 1954 introduce one or more of a phase modulation or an amplitude modulation, as denoted by "Δφ" in FIG. 19, to the signal sent to the antenna elements 1930. As shown in FIG. 19, introducing a progressive phase modulation produces interference in the individual transmission of each antenna element 1930 that generates the beam 1910.

The phase modulation imposed on each antenna element 1930 will differ and will be dependent on a spatial location of a communication target that determines an optimum beam vector (e.g., where the beam vector 1912 is found by one or more of maximizing signal intensity or connection strength). The optimum beam vector may change with time as the communication target 1822 moves relative to the phased array antenna 1900.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, Read-Only Memories (ROMs), compact disc ROMs (CD-ROMs) and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
   a radio frequency (RF) module circuit;
   radio frequency front-end (RFFE) circuitry coupled to the RF module circuit;
   an array antenna coupled to the RFFE circuitry, the array antenna comprising:
      a first panel comprising a first circuit board and a first plurality of identical antenna modules electrically and physically coupled to the first circuit board, wherein the first plurality of identical antenna modules includes a first antenna module comprising a first antenna element and a second antenna element that send RF signals and receive RF signals; and
      a second panel comprising a second circuit board and a second plurality of identical antenna modules electrically and physically coupled to the second circuit board, wherein the first panel and the second panel are different, wherein the second plurality of identical antenna modules includes a second antenna module comprising a third antenna element and a fourth antenna element, the second panel disposed adjacent to the first panel and separated from the first panel by a first distance defining an area between the first and the second panels; and
      a support structure comprising a third antenna module disposed over the area, wherein a first portion of the third antenna module overlies a portion of the first panel and a second portion of the third antenna module overlies a portion of the second panel, and wherein the third antenna module comprises a fifth antenna element that is terminated via a resistor.

2. The wireless device of claim 1, wherein the RFFE circuitry comprises:
   a first amplifier coupled to the first antenna element; and
   a second amplifier coupled to the second antenna element, and wherein the resistor is coupled between the third antenna element and a ground or coupled between terminals of the third antenna element.

3. The wireless device of claim 1, wherein a first feed point of the first antenna element of the first antenna module, a second feed point of the third antenna element of the second antenna module, and a third feed point of the fifth antenna element are part of a triangular lattice pattern.

4. An antenna structure comprising:
   a first circuit board comprising a first plurality of antenna elements including a first antenna element;
   a second circuit board comprising a second plurality of antenna elements including a second antenna element, wherein the second circuit board and the first circuit board are different, the second circuit board being separated from the first circuit board by a first distance defining an open area between the first and the second circuit boards; and
   a structure disposed over the open area, wherein the structure comprises a third antenna element, wherein the third antenna element, the first antenna element, and the second antenna element form a lattice pattern.

5. The antenna structure of claim 4, wherein:
   the first circuit board comprises a first plurality of antenna modules, and wherein each of the first plurality of antenna modules comprises a set of the first plurality of antenna elements;
   the second circuit board comprises a second plurality of antenna modules, and wherein each of the second plurality of antenna modules comprises a set of the second plurality of antenna elements; and
   a first antenna module of the first plurality of antenna modules comprises a rectangular shape with the first antenna element and the second antenna element located on a longitudinal axis of the rectangular shape.

6. The antenna structure of claim 4, wherein a first portion of the structure overlies the first circuit board and a second portion of the structure overlies the second circuit board.

7. The antenna structure of claim 4, further comprising: an amplifier coupled to the first antenna element and a ground plane, wherein the structure comprising the third antenna element is coupled to the first circuit board using a surface mount connector.

8. The antenna structure of claim 4, wherein the structure comprises:
a ground plane;
a resistor coupled to the third antenna element;
feed lines coupled between the third antenna element and the resistor; and
bonding material that adheres the structure to the first circuit board and the second circuit board.

9. The antenna structure of claim 4, wherein the third antenna element, the first antenna element, and the second antenna element are patch elements.

10. The antenna structure of claim 4, wherein the lattice pattern is a triangular lattice pattern.

11. The antenna structure of claim 4, wherein the lattice pattern is a rectangular lattice pattern.

12. The antenna structure of claim 4, wherein the structure comprises a fourth antenna element.

13. A communication system comprising:
a radio frequency (RF) module circuit;
radio frequency front-end (RFFE) circuitry coupled to the RF module circuit; and
an array antenna coupled to the RFFE circuitry, the array antenna comprising:
a first circuit board comprising a first plurality of antenna elements including a first antenna element;
a second circuit board comprising a second plurality of antenna elements including a second antenna element, wherein the second circuit board and the first circuit board are different, the second circuit board being separated from the first circuit board by a first distance defining an open area between the first circuit board and the second circuit board; and
a structure disposed over the open area, wherein the structure comprises an antenna element, wherein the antenna element, a first antenna element of the first plurality of antenna elements, and a second antenna element of the second plurality of antenna elements form a lattice pattern.

14. The communication system of claim 13, wherein:
the first circuit board comprises a first plurality of antenna modules, and wherein each of the first plurality of antenna modules comprises a set of the first plurality of antenna elements; and
the second circuit board comprises a second plurality of antenna modules, and wherein each of the second plurality of antenna modules comprises a set of the second plurality of antenna elements; and
a first antenna module of the first plurality of antenna modules comprises a rectangle shape with the first antenna element and the second antenna element located on a longitudinal axis of the rectangular shape.

15. The communication system of claim 13, further comprising:
an amplifier coupled to the first antenna element and a ground plane, wherein the antenna element is coupled to the first circuit board using a surface mount contact.

16. The communication system of claim 13, wherein the structure comprises:
a ground plane;
a resistor coupled to the antenna element;
feed lines coupled between the antenna element and the resistor; and
bonding material that adheres the structure to the first circuit board and the second circuit board.

17. The communication system of claim 13, wherein the antenna element, the first antenna element, and the second antenna element are patch elements.

18. The communication system of claim 13, wherein the antenna element, the first antenna element, and the second antenna element are patch elements.

19. The communication system of claim 13, wherein the lattice pattern is a triangular lattice pattern.

20. The communication system of claim 13, wherein the structure comprises a fourth antenna element.

* * * * *

UNITED STATES PATENT AND TRADEMARK OFFICE
CERTIFICATE OF CORRECTION

Page 1 of 1

PATENT NO. : 11,641,067 B1
APPLICATION NO. : 16/989751
DATED : May 2, 2023
INVENTOR(S) : Christopher Steven Merola It is certified that error appears in the above-identified patent and that said Letters Patent is hereby corrected as shown below:

On the Title Page

Item (54), and in the Specification Column 1, correct title to "PASSIVE ANTENNA ELEMENTS USED TO FILL GAPS IN A PANELIZED PHASED ARRAY ANTENNA"

Signed and Sealed this
Fifth Day of March, 2024

Katherine Kelly Vidal
*Director of the United States Patent and Trademark Office*